United States Patent
Smee et al.

(10) Patent No.: US 9,071,344 B2
(45) Date of Patent: Jun. 30, 2015

(54) REVERSE LINK INTERFERENCE CANCELLATION

(75) Inventors: John Edward Smee, San Diego, CA (US); Jilei Hou, Carlsbad, CA (US); Roberto Padovani, San Diego, CA (US); Peter John Black, San Diego, CA (US); Kenneth D. Easton, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 2216 days.

(21) Appl. No.: 11/334,977

(22) Filed: Jan. 18, 2006

(65) Prior Publication Data
US 2007/0040704 A1    Feb. 22, 2007

Related U.S. Application Data

(60) Provisional application No. 60/710,405, filed on Aug. 22, 2005, provisional application No. 60/710,370, filed on Aug. 22, 2005, provisional application No. 60/713,549, filed on Aug. 31, 2005, provisional application No. 60/713,517, filed on Aug. 31, 2005.

(51) Int. Cl.
*H04W 36/00* (2009.01)
*H04B 1/7107* (2011.01)
*H04W 52/12* (2009.01)

(52) U.S. Cl.
CPC .............. *H04B 1/7107* (2013.01); *H04W 52/12* (2013.01)

(58) Field of Classification Search
USPC ............. 455/63.1, 422, 114.2, 296, 522, 631, 455/561, 67.13; 370/331, 335
See application file for complete search history.

(56) References Cited

U.S. PATENT DOCUMENTS

| | | | |
|---|---|---|---|
| 4,718,066 A | 1/1988 | Rogard | |
| 4,885,744 A * | 12/1989 | Lespagnol et al. | 370/466 |
| 5,172,118 A | 12/1992 | Peregrim et al. | |
| 5,173,702 A | 12/1992 | Young et al. | |
| 5,173,703 A | 12/1992 | Mangiapane et al. | |
| 5,185,608 A | 2/1993 | Pozgay | |
| 5,267,249 A | 11/1993 | Dong | |
| 5,710,784 A | 1/1998 | Kindred et al. | |
| 5,751,725 A | 5/1998 | Chen | |

(Continued)

FOREIGN PATENT DOCUMENTS

| | | |
|---|---|---|
| CN | 1207835 A | 2/1999 |
| CN | 1250269 A | 4/2000 |

(Continued)

OTHER PUBLICATIONS

International Search Report and Written Opinion—PCT/US2006/032937, International Search Authority—European Patent Office—Feb. 23, 2007.

(Continued)

*Primary Examiner* — Khawar Iqbal
(74) *Attorney, Agent, or Firm* — Brian K. Lambert

(57) ABSTRACT

A method and system for reverse link interference cancellation. One method comprises demodulating and decoding at least one signal sent from at least one access terminal and received by a first base station, sending demodulated, decoded information of the signal to a second base station, reconstructing the signal at the second base station, and subtracting the reconstructed signal from a buffer at the second base station.

54 Claims, 40 Drawing Sheets

(56) References Cited

U.S. PATENT DOCUMENTS

| | | | |
|---|---|---|---|
| 5,774,450 A * | 6/1998 | Harada et al. | 370/206 |
| 5,774,496 A | 6/1998 | Butler et al. | |
| 5,887,035 A | 3/1999 | Molnar | |
| 5,960,361 A | 9/1999 | Chen | |
| 5,983,383 A | 11/1999 | Wolf | |
| 6,108,373 A | 8/2000 | Fargues et al. | |
| 6,169,759 B1 | 1/2001 | Kanterakis et al. | |
| 6,259,730 B1 | 7/2001 | Solondz | |
| 6,282,233 B1 | 8/2001 | Yoshida | |
| 6,285,682 B1 | 9/2001 | Proctor et al. | |
| 6,396,867 B1 | 5/2002 | Tiedemann, Jr. et al. | |
| 6,480,558 B1 * | 11/2002 | Ottosson et al. | 375/350 |
| 6,532,254 B1 | 3/2003 | Jokinen | |
| 6,545,989 B1 | 4/2003 | Butler | |
| 6,553,224 B1 * | 4/2003 | Kim | 455/426.1 |
| 6,587,522 B1 | 7/2003 | Wheeler et al. | |
| 6,590,881 B1 | 7/2003 | Wallace et al. | |
| 6,615,030 B1 | 9/2003 | Saito et al. | |
| 6,628,707 B2 | 9/2003 | Rafie et al. | |
| 6,633,601 B1 | 10/2003 | Yang | |
| 6,741,661 B2 * | 5/2004 | Wheatley et al. | 375/296 |
| 6,744,814 B1 | 6/2004 | Blanksby et al. | |
| 6,747,963 B1 | 6/2004 | Park et al. | |
| 6,765,531 B2 * | 7/2004 | Anderson | 342/378 |
| 6,765,894 B1 | 7/2004 | Hayashi | |
| 6,771,689 B2 | 8/2004 | Solondz | |
| 6,834,197 B2 | 12/2004 | Nakahara et al. | |
| 6,907,092 B1 | 6/2005 | Yakhnich et al. | |
| 6,917,607 B1 | 7/2005 | Yeom et al. | |
| 6,931,030 B1 | 8/2005 | Dogan | |
| 6,956,893 B2 | 10/2005 | Frank et al. | |
| 6,959,010 B1 | 10/2005 | Bahrenburg et al. | |
| 6,975,604 B1 * | 12/2005 | Ishida et al. | 370/331 |
| 6,977,888 B1 * | 12/2005 | Frenger et al. | 370/218 |
| 6,983,166 B2 | 1/2006 | Shiu et al. | |
| 6,985,516 B1 | 1/2006 | Easton et al. | |
| 7,006,439 B2 | 2/2006 | Thron et al. | |
| 7,006,795 B2 * | 2/2006 | Foschini et al. | 455/63.1 |
| 7,013,147 B1 | 3/2006 | Kuwahara et al. | |
| 7,031,742 B2 | 4/2006 | Chen et al. | |
| 7,042,869 B1 | 5/2006 | Bender | |
| 7,051,268 B1 | 5/2006 | Sindhushayana et al. | |
| 7,107,031 B2 | 9/2006 | Kristensson et al. | |
| 7,116,735 B2 | 10/2006 | Yamada et al. | |
| 7,123,590 B2 | 10/2006 | Mir et al. | |
| 7,130,365 B2 * | 10/2006 | Li | 375/346 |
| 7,167,502 B1 | 1/2007 | Tsaur | |
| 7,187,736 B2 | 3/2007 | Buckley et al. | |
| 7,200,172 B2 | 4/2007 | Pukkila et al. | |
| 7,224,962 B1 | 5/2007 | Kite | |
| 7,295,636 B2 | 11/2007 | Onggosanusi et al. | |
| 7,298,806 B1 | 11/2007 | Varma et al. | |
| 7,302,009 B2 | 11/2007 | Walton et al. | |
| 7,308,056 B2 | 12/2007 | Pukkila et al. | |
| 7,313,189 B2 | 12/2007 | Yoshida et al. | |
| 7,349,379 B2 | 3/2008 | Schmidl et al. | |
| 7,406,065 B2 | 7/2008 | Willenegger et al. | |
| 7,466,666 B2 | 12/2008 | Yoon et al. | |
| 7,620,662 B2 | 11/2009 | Kassai et al. | |
| 7,650,116 B2 | 1/2010 | Haartsen | |
| 7,693,210 B2 | 4/2010 | Margetts et al. | |
| 7,706,430 B2 | 4/2010 | Guo et al. | |
| 7,764,726 B2 | 7/2010 | Simic et al. | |
| 7,783,312 B2 | 8/2010 | Mudigonda et al. | |
| 7,801,248 B2 | 9/2010 | Challa et al. | |
| 7,933,256 B2 | 4/2011 | Park et al. | |
| 8,160,002 B2 | 4/2012 | Rajkotia et al. | |
| 8,396,440 B2 | 3/2013 | Canpolat et al. | |
| 8,442,441 B2 * | 5/2013 | Pfister et al. | 455/63.1 |
| 8,489,128 B2 | 7/2013 | Lundby | |
| 8,503,591 B2 | 8/2013 | Sikri et al. | |
| 8,509,293 B2 | 8/2013 | Sikri et al. | |
| 8,619,928 B2 | 12/2013 | Chalia et al. | |
| 8,675,796 B2 | 3/2014 | Sikri et al. | |
| 2001/0018650 A1 | 8/2001 | DeJaco | |
| 2001/0021229 A1 | 9/2001 | Belaiche | |
| 2002/0006138 A1 | 1/2002 | Odenwalder | |
| 2002/0046379 A1 | 4/2002 | Miki et al. | |
| 2002/0071407 A1 | 6/2002 | Koo et al. | |
| 2002/0093937 A1 * | 7/2002 | Kim et al. | 370/349 |
| 2002/0131381 A1 | 9/2002 | Kim et al. | |
| 2002/0131532 A1 | 9/2002 | Chi et al. | |
| 2002/0132625 A1 | 9/2002 | Ogino et al. | |
| 2002/0181557 A1 | 12/2002 | Fujii | |
| 2003/0003906 A1 * | 1/2003 | Demers et al. | 455/424 |
| 2003/0004784 A1 | 1/2003 | Li et al. | |
| 2003/0016174 A1 * | 1/2003 | Anderson | 342/378 |
| 2003/0041206 A1 | 2/2003 | Dickie | |
| 2003/0063596 A1 | 4/2003 | Arslan et al. | |
| 2003/0078067 A1 | 4/2003 | Kim et al. | |
| 2003/0103470 A1 | 6/2003 | Yafuso | |
| 2003/0112370 A1 | 6/2003 | Long et al. | |
| 2003/0119451 A1 | 6/2003 | Jang et al. | |
| 2003/0125037 A1 | 7/2003 | Bae et al. | |
| 2003/0134656 A1 | 7/2003 | Chang et al. | |
| 2003/0147476 A1 | 8/2003 | Ma et al. | |
| 2003/0199290 A1 | 10/2003 | Viertola | |
| 2003/0212816 A1 | 11/2003 | Bender et al. | |
| 2003/0223396 A1 | 12/2003 | Tsai et al. | |
| 2004/0001563 A1 | 1/2004 | Scarpa | |
| 2004/0005897 A1 | 1/2004 | Tomoe et al. | |
| 2004/0017311 A1 | 1/2004 | Thomas et al. | |
| 2004/0043746 A1 | 3/2004 | Hiramatsu | |
| 2004/0062302 A1 | 4/2004 | Fujii et al. | |
| 2004/0081124 A1 | 4/2004 | Black et al. | |
| 2004/0081195 A1 | 4/2004 | El-Maleh et al. | |
| 2004/0081248 A1 | 4/2004 | Parolari | |
| 2004/0082356 A1 | 4/2004 | Walton et al. | |
| 2004/0085917 A1 | 5/2004 | Fitton et al. | |
| 2004/0085936 A1 | 5/2004 | Gopalakrishnan et al. | |
| 2004/0116122 A1 | 6/2004 | Zeira et al. | |
| 2004/0131007 A1 | 7/2004 | Smee et al. | |
| 2004/0141525 A1 | 7/2004 | Bhushan et al. | |
| 2004/0157614 A1 | 8/2004 | Fujita et al. | |
| 2004/0160933 A1 | 8/2004 | Odenwalder et al. | |
| 2004/0168113 A1 | 8/2004 | Murata et al. | |
| 2004/0198404 A1 | 10/2004 | Attar et al. | |
| 2004/0203913 A1 | 10/2004 | Ogino et al. | |
| 2004/0223507 A1 | 11/2004 | Kuchibhotla et al. | |
| 2004/0223538 A1 | 11/2004 | Zeira | |
| 2004/0229615 A1 | 11/2004 | Agrawal | |
| 2004/0240400 A1 | 12/2004 | Khan | |
| 2004/0240416 A1 | 12/2004 | Derryberry et al. | |
| 2005/0013263 A1 | 1/2005 | Kim et al. | |
| 2005/0018614 A1 | 1/2005 | Kiran | |
| 2005/0037718 A1 | 2/2005 | Kim et al. | |
| 2005/0037775 A1 | 2/2005 | Moeglein et al. | |
| 2005/0053088 A1 | 3/2005 | Cheng et al. | |
| 2005/0058154 A1 | 3/2005 | Lee et al. | |
| 2005/0084045 A1 | 4/2005 | Stewart et al. | |
| 2005/0111408 A1 | 5/2005 | Skillermark et al. | |
| 2005/0147024 A1 | 7/2005 | Jung et al. | |
| 2005/0153695 A1 | 7/2005 | Cho | |
| 2005/0185364 A1 | 8/2005 | Bell et al. | |
| 2005/0195889 A1 | 9/2005 | Grant et al. | |
| 2005/0220042 A1 | 10/2005 | Chang et al. | |
| 2005/0232174 A1 | 10/2005 | Onggosanusi et al. | |
| 2005/0249163 A1 | 11/2005 | Kim et al. | |
| 2005/0265399 A1 | 12/2005 | El-Maleh et al. | |
| 2005/0265465 A1 | 12/2005 | Hosur et al. | |
| 2005/0277429 A1 | 12/2005 | Laroia et al. | |
| 2006/0003792 A1 | 1/2006 | Gholmieh et al. | |
| 2006/0050666 A1 | 3/2006 | Odenwalder | |
| 2006/0126491 A1 | 6/2006 | Ro et al. | |
| 2006/0126765 A1 | 6/2006 | Shin et al. | |
| 2006/0126844 A1 | 6/2006 | Mauro | |
| 2006/0141933 A1 | 6/2006 | Smee et al. | |
| 2006/0141935 A1 * | 6/2006 | Hou et al. | 455/63.1 |
| 2006/0142038 A1 | 6/2006 | Ozarow et al. | |
| 2006/0146953 A1 | 7/2006 | Raghothaman et al. | |
| 2006/0146969 A1 | 7/2006 | Zhang et al. | |
| 2006/0203943 A1 | 9/2006 | Scheim et al. | |
| 2006/0209783 A1 | 9/2006 | Jain et al. | |
| 2006/0209902 A1 | 9/2006 | Grilli et al. | |

(56) References Cited

U.S. PATENT DOCUMENTS

| | | | |
|---|---|---|---|
| 2006/0209982 A1 | 9/2006 | De Gaudenzi et al. |
| 2006/0227853 A1 | 10/2006 | Liang et al. |
| 2006/0234715 A1 | 10/2006 | Cho et al. |
| 2007/0021148 A1 | 1/2007 | Mahini |
| 2007/0050189 A1 | 3/2007 | Cruz-Zeno et al. |
| 2007/0058709 A1 | 3/2007 | Chen et al. |
| 2007/0058746 A1 | 3/2007 | Gueguen |
| 2007/0063897 A1 | 3/2007 | Matsuda |
| 2007/0071145 A1 | 3/2007 | Perets |
| 2007/0086513 A1 | 4/2007 | Fernandez-Corbaton et al. |
| 2007/0110095 A1 | 5/2007 | Attar et al. |
| 2007/0112564 A1 | 5/2007 | Jelinek |
| 2007/0121764 A1 | 5/2007 | Chen et al. |
| 2007/0127608 A1 | 6/2007 | Scheim et al. |
| 2007/0133423 A1 | 6/2007 | Okumura |
| 2007/0133475 A1 | 6/2007 | Peisa et al. |
| 2007/0150787 A1 | 6/2007 | Kim et al. |
| 2007/0150788 A1 | 6/2007 | Zhuyan |
| 2007/0183483 A1 | 8/2007 | Narayan et al. |
| 2007/0201548 A1 | 8/2007 | Badri-Hoeher et al. |
| 2007/0273698 A1 | 11/2007 | Du et al. |
| 2008/0019308 A1 | 1/2008 | Chuan-Lin et al. |
| 2008/0019467 A1 | 1/2008 | He |
| 2008/0031368 A1 | 2/2008 | Lindoff et al. |
| 2008/0080363 A1 | 4/2008 | Black et al. |
| 2008/0080406 A1 | 4/2008 | Peplinski et al. |
| 2008/0101440 A1 | 5/2008 | Lee |
| 2008/0125070 A1 | 5/2008 | Grieco et al. |
| 2008/0212462 A1 | 9/2008 | Ahn et al. |
| 2008/0227456 A1 | 9/2008 | Huang et al. |
| 2008/0232439 A1 | 9/2008 | Chen |
| 2008/0298521 A1 | 12/2008 | Wu |
| 2008/0298524 A1 | 12/2008 | Koorapaty et al. |
| 2008/0305790 A1 | 12/2008 | Wakabayashi |
| 2009/0022098 A1 | 1/2009 | Novak et al. |
| 2009/0052591 A1 | 2/2009 | Chen |
| 2009/0058728 A1 | 3/2009 | Mostafa et al. |
| 2009/0092178 A1 | 4/2009 | Sayana et al. |
| 2009/0109907 A1 | 4/2009 | Tsai et al. |
| 2009/0207944 A1 | 8/2009 | Furman et al. |
| 2009/0232052 A1 | 9/2009 | Black et al. |
| 2009/0252201 A1 | 10/2009 | Smee et al. |
| 2009/0303968 A1 | 12/2009 | Jou et al. |
| 2009/0303976 A1 | 12/2009 | Jou et al. |
| 2009/0304024 A1 | 12/2009 | Jou et al. |
| 2010/0027702 A1 | 2/2010 | Vijayan et al. |
| 2010/0029213 A1 | 2/2010 | Wang |
| 2010/0029262 A1 | 2/2010 | Wang et al. |
| 2010/0040035 A1 | 2/2010 | Shapiro et al. |
| 2010/0046660 A1 | 2/2010 | Sikri et al. |
| 2010/0054212 A1 | 3/2010 | Tang |
| 2010/0061496 A1 | 3/2010 | Black et al. |
| 2010/0097955 A1 | 4/2010 | Jou |
| 2010/0142479 A1 | 6/2010 | Black et al. |
| 2010/0172383 A1 | 7/2010 | Montalvo et al. |
| 2010/0202544 A1 | 8/2010 | Osseirar et al. |
| 2010/0248666 A1 | 9/2010 | Hui et al. |
| 2010/0278227 A1 | 11/2010 | Sikri et al. |
| 2010/0296556 A1 | 11/2010 | Rave et al. |
| 2010/0310026 A1 | 12/2010 | Sikri et al. |
| 2011/0051859 A1 | 3/2011 | Canpolat et al. |
| 2011/0264976 A1 | 10/2011 | Yang et al. |
| 2012/0243515 A1 | 9/2012 | Xue et al. |
| 2012/0281675 A1 | 11/2012 | Liang et al. |
| 2014/0187248 A1 | 7/2014 | Black et al. |

FOREIGN PATENT DOCUMENTS

| | | |
|---|---|---|
| CN | 1278382 A | 12/2000 |
| CN | 1304589 A | 7/2001 |
| CN | 1311612 A | 9/2001 |
| CN | 1315095 A | 9/2001 |
| CN | 1347604 A | 5/2002 |
| CN | 1394407 A | 1/2003 |
| CN | 1447549 A | 10/2003 |
| CN | 1497857 A | 5/2004 |
| CN | 1552133 A | 12/2004 |
| CN | 1726657 A | 1/2006 |
| CN | 1736101 A | 2/2006 |
| CN | 1742457 A | 3/2006 |
| CN | 1758563 A | 4/2006 |
| CN | 1893406 A | 1/2007 |
| CN | 1906862 A | 1/2007 |
| CN | 1983913 A | 6/2007 |
| CN | 101189901 A | 5/2008 |
| CN | 101366305 A | 2/2009 |
| CN | 101465689 A | 6/2009 |
| CN | 101483499 A | 7/2009 |
| CN | 1891002 A | 10/2010 |
| EP | 0396403 A1 | 11/1990 |
| EP | 0949766 A2 | 10/1999 |
| EP | 0969608 A2 | 1/2000 |
| EP | 1168703 A2 | 1/2002 |
| EP | 1199833 A2 | 4/2002 |
| EP | 1347611 A1 | 9/2003 |
| EP | 1398984 A1 | 3/2004 |
| EP | 1404047 A2 | 3/2004 |
| EP | 1411693 A2 | 4/2004 |
| EP | 1422900 A1 | 5/2004 |
| EP | 1478117 A2 | 11/2004 |
| EP | 1569399 A1 | 8/2005 |
| EP | 1643737 A1 | 4/2006 |
| EP | 1677433 A1 | 7/2006 |
| EP | 1681775 A2 | 7/2006 |
| EP | 1699194 A1 | 9/2006 |
| EP | 1699195 A1 | 9/2006 |
| EP | 1701565 A1 | 9/2006 |
| EP | 1703659 A2 | 9/2006 |
| EP | 1821497 A1 | 8/2007 |
| EP | 1928138 A2 | 6/2008 |
| GB | 2337417 A | 11/1999 |
| JP | 62239735 A | 10/1987 |
| JP | 10500811 | 1/1998 |
| JP | H10327126 A | 12/1998 |
| JP | 2000059290 A | 2/2000 |
| JP | 2000261397 A | 9/2000 |
| JP | 2001036964 A | 2/2001 |
| JP | 2001078252 | 3/2001 |
| JP | 2001166026 | 6/2001 |
| JP | 2001511963 A | 8/2001 |
| JP | 2001512916 A | 8/2001 |
| JP | 3210915 B2 | 9/2001 |
| JP | 2001257626 A | 9/2001 |
| JP | 2001267987 A | 9/2001 |
| JP | 2001519113 | 10/2001 |
| JP | 2002009741 A | 1/2002 |
| JP | 2002506583 | 2/2002 |
| JP | 2002507342 A | 3/2002 |
| JP | 2002508129 A | 3/2002 |
| JP | 2002532008 T | 9/2002 |
| JP | 2002539711 A | 11/2002 |
| JP | 2002353824 | 12/2002 |
| JP | 2003051762 A | 2/2003 |
| JP | 2003152603 A | 5/2003 |
| JP | 2003518344 A | 6/2003 |
| JP | 2003194916 A | 7/2003 |
| JP | 2003244103 A | 8/2003 |
| JP | 2003338779 A | 11/2003 |
| JP | 2004502323 | 1/2004 |
| JP | 2004048307 A | 2/2004 |
| JP | 2004112094 A | 4/2004 |
| JP | 2004511189 A | 4/2004 |
| JP | 2004512733 A | 4/2004 |
| JP | 2004159277 A | 6/2004 |
| JP | 2004166218 A | 6/2004 |
| JP | 2004194288 A | 7/2004 |
| JP | 2004531975 | 10/2004 |
| JP | 2004343754 A | 12/2004 |
| JP | 2005065197 A | 3/2005 |
| JP | 2005510940 A | 4/2005 |
| JP | 2006501707 | 1/2006 |
| JP | 2006502622 A | 1/2006 |
| JP | 2006503485 A | 1/2006 |

(56) References Cited

FOREIGN PATENT DOCUMENTS

| | | |
|---|---|---|
| JP | 2006180266 A | 7/2006 |
| JP | 2006191582 A | 7/2006 |
| JP | 2006191587 A | 7/2006 |
| JP | 2006314086 A | 11/2006 |
| JP | 2007503169 A | 2/2007 |
| JP | 2007195247 A | 8/2007 |
| JP | 2007524269 A | 8/2007 |
| JP | 2007525103 A | 8/2007 |
| JP | 2008053889 A | 3/2008 |
| JP | 2008526136 A | 7/2008 |
| JP | 2008199493 A | 8/2008 |
| JP | 2008278338 A | 11/2008 |
| JP | 2008539664 A | 11/2008 |
| JP | 2009504097 A | 1/2009 |
| JP | 2009506660 A | 2/2009 |
| JP | 2009515219 A | 4/2009 |
| JP | 2009545219 A | 12/2009 |
| JP | 2005538650 | 12/2010 |
| JP | 2011521373 A | 7/2011 |
| KR | 20000052668 A | 8/2000 |
| KR | 20000071672 A | 11/2000 |
| KR | 20010031665 | 4/2001 |
| KR | 20010085143 A | 9/2001 |
| KR | 20020092136 | 12/2002 |
| KR | 20030059528 A | 7/2003 |
| KR | 20040097893 A | 11/2004 |
| KR | 20040108813 | 12/2004 |
| KR | 20050073113 A | 7/2005 |
| KR | 1020050097552 A | 10/2005 |
| KR | 20070091214 A | 9/2007 |
| KR | 20070104633 A | 10/2007 |
| KR | 20080031502 A | 4/2008 |
| KR | 20080039772 A | 5/2008 |
| RU | 2211531 C2 | 8/2003 |
| RU | 2233033 C2 | 7/2004 |
| RU | 2233045 C2 | 7/2004 |
| RU | 2252487 C2 | 5/2005 |
| RU | 2280329 C1 | 7/2006 |
| RU | 2319307 C2 | 3/2008 |
| RU | 2323529 C2 | 4/2008 |
| TW | 365717 | 8/1999 |
| TW | 200640202 | 11/2006 |
| TW | 200704232 | 1/2007 |
| TW | 201008148 A | 2/2010 |
| WO | WO9526593 | 10/1995 |
| WO | 9832231 A1 | 7/1998 |
| WO | WO9857452 A1 | 12/1998 |
| WO | WO-9857509 A2 | 12/1998 |
| WO | WO-9901950 A2 | 1/1999 |
| WO | WO-9912273 A1 | 3/1999 |
| WO | 9923844 | 5/1999 |
| WO | WO9929048 | 6/1999 |
| WO | WO0033528 A1 | 6/2000 |
| WO | WO-0035117 A2 | 6/2000 |
| WO | WO0035126 | 6/2000 |
| WO | WO-0055992 A1 | 9/2000 |
| WO | WO0062456 | 10/2000 |
| WO | WO-0070786 A1 | 11/2000 |
| WO | 0108324 | 2/2001 |
| WO | 0117158 | 3/2001 |
| WO | WO0223792 A1 | 3/2002 |
| WO | 0230004 | 4/2002 |
| WO | 0233877 A1 | 4/2002 |
| WO | WO-0232003 A1 | 4/2002 |
| WO | WO-0245288 A2 | 6/2002 |
| WO | WO-02067444 A1 | 8/2002 |
| WO | WO02103920 A2 | 12/2002 |
| WO | 03001834 A1 | 1/2003 |
| WO | WO-03021905 A1 | 3/2003 |
| WO | WO-03047124 A1 | 6/2003 |
| WO | WO03105370 A1 | 12/2003 |
| WO | WO-2004010573 A1 | 1/2004 |
| WO | WO-2004015909 A1 | 2/2004 |
| WO | WO2004025986 A2 | 3/2004 |
| WO | 2004032369 A2 | 4/2004 |
| WO | WO-2004066666 | 8/2004 |
| WO | 2004102864 A1 | 11/2004 |
| WO | WO-2004107768 A2 | 12/2004 |
| WO | WO2004114582 A1 | 12/2004 |
| WO | 2005020464 A1 | 3/2005 |
| WO | 2005034383 A2 | 4/2005 |
| WO | WO-2005053177 A1 | 6/2005 |
| WO | WO-2006004948 | 1/2006 |
| WO | WO-2006060605 A2 | 6/2006 |
| WO | 2006072088 A1 | 7/2006 |
| WO | WO2006071761 A1 | 7/2006 |
| WO | 2006115979 A1 | 11/2006 |
| WO | WO-2007000620 A1 | 1/2007 |
| WO | WO2007016553 | 2/2007 |
| WO | WO-2007029958 A1 | 3/2007 |
| WO | WO-2007053840 | 5/2007 |
| WO | WO-2007060093 A1 | 5/2007 |
| WO | WO-2007060229 A1 | 5/2007 |
| WO | WO-2007140338 | 12/2007 |
| WO | WO-2008005890 | 1/2008 |
| WO | WO-2008012265 A1 | 1/2008 |
| WO | 2008027192 A2 | 3/2008 |
| WO | WO2008156061 A1 | 12/2008 |
| WO | WO-2009108586 A2 | 9/2009 |
| WO | 2009137464 A2 | 11/2009 |
| WO | WO-2009140338 A2 | 11/2009 |
| WO | 2009152138 A2 | 12/2009 |
| WO | 2010014968 A1 | 2/2010 |
| WO | WO-2011028978 | 3/2011 |

OTHER PUBLICATIONS

Taiwanese Search report—095130863—TIPO—Jul. 6, 2010.
Chen, B.Y., et al., "Using H.264 Coded Block Patterns for Fast Inter-Mode Selection" Multimedia and Expo, 2008 IEEE International Conference On, IEEE, Piscataway, NJ, USA, Jun. 23, 2008, pp. 721-724, XP031312823 ISBN: 978-1-4244-2570-9.
JVT: "Draft ITU-T Recommendation and Final Draft International Standard of Joint Video Specification (ITU-T Rec. H .264 ISO/IEC 14496-10 AVC)", 7. JVT Meeting; 64. MPEG Meeting; Jul. 3, 2003-Mar. 14, 2003; Pattaya,TH; (Joint Video Team of ISO/IEC JTC1/SC29/VVG11 and ITU-T 56.16 ), No. JVT-G050r1, Mar. 14, 2003, XP030005712, ISSN: 0000-0427.
3rd Generation Partnership, Project 2 "3GPP2" Physical Layer Standard for cdma2000,Spread Spectrum Systems. Revision D, 3GPP2 C.S0002-D, Version 2.0, Sep. 30, 2005 (538 pages).
NTT DoCoMo: "Text proposals for detailed channel coding," 3GPP TSG-RAN WG1#7, R1-99b49, Aug. 1999, pp. 24.
Lakkavalli, S., et al., "Stretchable Architectures for Next Generation Cellular Networks", ISART'03, Mar. 4, 2003, 7 pages.
"Soft Handoff and Power Control in IS-95 CDMA", CDMA95.10, Dec. 6, 1999, pp. 181-212.
Tseng, S-M., et al., Fuzzy adaptive parallel interference cancellation and vector channel prediction for CDMA in fading channels, Communications, 2002. ICC 2002. IEEE International Conference on, 2002, vol. 1, pp. 252-256.
3GPP Draft; 25.814-V1.5.0, 3rd Generation Partnership Project (3GPP), Mobile Competence Centre; 650, Route Des Lucioles; F-06921 Sophia-Antipolis Cedex; France, vol. RAN WG1, no. Shanghai, China; May 26, 2006, XP050102001 pp. 29-30 p. 76 pp. 89-90.
Chunguang, W., et al., "Enhanced OTDOA Technology in 3G Location Service", Shanghai Research Institute of China Telecom, Shanghai 200122, China, Aug. 31, 2005.
Divsalar, D., et al., "Improved parallel interference cancellation for CDMA", Communications, IEEE Transactions on, Feb., 1998, vol. 46, Issue: 2, pp. 258-268.
Huaiyu, D. et al., "Asymptotic spectral efficiency of multi cell MIMO systems with frequency-flat fading," IEEE Transactions On Signal Processing, IEEE Service Centre, New York, NY, US, vol. 51, No. 11, Nov. 1, 2003, pp. 2976-2988, XP011102811.
Meyr, H. et al., "Chapter 5: Synthesis of Synchronization Algorithms" and "Chapter 8: Frequency Estimation," Jan. 1, 1998, Digital Communication Receivers:Synchronization, Channel Estimation, And Signal Processing; John Wiley and Sons, Inc.: New York, pp. 271-323,445, XP002547568.

(56) References Cited

OTHER PUBLICATIONS

Natali F.D., "AFC Tracking Algorithms" IEEE Transactions on Communications, IEEE Service Centre, Piscataway, NJ, US, vol. COM-32, No. 8, Aug. 1, 1984, pp. 935-947, XP000758571 ISSN: 0090-6778 abstract p. 941, section C.

Oliver J.C., et al., "Single antenna interference cancellation for synchronised GSM networks using a widely linear receiver" (Feb. 1, 2007) pp. 131-136, XP006028092.

Pais, A.V., et al., "Indoor DS-CDMA system deployment and performance with successive interference cancellation," Electronics Letters: GB, vol. 40, No. 19, Sep. 16, 2004, pp. 1200-1201, XP006022654.

Ritt: "Performance of IDMA-based inter-cell interference cancellation," 3GPP Draft TSG-RAN WG1 #44-bis Meeting, R1-060895, 3rd Generation Partnership Project (3GPP), Athens, Greece; Mar. 27, 2006, XP050101801, pp. 1-5.

Sawahashi M., et al., "Multipath Interference Canceller for Orthogonal Multiplexed Channel and its Performance in W-CDMA Forward Link," Technical Report of the Institute of Electronics, Information and Communication Engineers, Jan. 12, 2001, vol. 100, No. 558, pp. 27-33, RCS2000-195.

Xiaofa, L., "The study of interference Cancellation based on Multi-User Detection", Chinese Scientific Papers Online, pp. 7, March 27, 2008.

Qualcomm Europe: "On E-DCH structure", 3GPP Draft, R1-040538, 3rd Generation Partnership Project (3GPP), Mobile Competence Centre, 650, Route Des Lucioles, F-06921 Sophia-Antipolis Cedex, France, vol. RAN WG1, no. Montreal, Canada, May 6, 2004, XP050098746, [retrieved on May 6, 2004] * Section 3 *.

Qualcomm Incorporated: "Introducing Enhancements to CS voice over DCH," 3GPP Draft; R1-123809 (3GPP), Mobile Competence Centre; 650, Route Des Lucioles; F-06921 Sophia-Antipolis Cedex ; FR, vol. RAN WG1, no. Qingdao, China; Aug. 13, 2012-Aug. 17, 2012 Aug. 5, 2012. XP050661662.

Wu Q ., et al., "The cdma2000 High Rate Packet Data System", Internet Citation, Mar. 26, 2002, XP002303829, Retrieved from the Internet: URL: http://www.qualcomm.com/technology/1xev-do/publishedpapers/cdma2000 HighRatePacket.pdf [retrieved on Nov. 11, 2004] Sections 3.1.7 and 3.2.

* cited by examiner

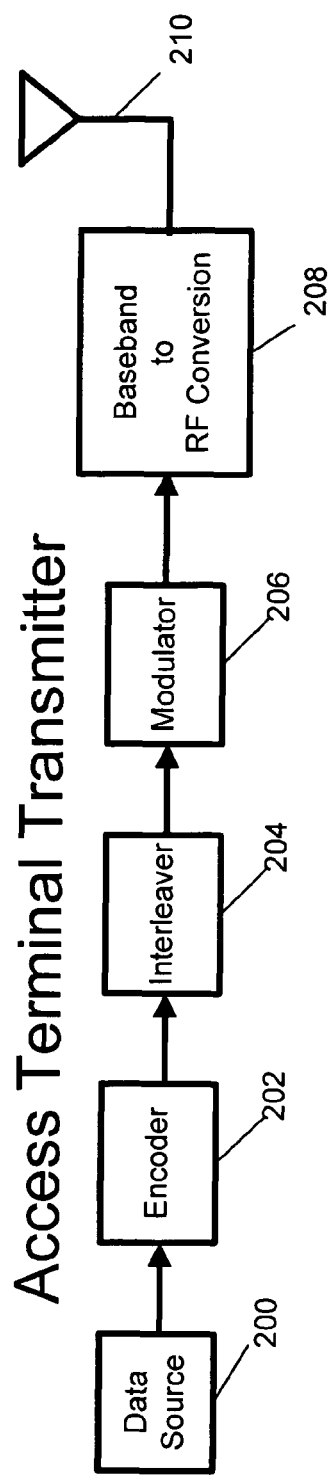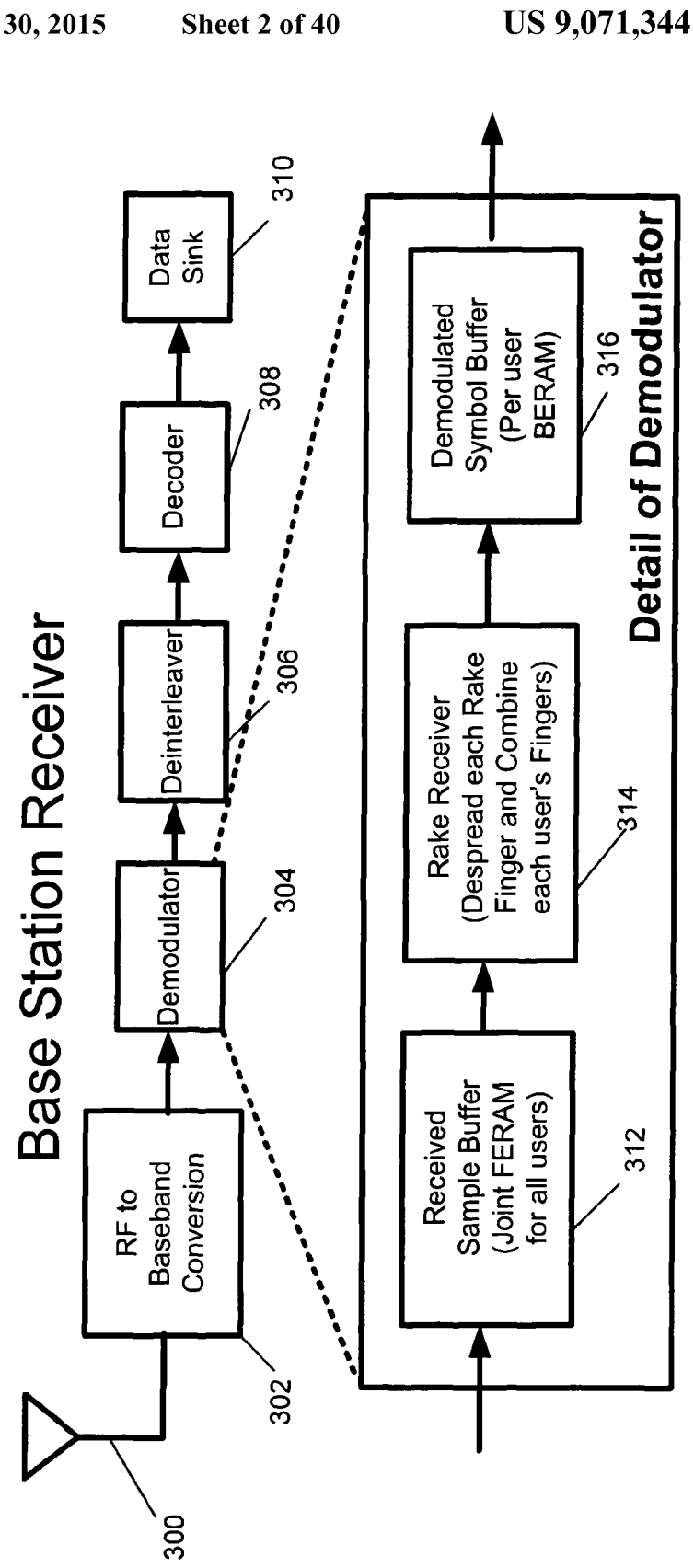

REVERSE LINK INTERFERENCE CANCELLATION

CLAIM OF PRIORITY UNDER 35 U.S.C. §119

The present application claims priority to four co-assigned U.S. Provisional Application Nos. 60/710,405, entitled "A METHOD TO REMOVE REVERSE LINK INTER-CELL INTERFERENCE," filed on Aug. 22, 2005; 60/713,549, entitled "REVERSE LINK INTER-CELL INTERFERENCE CANCELLATION," filed on Aug. 31, 2005; 60/710, 370, entitled "A METHOD OF INTERFERENCE CANCELLATION," filed on Aug. 22, 2005; and 60/713,517, entitled "SYSTEM WITH MULTIPLE SIGNAL RECEIVING UNITS AND A CENTRAL PROCESSOR WITH INTERFERENCE CANCELLATION," filed on Aug. 31, 2005, which are hereby incorporated herein by reference in their entireties.

FIELD

The present invention relates to wireless communication systems generally, and specifically to interference cancellation in wireless communication systems.

BACKGROUND

A communication system may provide communication between base stations and access terminals. Forward link or downlink refers to transmission from a base station to an access terminal. Reverse link or uplink refers to transmission from an access terminal to a base station. Each access terminal may communicate with one or more base stations on the forward and reverse links at a given moment, depending on whether the access terminal is active and whether the access terminal is in soft handoff.

BRIEF DESCRIPTION OF DRAWINGS

The features, nature, and advantages of the present application may be more apparent from the detailed description set forth below with the drawings. Like reference numerals and characters may identify the same or similar objects.

FIG. 2 illustrates an example of transmitter structure and/or process, which may be implemented at an access terminal of FIG. 1.

FIG. 3 illustrates an example of a receiver process and/or structure, which may be implemented at a base station of FIG. 1.

DETAILED DESCRIPTION

Any embodiment described herein is not necessarily preferable or advantageous over other embodiments. While various aspects of the present disclosure are presented in drawings, the drawings are not necessarily drawn to scale or drawn to be all-inclusive.

Figure 1:
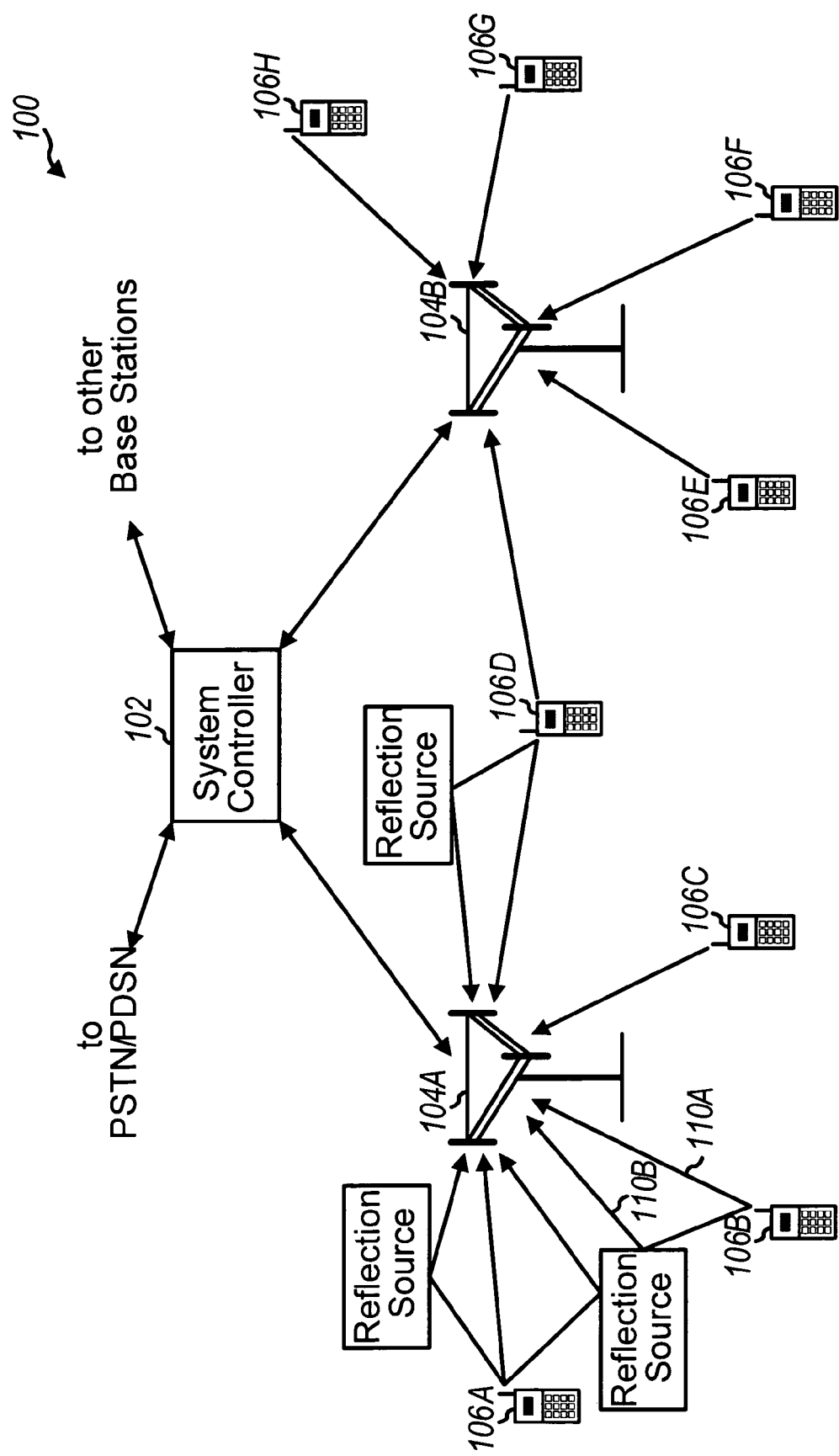
FIG. 1 illustrates a wireless communication system with base stations and access terminals.

FIG. 1 illustrates a wireless communication system 100, which includes a system controller 102, base stations 104A-104B, and a plurality of access terminals 106A-106H. The system 100 may have any number of controllers 102, base stations 104 and access terminals 106. Various aspects and embodiments of the present disclosure described below may be implemented in the system 100.

Access terminals 106 may be mobile or stationary and may be dispersed throughout the communication system 100 of FIG. 1. An access terminal 106 may be connected to or implemented in a computing device, such as a laptop personal computer. Alternatively, an access terminal may be a self-contained data device, such as a personal digital assistant (PDA). An access terminal 106 may refer to various types of devices, such as a wired phone, a wireless phone, a cellular phone, a lap top computer, a wireless communication personal computer (PC) card, a PDA, an external or internal modem, etc. An access terminal may be any device that provides data connectivity to a user by communicating through a wireless channel or through a wired channel, for example using fiber optic or coaxial cables. An access terminal may have various names, such as mobile station, access unit, subscriber unit, mobile device, mobile terminal, mobile unit, mobile phone, mobile, remote station, remote terminal, remote unit, user device, user equipment, handheld device, etc.

The system 100 provides communication for a number of cells, where each cell is serviced by one or more base stations 104. A base station 104 may also be referred to as a base station transceiver system (BTS), an access point, a part of an access network, a modem pool transceiver (MPT), or a Node B. Access network refers to network equipment providing data connectivity between a packet switched data network (e.g., the Internet) and the access terminals 106.

Forward link (FL) or downlink refers to transmission from a base station 104 to an access terminal 106. Reverse link (RL) or uplink refers to transmission from an access terminal 106 to a base station 104.

A base station 104 may transmit data to an access terminal 106 using a data rate selected from a set of different data rates. An access terminal 106 may measure a signal-to-interference-and-noise ratio (SINR) of a pilot signal sent by the base station 104 and determine a desired data rate for the base station 104 to transmit data to the access terminal 106. The access terminal 106 may send data request channel or data rate control (DRC) messages to the base station 104 to inform the base station 104 of the desired data rate.

The system controller 102 (also referred to as a base station controller (BSC)) may provide coordination and control for base stations 104, and may further control routing of calls to access terminals 106 via the base stations 104. The system controller 102 may be further coupled to a public switched telephone network (PSTN) via a mobile switching center (MSC), and to a packet data network via a packet data serving node (PDSN).

The communication system 100 may use one or more communication techniques, such as code division multiple access (CDMA), IS-95, High Rate Packet Data (HRPD), also referred to as High Data Rate (HDR), as specified in "cdma2000 High Rate Packet Data Air Interface Specification," TIA/EIA/IS-856, CDMA 1x Evolution Data Optimized (EV-DO), 1xEV-DV, Wideband CDMA (WCDMA), Universal Mobile Telecommunications System (UMTS), Time Division Synchronous CDMA (TD-SCDMA), Orthogonal Frequency Division Multiplexing (OFDM), etc. The examples described below provide details for clarity of understanding. The ideas presented herein are applicable to other systems as well, and the present examples are not meant to limit the present application.

FIG. 2 illustrates an example of transmitter structure and/or process, which may be implemented at an access terminal 106 of FIG. 1. The functions and components shown in FIG. 2 may be implemented by software, hardware, or a combination of software and hardware. Other functions may be added to FIG. 2 in addition to or instead of the functions shown in FIG. 2.

A data source 200 provides data to an encoder 202, which encodes data bits using one or more coding schemes to provide coded data chips. Each coding scheme may include one or more types of coding, such as cyclic redundancy check (CRC), convolutional coding, Turbo coding, block coding, other types of coding, or no coding at all. Other coding schemes may include automatic repeat request (ARQ), hybrid ARQ (H-ARQ), and incremental redundancy repeat techniques. Different types of data may be coded with different coding schemes. An interleaver 204 interleaves the coded data bits to combat fading.

A modulator 206 modulates coded, interleaved data to generate modulated data. Examples of modulation techniques include binary phase shift keying (BPSK) and quadrature phase shift keying (QPSK). The modulator 206 may also repeat a sequence of modulated data or a symbol puncture unit may puncture bits of a symbol. The modulator 206 may also spread the modulated data with a Walsh cover (i.e., Walsh code) to form data chips. The modulator 206 may also time-division multiplex the data chips with pilot chips and MAC chips to form a stream of chips. The modulator 206 may also use a pseudo random noise (PN) spreader to spread the stream of chips with one or more PN codes (e.g., short code, long code).

A baseband-to-radio-frequency (RF) conversion unit 208 may convert baseband signals to RF signals for transmission via an antenna 210 over a wireless communication link to one or more base stations 104.

FIG. 3 illustrates an example of a receiver process and/or structure, which may be implemented at a base station 104 of FIG. 1. The functions and components shown in FIG. 3 may be implemented by software, hardware, or a combination of software and hardware. Other functions may be added to FIG. 3 in addition to or instead of the functions shown in FIG. 3.

One or more antennas 300 receive the reverse link modulated signals from one or more access terminals 106. Multiple antennas may provide spatial diversity against deleterious path effects such as fading. Each received signal is provided to a respective receiver or RF-to-baseband conversion unit 302, which conditions (e.g., filters, amplifies, downconverts) and digitizes the received signal to generate data samples for that received signal.

A demodulator 304 may demodulate the received signals to provide recovered symbols. For cdma2000, demodulation tries to recover a data transmission by (1) channelizing the despread samples to isolate or channelize the received data and pilot onto their respective code channels, and (2) coherently demodulating the channelized data with a recovered pilot to provide demodulated data. Demodulator 304 may include a received sample buffer 312 (also called joint front-end RAM (FERAM) or sample RAM) to store samples of received signals for all users/access terminals, a rake receiver 314 to despread and process multiple signal instances, and a demodulated symbol buffer 316 (also called back-end RAM (BERAM) or demodulated symbol RAM). There may be a plurality demodulated symbol buffers 316 to correspond to the plurality of users/access terminals.

A deinterleaver 306 deinterleaves data from the demodulator 304.

A decoder 308 may decode the demodulated data to recover decoded data bits transmitted by the access terminal 106. The decoded data may be provided to a data sink 310.

Figure 4:
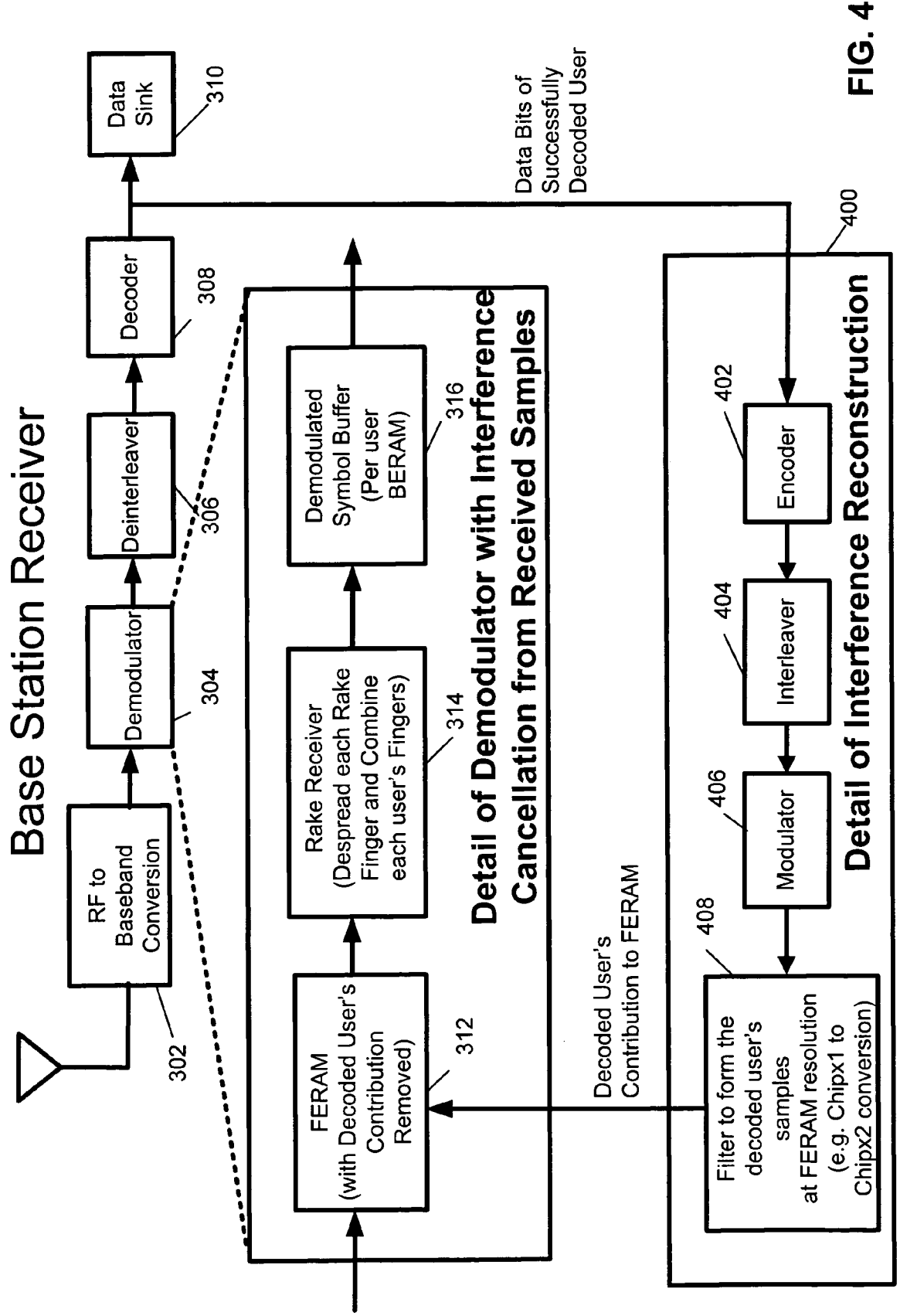
FIG. 4 illustrates another embodiment of a base station receiver process or structure.

FIG. 4 illustrates another embodiment of a base station receiver process or structure. In FIG. 4, data bits of successfully decoded user are input to an interference reconstruction unit 400, which includes an encoder 402, interleaver 404, modulator 406 and filter 408. The encoder 402, interleaver 404, and modulator 406 may be similar to the encoder 202, interleaver 204, and modulator 206 of FIG. 2. The filter 408 forms the decoded user's samples at FERAM resolution, e.g., change from chip rate to 2× chip rate. The decoder user's contribution to the FERAM is them removed or canceled from the FERAM 312.

Although interference cancellation at a base station 104 is described below, the concepts herein may be applied to an access terminal 106 or any other component of a communication system.

Traffic Interference Cancellation

The capacity of a CDMA reverse link may be limited by the interference between users since the signals transmitted by different users are not orthogonal at the BTS 104. Therefore, techniques that decrease the interference between users will improve the system performance of a CDMA reverse link. Techniques are described herein for the efficient implementation of interference cancellation for advanced CDMA systems such as cdma2000 1xEV-DO Rev.A.

Each DO Rev.A user transmits traffic, pilot, and overhead signals, all of which may cause interference to other users. As FIG. 4 shows, signals may be reconstructed and subtracted from the front-end RAM 312 at the BTS 104. The transmitted pilot signal is known at the BTS 104 and may be reconstructed based on knowledge about the channel. However, the overhead signals (such as reverse rate indicator (RRI), data request channel or data rate control (DRC), data source channel (DSC), acknowledgement (ACK)) are first demodulated and detected, and the transmitted data signals are demodulated, de-interleaved, and decoded at the BTS 104 in order to determine the transmitted overhead and traffic chips. Based on determining the transmitted chips for a given signal, the reconstruction unit 400 may then reconstruct the contribution to the FERAM 312 based on channel knowledge.

Bits of a data packet from the data source 200 may be repeated and processed by the encoder 202, interleaver 204 and/or modulator 206 into a plurality of corresponding "subpackets" for transmitting to the base station 104. If the base station 104 receives a high signal-to-noise-ratio signal, the first subpacket may contain sufficient information for the base station 104 to decode and derive the original data packet. For example, a data packet from the data source 200 may be repeated and processed into four subpackets. The user terminal 106 sends a first subpacket to the base station 104. The base station 104 may have a relatively low probability of correctly decoding and deriving the original data packet from the first received subpacket. But as the base station 104 receives the second, third and fourth subpackets and combines information derived from each received subpacket, the probability of decoding and deriving the original data packet increases. As soon as the base station 104 correctly decodes the original packet (e.g., using a cyclic redundancy check (CRC) or other error detection techniques), the base station 104 sends an acknowledgement signal to the user terminal 106 to stop sending subpackets. The user terminal 106 may then send a first subpacket of a new packet.

The reverse link of DO-Rev.A employs H-ARQ (FIG. 7), where each 16-slot packet is broken into 4 subpackets and transmitted in an interlaced structure with 8 slots between subpackets of the same interlace. Furthermore, different users/access terminals 106 may begin their transmissions on different slot boundaries, and therefore the 4-slot subpackets of different users arrive at the BTS asynchronously. The effects of asynchronism and an efficient design of interference cancellation receivers for H-ARQ and CDMA are described below.

The gains from interference cancellation depend on the order in which signals are removed from the FERAM 312. Techniques are disclosed herein related to decoding (and subtracting if CRC passes) users based on traffic-to-pilot (T2P) ratios, effective SINR, or probability of decoding. Various approaches are disclosed herein for re-attempting the demodulation and decoding of users after others have been removed from the FERAM 312. Interference cancellation from the BTS FERAM 312 may be efficiently implemented to account for asynchronous CDMA systems, such as EV-DO Rev.A, where users transmit pilot signals, control signals, and traffic signals using Hybrid-ARQ. This disclosure may also apply to EV-DV Rel. D, W-CDMA EUL, and cdma2000.

Traffic interference cancellation (TIC) may be defined as subtractive interference cancellation which removes the contribution of a user's data to the FERAM 312 after that user has decoded correctly (FIG. 4). Some of the practical problems associated with TIC on actual CDMA systems such as cdma2000, EV-DO, EV-DV, and WCDMA are addressed herein. Many of these problems are caused by the fact that real systems have user asynchrony and Hybrid ARQ. For example, cdma2000 intentionally spreads user data frames uniformly in time to prevent excess delay in the backhaul network. Rev.A of EV-DO, Rel. D of EV-DV, and EUL of WCDMA also use Hybrid ARQ which introduces more than one possible data length.

Multi-user detection is the main category of algorithms under which TIC falls, and refers to any algorithm which attempts to improve performance by allowing the detection of two different users to interact. A TIC method may involve a hybrid of successive interference cancellation (also called sequential interference cancellation or SIC) and parallel interference cancellation. "Successive interference cancellation" refers to any algorithm which decodes users sequentially and uses the data of previously decoded users to improve performance. "Parallel interference cancellation" refers broadly to decoding users at the same time and subtracting all decoded users at the same time.

TIC may be different than pilot interference cancellation (PIC). One difference between TIC and PIC is that the transmitted pilot signal is known perfectly by the receiver in advance. Therefore, PIC may subtract the pilot contribution to the received signal using only channel estimates. A second major difference is that the transmitter and the receiver interact closely on the traffic channel through the H-ARQ mechanism. The receiver does not know the transmitted data sequence until a user is successfully decoded.

Similarly, it is desirable to remove overhead channels from the front-end RAM, in a technique called overhead interference cancellation (OIC). Overhead channels cannot be removed until the BTS 104 knows the transmitted overhead data, and this is determined by decoding and then reforming the overhead messages.

Successive interference cancellation defines a class of methods. The chain rule of mutual information shows that, under ideal conditions, successive interference cancellation may achieve the capacity of a multiple access channel. The main conditions for this are that all users are frame synchronous and each user's channel may be estimated with negligible error.

Figure 5:
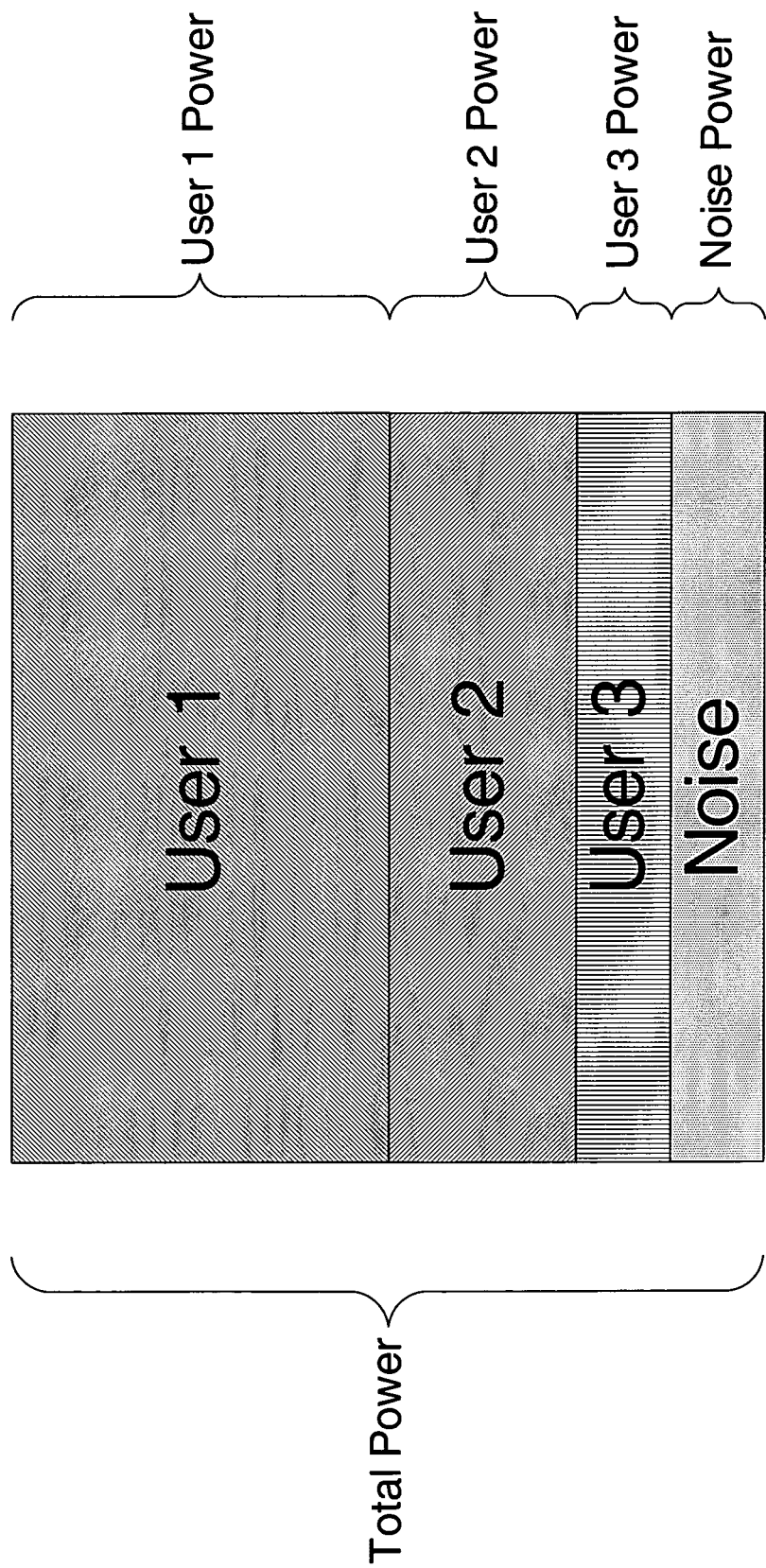
FIG. 5 illustrates a general example of power distribution of three users in the system of FIG. 1.

FIG. 5 illustrates a general example of power distribution of three users (user 1, user 2, user 3), where the users transmit frames synchronously (frames from all users are received at the same time), and each user is transmitting at the same data rate. Each user is instructed to use a particular transmit power, e.g., user 3 transmits at a power substantially equal to noise; user 2 transmits at a power substantially equal to user 3's power plus noise; and user 1 transmits at a power substantially equal to user 2 plus user 3 plus noise.

The receiver process signals from the users in decreasing order by transmit power. Starting with k=1 (user 1 with highest power), the receiver attempts to decode for user 1. If decoding is successful, then user 1's contribution to the received signal is formed and subtracted based on his channel estimate. This may be called frame synchronous sequential interference cancellation. The receiver continues until decoding has been attempted for all users. Each user has the same SINR after interference cancellation of the previously decoded users' successive interference cancellation.

Unfortunately, this approach may be very sensitive to decoding errors. If a single large power user, such as user 1, does not decode correctly, the signal-to-interference-plus-noise ratio (STIR) of all following users may be severely degraded. This may prevent all users after that point from decoding. Another drawback of this approach is that it requires users to have particular relative powers at the receiver, which is difficult to ensure in fading channels.

Frame Asynchronism and Interference Cancellation, e.g. cdma2000

Suppose that user frame offsets are intentionally staggered with respect to each other. This frame asynchronous operation has a number of benefits to the system as a whole. For example, processing power and network bandwidth at the receiver would then have a more uniform usage profile in time. In contrast, frame synchronism among users requires a burst of processing power and network resources at the end of each frame boundary since all users would finish a packet at the same time. With frame asynchronism, the BTS 104 may decode the user with the earliest arrival time first rather than the user with the largest power.

Figure 6:
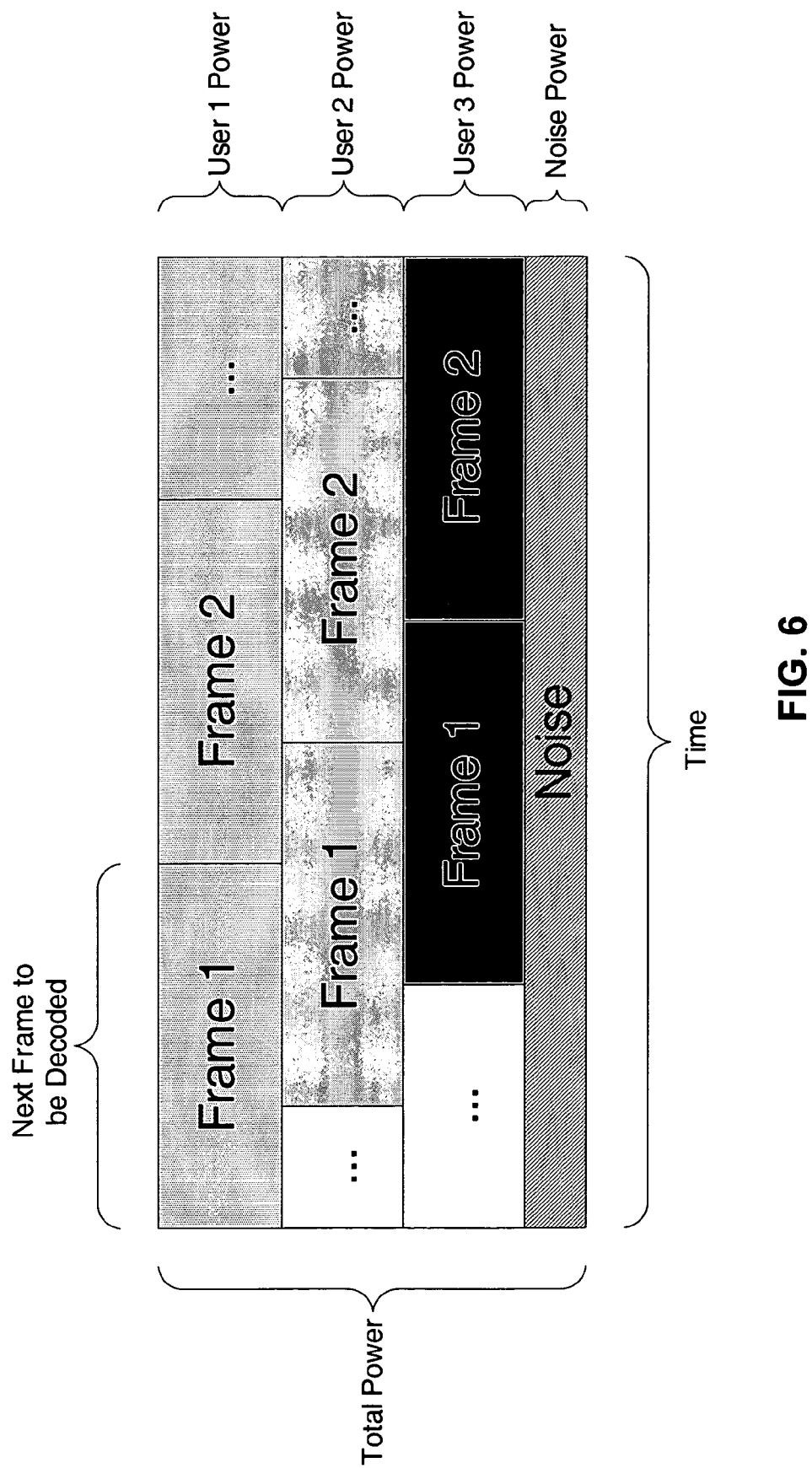
FIG. 6 illustrates an example of a uniform time-offset distribution for frame asynchronous traffic interference cancellation for users with equal transmit power.

FIG. 6 shows an example of a uniform time-offset distribution for frame asynchronous TIC for users with equal transmit power. FIG. 6 depicts a snapshot of a time instant right before frame 1 of user 1 is to be decoded. Since frame 0 has already been decoded and canceled for all users, its contribution to the interference is shown crosshatched (users 2 and 3). In general, this approach reduces the interference by a factor of 2. Half of the interference has been removed by TIC before decoding Frame 1 of User 1.

In another embodiment, the users in FIG. 6 may refer to groups of users, e.g., user group 1, user group 2, user group 3.

A benefit of asynchronism and interference cancellation is the relative symmetry between users in terms of power levels and error statistics if they want similar data rates. In general sequential interference cancellation with equal user data rates, the last user is received with very low power and is also quite dependent of the successful decoding of all prior users.

Asynchronism, Hybrid ARO and Interlacing, e.g. EV-DO Rev. A

Figure 7:
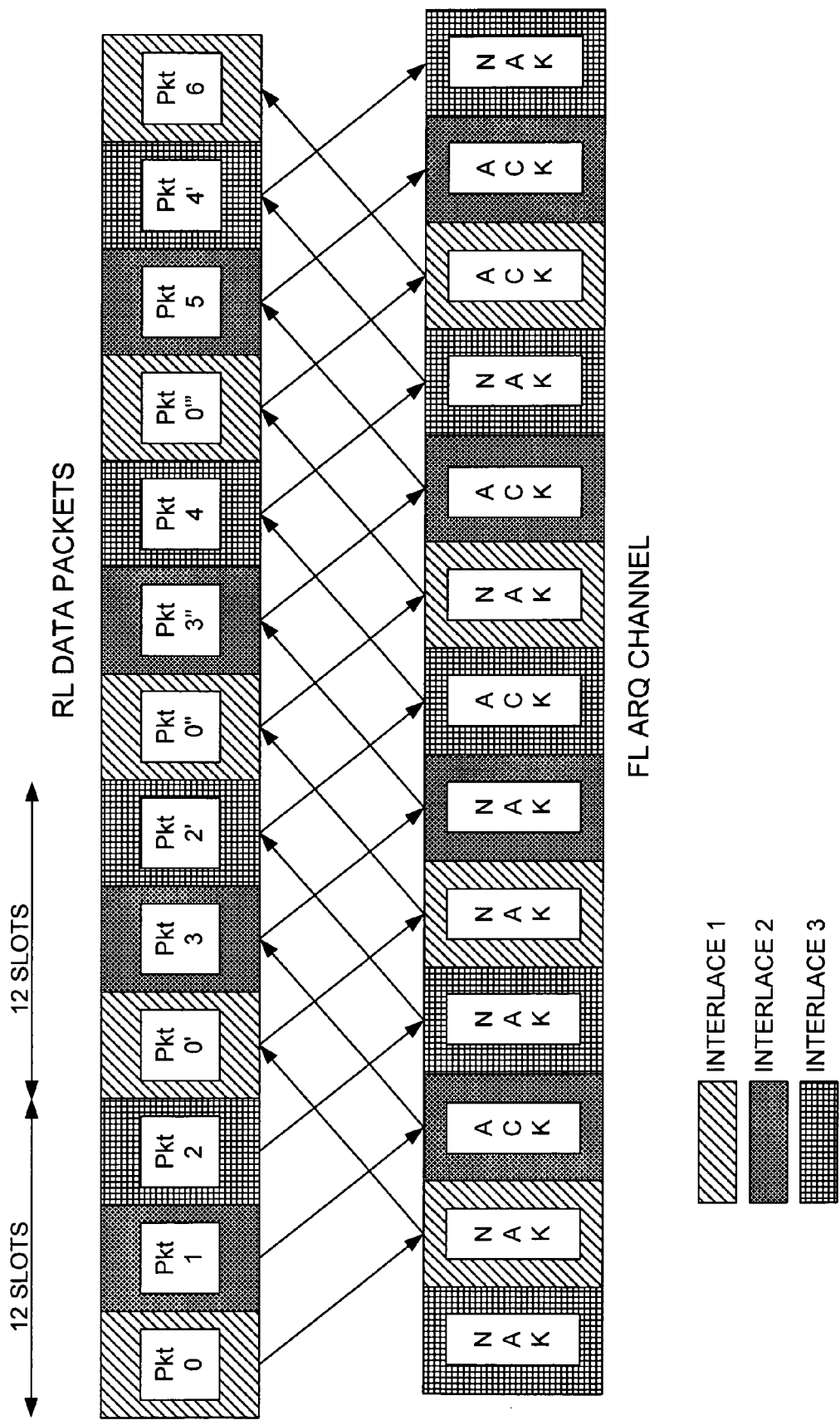
FIG. 7 illustrates an interlacing structure used for the reverse link data packets and a forward link automatic repeat request channel.

FIG. 7 illustrates an interlacing structure (e.g., in 1xEV-DO Rev.A) used for RL data packets and a FL ARQ channel. Each interlace (interlace 1, interlace 2, interlace 3) comprises a set of time-staggered segments. In this example, each segment is four time slots long. During each segment, a user terminal may transmit a subpacket to the base station. There are three interlaces, and each segment is four time slots long. Thus, there are eight time slots between the end of a subpacket of a given interlace and the beginning of the next subpacket of the same interlace. This gives enough time for the receiver to decode the subpacket and relay an ACK or negative acknowledgement (NAK) to the transmitter.

Hybrid ARQ takes advantage of the time-varying nature of fading channels. If the channel conditions are good for the first 1, 2 or 3 subpackets, then the data frame may be decoded using only those subpackets, and the receiver sends an ACK to the transmitter. The ACK instructs the transmitter not to send the remaining subpacket(s), but rather to start a new packet if desired.

Receiver Architectures for Interference Cancellation

With TIC, the data of decoded users is reconstructed and subtracted (FIG. 4) so the BTS 104 may remove the interference the data of decoded users causes to other users. A TIC receiver may be equipped with two circular memories: the FERAM 312 and the BERAM 316.

The FERAM 312 stores received samples (e.g., at 2× chip rate) and is common to all users. A non-TIC receiver would only use a FERAM of about 1-2 slots (to accommodate delays in the demodulation process) since no subtraction of traffic or overhead interference takes place. In a TIC receiver for a system with H-ARQ, the FERAM may span many slots, e.g., 40 slots, and is updated by TIC through the subtraction of interference of decoded users. In another configuration, the FERAM 312 may have a length that spans less than a full packet, such as a length that spans a time period from a beginning of a subpacket of a packet to an end of a subsequent subpacket of the packet.

The BERAM 316 stores demodulated symbols of the received bits as generated by the demodulator's rake receiver 314. Each user may have a different BERAM, since the demodulated symbols are obtained by despreading with the user-specific PN sequence, and combining across RAKE fingers. Both a TIC and non-TIC receiver may use a BERAM 316. The BERAM 316 in TIC is used to store demodulated symbols of previous subpackets that are no longer stored in a FERAM 312 when the FERAM 312 does not span all subpackets. The BERAM 316 may be updated either whenever an attempt to decode takes place or whenever a slot exists from the FERAM 312.

Methods for Choosing the FERAM Length

The size of the BERAM 316 and FERAM 312 may be chosen according to various trade-offs between required processing power, transfer bandwidth from the memories to the processors, delays and performance of the system. In general, by using a shorter FERAM 312 the benefits of TIC will be limited, since the oldest subpacket will not be updated. On the other hand, a shorter FERAM 312 yields a reduced number of demodulations, subtractions and a lower transfer bandwidth.

With the Rev.A interlacing, a 16-slot packet (four subpackets, each subpacket transmitted in 4 slots) would span 40 slots. Therefore, a 40-slot FERAM may be used to ensure removal of a user from all affected slots.

Figure 8:
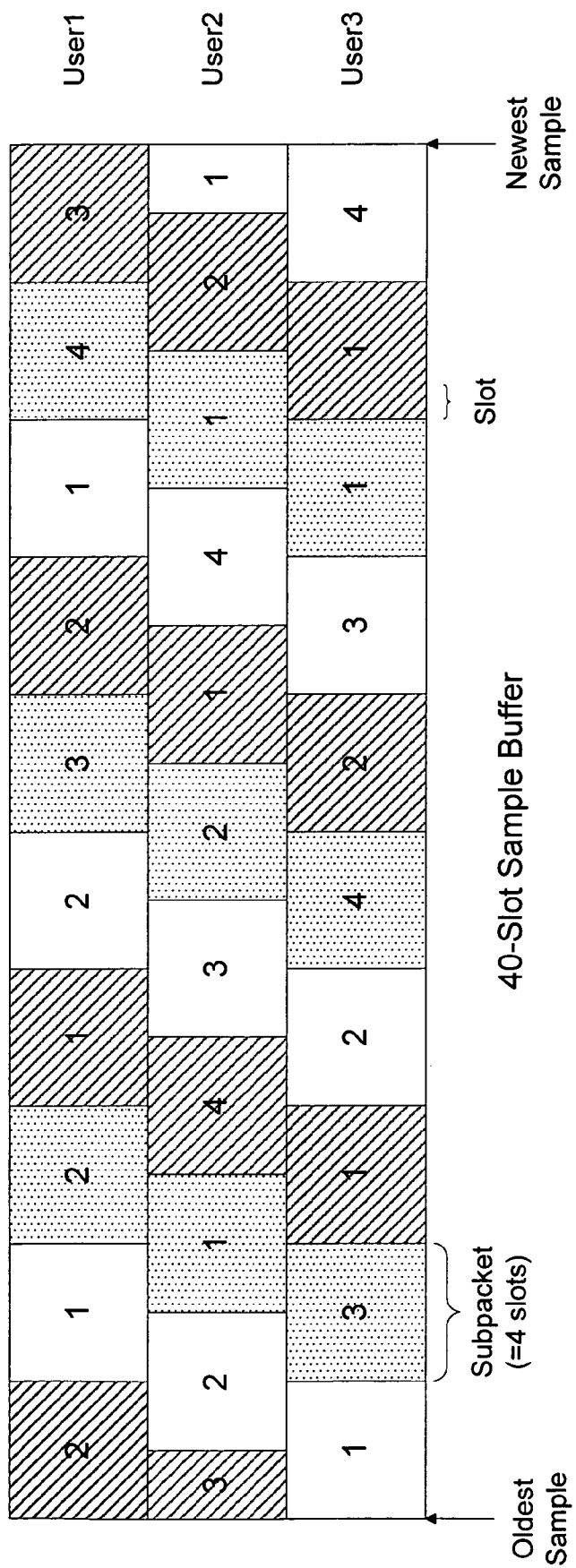
FIG. 8 illustrates a memory that spans a complete 16-slot packet.

FIG. 8 illustrates a 40-slot FERAM 312 that spans a complete 16-slot packet for EV-DO Rev.A. Whenever a new subpacket is received, decoding is attempted for that packet using all the available subpackets stored in the FERAM 312. If decoding is successful, then the contribution of that packet is canceled from the FERAM 312 by reconstructing and subtracting the contribution of all component subpackets (1, 2, 3, or 4). For DO-Rev.A FERAM lengths of 4, 16, 28, or 40 slots would span 1, 2, 3, or 4 subpackets, respectively. The length of the FERAM implemented at the receiver may depend on complexity considerations, the need to support various user arrival times, and the capability of re-doing the demodulation and decoding of users on previous frame offsets.

Figure 9A:
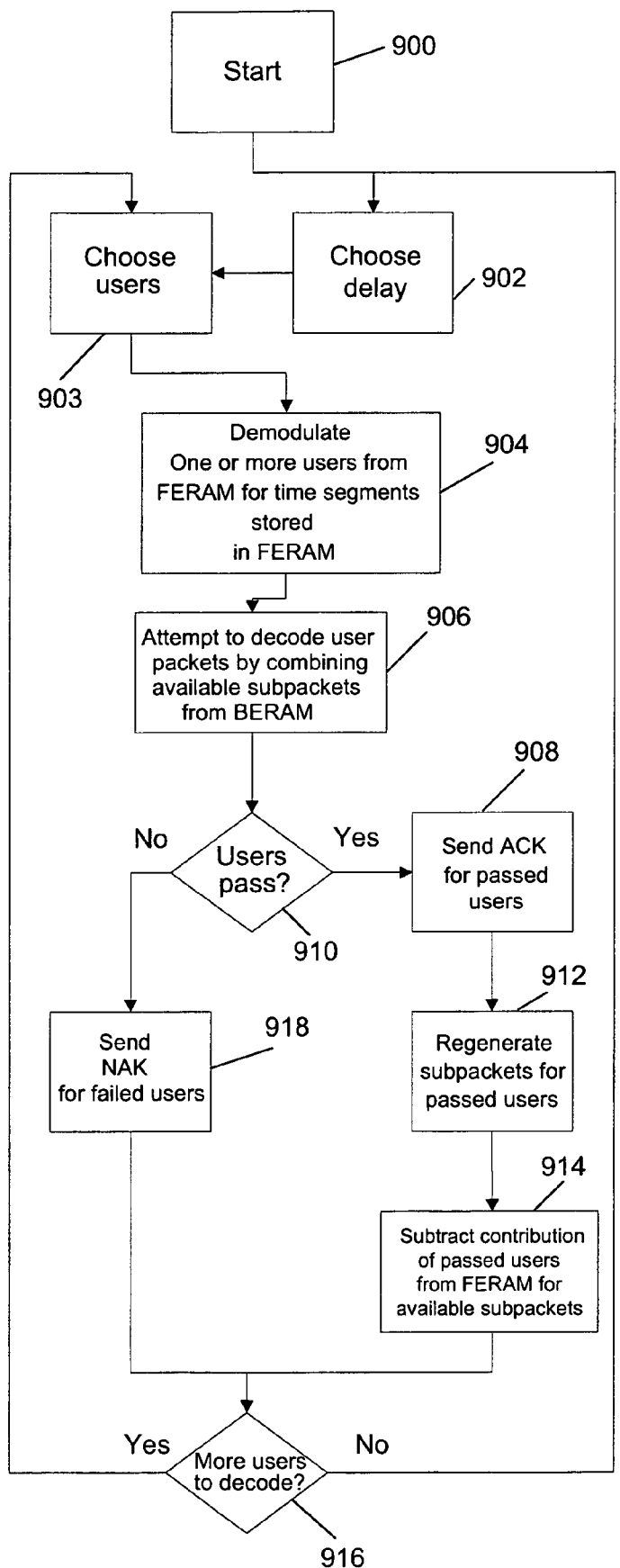
FIG. 9A illustrates a method of traffic interference cancellation for an example of sequential interference cancellation (SIC) with no delayed decoding.

FIG. 9A illustrates a general method of TIC for an example of sequential interference cancellation (SIC) with no delayed decoding. Other enhancements will be described below. The process starts at a start block 900 and proceeds to a choose delay block 902. In SIC, the choose delay block 902 may be omitted. In block 903, the BTS 104 chooses one user (or a group of users) among those users that terminate a subpacket in the current slot.

In block 904, demodulator 304 demodulates samples of the chosen user's subpackets for some or all time segments stored in the FERAM 312 according to the user's spreading and scrambling sequence, as well as to its constellation size. In block 906, the decoder 308 attempts to decode the user packet using the previously demodulated symbols stored in BERAM 316 and the demodulated FERAM samples.

In block 910, the decoder 308 or another unit may determine whether the user(s)'s packet was successfully decoded, i.e., passes an error check, such as using a cyclic redundancy code (CRC).

If the user packet fails to decode, a NAK is sent back to the access terminal 106 in block 918. If the user packet is correctly decoded, an ACK is sent to the access terminal 106 in block 908 and interference cancellation (IC) is performed in blocks 912-914. Block 912 regenerates the user signal according to the decoded signal, the channel impulse response and the transmit/receive filters. Block 914 subtracts the contribution of the user from the FERAM 312, thus reducing its interference on users that have not yet been decoded.

Upon both failure and success in the decoding, the receiver moves to the next user to be decoded in block 916. When an attempt to decode has been performed on all users, a new slot is inserted into the FERAM 312 and the entire process is repeated on the next slot. Samples may be written into the FERAM 312 in real time, i.e., the 2× chip rate samples may be written in every ½ chip.

Figure 9B:
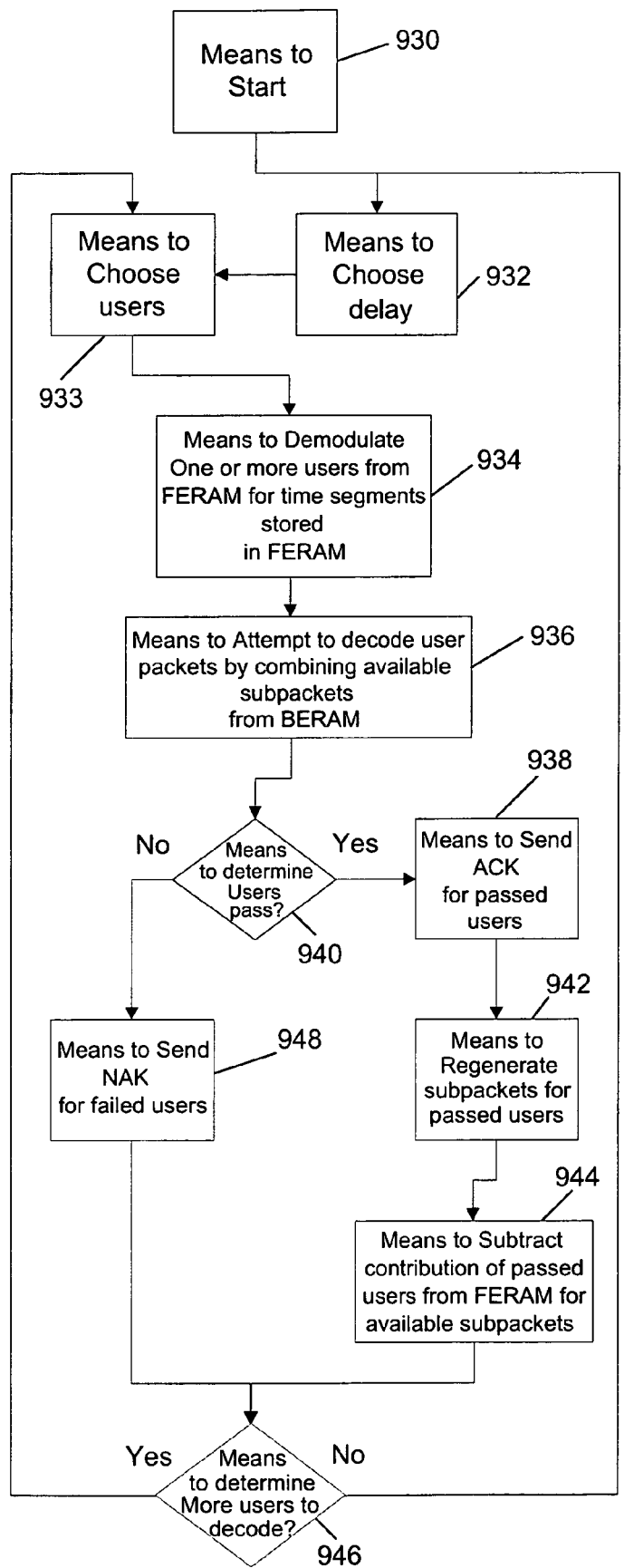
FIG. 9B illustrates an apparatus to perform the method of FIG. 9A.

FIG. 9B illustrates an apparatus comprising means 930-946 to perform the method of FIG. 9A. The means 930-946 in FIG. 9B may be implemented in hardware, software or a combination of hardware and software.

Methods for Choosing a Decoding Order

Block 903 indicates TIC may be applied either sequentially to each user or parallel to groups of users. As groups grow larger, the implementation complexity may decrease but the benefits of TIC may decrease unless TIC is iterated as described below.

The criteria according to which users are grouped and/or ordered may vary according to the rate of channel variation, the type of traffic and the available processing power. Good decoding orders may include first decoding users who are most useful to remove and who are most likely to decode. The criteria for achieving the largest gains from TIC may include:

A. Payload Size and T2P: The BTS 104 may group or order users according to the payload size, and decode in order starting from those with highest transmit power, i.e., highest T2P to those with lowest T2P. Decoding and removing high T2P users from the FERAM 312 has the greatest benefit since they cause the most interference to other users.

B. SINR: The BTS 104 may decode users with higher SINR before users with lower SINR since users with higher SINR have a higher probability of decoding. Also, users with similar SINR may be grouped together. In case of fading channels, the SINR is time varying throughout the packet, and so an equivalent SINR may be computed in order to determine an appropriate ordering.

C. Time: The BTS 104 may decode "older" packets (i.e., those for which more subpackets have been received at the BTS 104) before "newer" packets. This choice reflects the assumption that for a given T2P ratio and ARQ termination goal, packets are more likely to decode with each incremental subpacket.

Methods for Re-Attempting Decoding

Whenever a user is correctly decoded, its interference contribution is subtracted from the FERAM 312, thus increasing the potential of correctly decoding all users that share some slots. It is advantageous to repeat the attempt to decode users that previously failed, since the interference they see may have dropped significantly. The choose delay block 902 selects the slot (current or in the past) used as reference for decoding and IC. The choose users block 903 will select users that terminate a subpacket in the slot of the chosen delay. The choice of delay may be based on the following options:

A. Current decoding indicates a choice of moving to the next (future) slot once all users have been attempted for decoding, and the next slot is available in the FERAM 312. In this case, each user is attempted to be decoded once per processed slot, and this would correspond to successive interference cancellation.

B. Iterative decoding attempts to decode users more than once per processed slot. The second and subsequent decoding iteration will benefit from the canceled interference of decoded users on previous iterations. Iterative decoding yields gains when multiple users are decoded in parallel without intervening IC. With pure iterative decoding on the current slot, the choose delay block 902 would simply select the same slot (i.e., delay) multiple times.

C. Backward decoding: The receiver demodulates subpackets and attempts to decode a packet based on demodulating all available subpackets in the FERAM corresponding to that packet. After attempting to decode packets with a subpacket that terminates in the current time slot (i.e., users on the current frame offset), the receiver may attempt to decode packets that failed decoding in the previous slot (i.e., users on the previous frame offset). Due to the partial overlap among asynchronous users, the removed interference of subpackets that terminate in the current slot will improve the chances of decoding past subpackets. The process may be iterated by going back more slots. The maximum delay in the forward link ACK/NAK transmission may limit backward decoding.

D. Forward decoding: After having attempted to decode all packets with subpackets that terminate in the current slot, the receiver may also attempt to decode the latest users before their full subpacket is written into the FERAM. For example, the receiver could attempt to decode users after 3 of their 4 slots of the latest subpacket have been received.

Methods for Updating the BERAM

In a non-TIC BTS receiver, packets are decoded based solely on the demodulated symbols stored in the BERAM, and the FERAM is used only to demodulate users from the most recent time segments. With TIC, the FERAM 312 is still accessed whenever the receiver attempts to demodulate a new user. However, with TIC, the FERAM 312 is updated after a user is correctly decoded based on reconstructing and subtracting out that user's contribution. Due to complexity considerations, it may be desirable to choose the FERAM buffer length to be less than the span of a packet (e.g., 40 slots are required to span a 16-slot packet in EV-DO Rev. A). As new slots are written into the FERAM 312, they would overwrite the oldest samples in the circular buffer. Therefore, as new slots are received the oldest slots are overwritten and the decoder 308 will use BERAM 316 for these old slots. It should be noted that even if a given subpacket is located in the FERAM 312, the BERAM 316 may be used to store the demodulator's latest demodulated symbols (determined from the FERAM 312) for that subpacket as an intermediate step in the interleaving and decoding process. There are two main options for the update of the BERAM 316:

A. User-based update: The BERAM 316 for a user is updated only in conjunction with a decoding attempted for that user. In this case, the update of the older FERAM slots might not benefit the BERAM 316 for a given user if that user is not decoded at an opportune time (i.e., the updated FERAM slots might slide out of the FERAM 312 before that user is attempted to be decoded).

B. Slot-based update: In order to fully exploit the benefits of TIC, the BERAM 316 for all affected users may be updated whenever a slot exits FERAM 312. In this case, the content of BERAM 316 includes all the interference subtraction done on the FERAM 312.

Methods for Canceling Interference from Subpackets that Arrive Due to a Missed ACK Deadline In general, the extra processing used by TIC introduces a delay in the decoding process, which is particularly relevant when either iterative or backward schemes are used. This delay may exceed the maximum delay at which the ACK may be sent to the transmitter in order to stop the transmission of subpackets related to the same packet. In this case, the receiver may still take advantage of successful decoding by using the decoded data to subtract not only the past subpackets but also those which will be received in the near future due to the missing ACK.

With TIC, the data of decoded users is reconstructed and subtracted so that the base station 104 may remove the interference it causes to other users' subpackets. With H-ARQ, whenever a new subpacket is received, decoding is attempted for the original packet. If decoding is successful, then for H-ARQ with TIC, the contribution of that packet may be canceled from the received samples by reconstructing and subtracting out the component subpackets. Depending on complexity considerations, it is possible to cancel interference from 1, 2, 3 or 4 subpackets by storing a longer history of samples. In general, IC may be applied either sequentially to each user or to groups of users.

Figure 10:
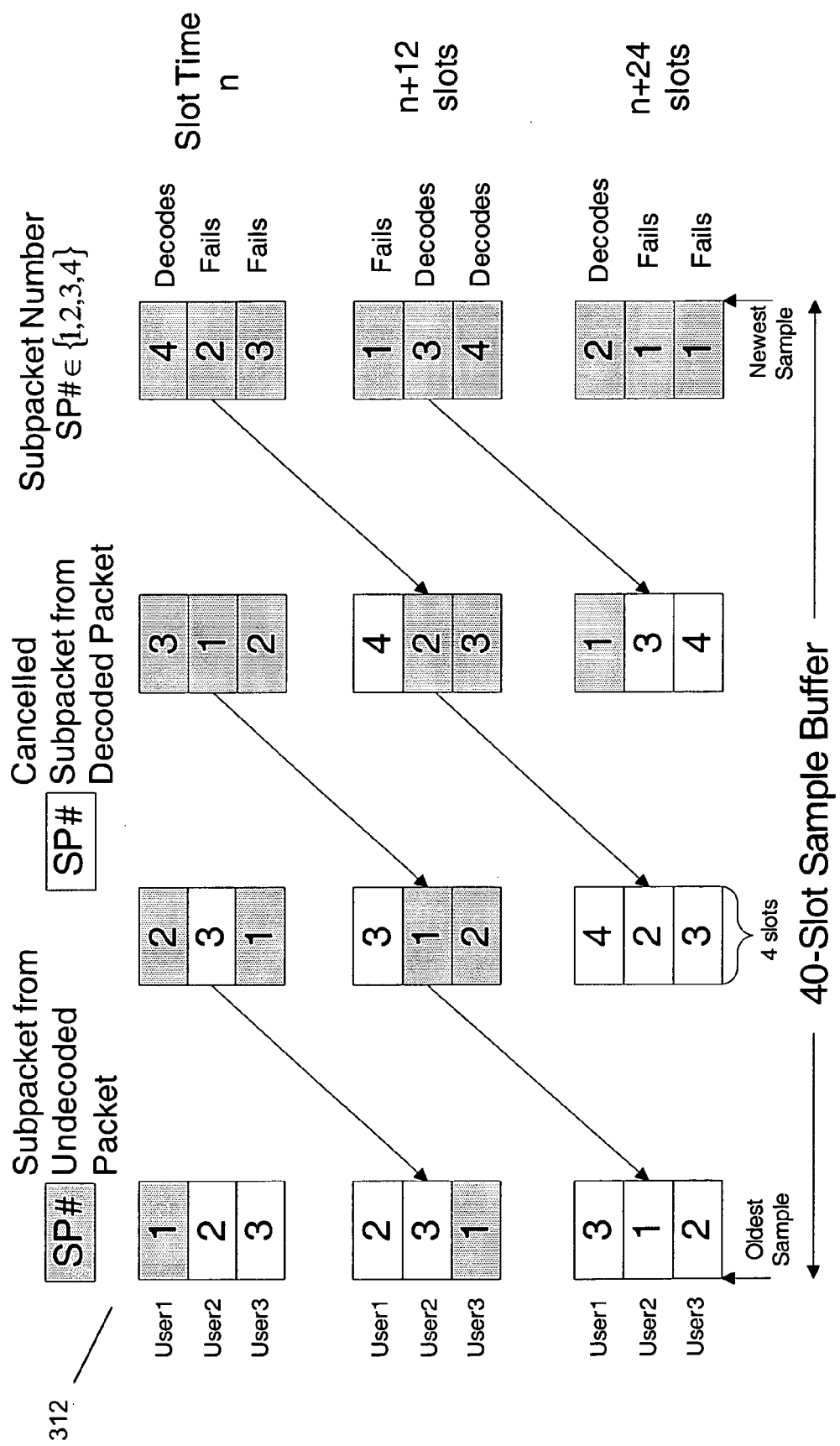
FIG. 10 illustrates a receiver sample buffer after arrival of successive subpackets of an interlace with interference cancellation of decoded subpackets.

FIG. 10 illustrates a receiver sample buffer 312 at three time instances: slot time n, n+12 slots and n+24 slots. For illustrative purposes, FIG. 10 shows a single interlace with subpackets from three Users who are on the same frame offset to highlight the interference cancellation operation with H-ARQ. The receiver sample buffer 312 in FIG. 10 spans all 4 subpackets (which may be achieved for EV-DO Rev. A by a 40-slot buffer since there are 8 slots between each 4-slot subpacket). Undecoded subpackets are shown as shaded. Decoded subpackets are shown as unshaded in the 40-slot buffer and are canceled. Each time instance corresponds to the arrival of another subpacket on the interlace. At slot time n, User 1's four stored subpackets are correctly decoded while the latest subpackets from Users 2 and 3 fail to decode.

At time instance n+12 slots, successive subpackets of the interlace arrive with interference cancellation of Users 1's decoded (unshaded) subpackets 2, 3 and 4. During time instance n+12 slots, packets from Users 2 and 3 successfully decode.

FIG. 10 applies IC to groups of users who are on the same frame offset, but does not perform successive interference cancellation within the group. In classical group IC, users in the same group do not see mutual interference cancellation. Therefore, as the number of users in a group grows larger, the implementation complexity decreases but there is a loss due to the lack of cancellation between users of the same group for the same decoding attempt. However, with H-ARQ, the receiver would attempt to decode all users in the group after each new subpacket arrives, allowing users in the same group to achieve mutual interference cancellation. For example, when the packet of User 1 decodes at time n, this helps the packets of Users 2 and 3 decode at time n+12, which further helps User 1 decode at time n+24. All subpackets of a previously decoded packet may be canceled before reattempting decode for the other users when their next subpackets arrive. A key point is that although particular users may always be in the same group, their subpackets see the IC gain when other group members decode.

Joint Interference Cancellation of Pilot, Overhead, and Traffic Channels

A problem addressed by this section is related to improving system capacity of a CDMA RL by efficiently estimating and canceling multi-user interference at the base station receiver. In general, a RL user's signal consists of pilot, overhead and traffic channels. This section describes a joint pilot, overhead, and traffic IC scheme for all users.

There two aspects described. First, overhead IC (OIC) is introduced. On the reverse link, overhead from each user acts as interference to signals of all other users. For each user, the aggregate interference due to overheads by all other users may be a large percentage of the total interference experienced by this user. Removing this aggregate overhead interference may further improve system performance (e.g., for a cdma2000 1xEV-DO Rev.A system) and increase reverse link capacity beyond performance and capacity achieved by PIC and TIC.

Second, important interactions among PIC, OIC, and TIC are demonstrated through system performance and hardware (HW) design tradeoffs. A few schemes are described on how to best combine all three cancellation procedures. Some may have more performance gain, and some may have more complexity advantage. For example, one of the described schemes removes all the pilot signals before decoding any overhead and traffic channels, then decodes and cancels the users' overhead and traffic channels in a sequential manner.

This section is based on cdma2000 1x EV-DO Rev.A systems and in general applies to other CDMA systems, such as W-CDMA, cdma2000 1x, and cdma2000 1x EV-DV.

Methods for Overhead Channels Cancellation

Figure 11:
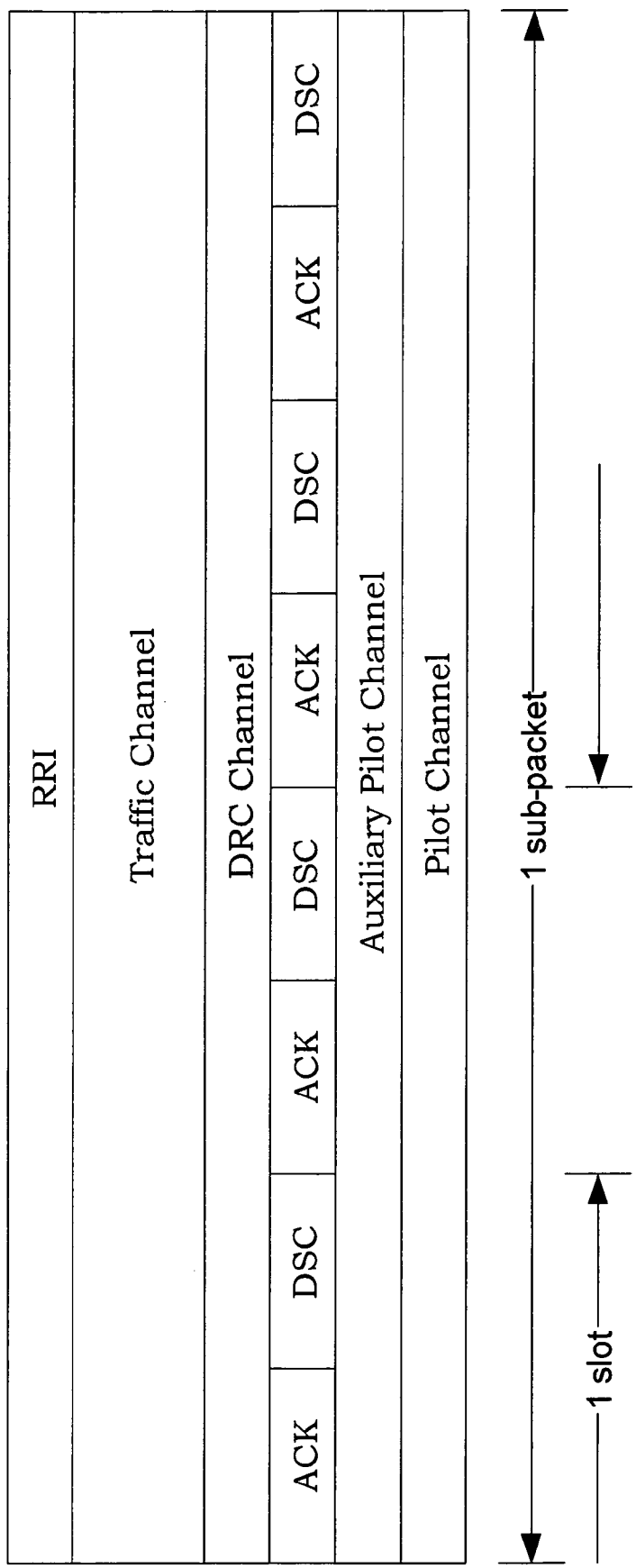
FIG. 11 illustrates an overhead channels structure.

FIG. 11 illustrates a RL overhead channels structure, such as for EV-DO Rev.A. There are two types of overhead channels: one type is to assist the RL demodulation/decoding which includes the RRI (reverse rate indicator) channel and the auxiliary pilot channel (used when payload size is 3072 bits or higher); the other type is to facilitate the forward link (FL) functioning which includes DRC (data rate control) channel, DSC (data source control), and ACK (acknowledge) channel. As shown in FIG. 11, ACK and DSC channels are time-multiplexed on a slot base. ACK channel is only transmitted when acknowledging a packet transmitted to the same user on FL.

Among the overhead channels, the data of the auxiliary pilot channel is known a priori at the receiver. Therefore, similar to primary pilot channel, no demodulation and decoding are necessary for this channel, and the auxiliary pilot channel may be reconstructed based on knowledge about the channel. The reconstructed auxiliary pilot may be at 2× chip rate resolution and may be represented as (over one segment)

Reconstructed auxiliary pilot signals      Equation 1

$$p_f[2n+\delta_f] = \sum_{\mu=-M}^{M} c_f[n-\mu]w_{f,aux}[n-\mu] \cdot G_{aux} \cdot (h_f\phi[8\mu - \alpha_f]),$$
$$n = 0, \ldots, 511$$
$$p_f[2n+\delta_f+1] = \sum_{\mu=-M}^{M} c_f[n-\mu]w_{f,aux}[n-\mu] \cdot G_{aux} \cdot (h_f\phi[8\mu + 4 - \alpha_f]),$$
$$n = 0, \ldots, 511,$$

where n corresponds to chip×1 sampling rate, f is the finger number, $c_f$ is the PN sequence, $w_{f,aux}$ is the Walsh code assigned to the auxiliary pilot channel, $G_{aux}$ is the relative gain of this channel to the primary pilot, $h_f$ is the estimated channel coefficient (or channel response) which is assumed to be a constant over one segment, $\phi$ is the filter function or convolution of the transmit pulse and the receiver low-pass filter of chip×8 resolution ($\phi$ is assumed non-negligible in $[-MT_c, MT_c]$), $\gamma_f$ is the chip×8 time offset of this finger with $\alpha_f = \gamma_f \mod 4$ and $\delta_f = \lfloor \gamma_f/4 \rfloor$.

The second group of overhead channels, which includes DRC, DSC, and RRI channels, are encoded by either bi-orthogonal codes or simplex codes. On the receiver side, for each channel, the demodulated outputs are first compared with a threshold. If the output is below the threshold, an erasure is declared and no reconstruction is attempted for this signal. Otherwise, they are decoded by a symbol-based maximum-likelihood (ML) detector, which may be inside the decoder 308 in FIG. 4. The decoded output bits are used for reconstruction of the corresponding channel, as shown in FIG. 4. The reconstructed signals for these channels are given as:

Reconstructed overhead (DRC, DSC, and      Equation 2
RRI) signals $$o_f[2n+\delta_f] = \sum_{\mu=-M}^{M} c_f[n-\mu]w_{f,o}[n-\mu] \cdot d_o G_o \cdot (h_f\phi[8\mu - \alpha_f]),$$
$$n = 0, \ldots, 511$$
$$o_f[2n+\delta_f+1] = \sum_{\mu=-M}^{M} c_f[n-\mu]w_{f,o}[n-\mu] \cdot d_o G_o \cdot (h_f\phi[8\mu + 4 - \alpha_f]),$$
$$n = 0, \ldots, 511.$$

Compared with Eq. 1, there is one new term $d_o$ which is the overhead channel data, $w_{f,o}$ is the Walsh cover, and $G_{aux}$ represents the overhead channel gain relative to the primary pilot.

The remaining overhead channel is the 1-bit ACK channel. It may be BPSK modulated, un-coded and repeated over half a slot. The receiver may demodulate the signal and make a hard-decision on the ACK channel data. The reconstruction signal model may be the same as Eq. 2.

Another approach to reconstruct the ACK channel signal assumes the demodulated and accumulated ACK signal, after normalization, may be represented as:

$$y = x + z,$$

where x is the transmitted signal, and z is the scaled noise term with variance of $\sigma^2$. Then, the log-likelihood ratio (LLR) of y is given as:

$$L = \ln \frac{Pr(x=1|y)}{Pr(x=-1|y)} = \frac{2}{\sigma^2} y.$$

Then, for the reconstruction purpose, a soft estimate of the transmitted bit may be:

$$\hat{x} = Pr(x=1) \cdot 1 + Pr(x=-1) \cdot (-1) = \frac{\exp(L)-1}{\exp(L)+1} = \tanh(L) = \tanh\left(\frac{2}{\sigma^2} y\right),$$

where the tan h function may be tabulated. The reconstructed ACK signal is very similar to Eq. 2 but with the exception of replacing $d_o$ by $\hat{x}$. In general, the soft estimate and cancellation approach should give a better cancellation performance since the receiver does not know the data for sure and this method brings the confidence level into picture. This approach in general may be extended to overhead channels mentioned above. However, the complexity of the maximum aposteriori probability (MAP) detector to obtain the LLR for each bit grows exponentially with the number of information bits in one code symbol.

One efficient way to implement overhead channel reconstruction is one finger, may scale each decoded overhead signal by its relative gain, cover it by the Walsh code, and sum them together, then spread by one PN sequence and filter through the channel-scaled filter $h\phi$ all at once. This method may save both computation complexity and memory bandwidth for subtraction purpose.

$$\sum_f c_f d_f \cdot h_f \phi \text{ becomes } \left(\sum_f c_f d_f \cdot h_f\right)\phi.$$

Joint PIC, OIC, and TIC

Joint PIC, OIC and TIC may be performed to achieve high performance and increase system capacity. Different decoding and cancellation orders of PIC, OIC and TIC may yield different system performance and different impacts on hardware design complexity.

PIC First then OIC and TIC Together (First Scheme)

Figure 12A:
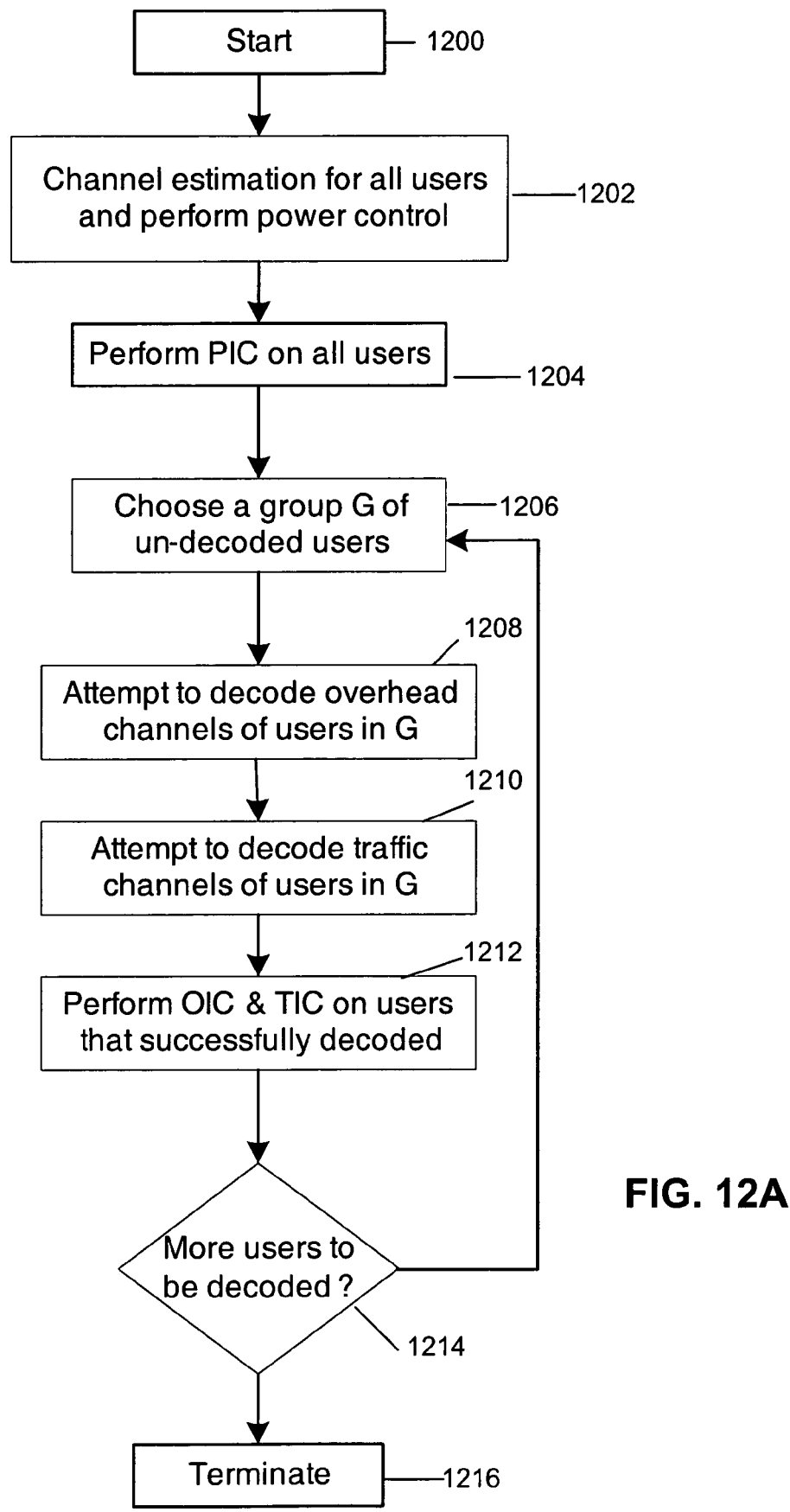
FIG. 12A illustrates a method to first perform pilot IC (PIC) and then perform overhead IC (OIC) and traffic IC (TIC) together.

FIG. 12A illustrates a method to first perform PIC and then perform OIC and TIC together. After a start block 1200, the receiver derives channel estimation for all users and performs power control in block 1202. Since the pilot data for all users are known at BTS, they may be subtracted once their channels are estimated in PIC block 1204. Therefore, all users' traffic channels and certain overhead channels observe less interference and are able to benefit from the in-front pilot cancellation.

Block 1206 chooses a group G of undecoded users, e.g., whose packets or subpackets terminate at current slot boundary. Blocks 1208-1210 perform overhead/traffic channel demodulation and decoding. In block 1212, only the successfully decoded channel data will be reconstructed and subtracted from the front-end RAM (FERAM) 312 shared by all users. Block 1214 checks whether there are more users to decode. Block 1216 terminates the process.

The decoding/reconstruction/cancellation may be in a sequential fashion from one user in a group to the next user in the group, which may be called successive interference cancellation. In this approach, users in late decoding order of the same group benefits from the cancellations of users in earlier decoding order. A simplified approach is to decode all users in the same group first, and then subtract their interference contributions all at once. The second approach or scheme (described below) allows both lower memory bandwidth and more efficient pipeline architecture. In both cases, the users' packets which do not terminate at the same slot boundary but overlap with this group of packets benefit from this cancellation. This cancellation may account for a majority of the cancellation gain in an asynchronous CDMA system.

Figure 12B:
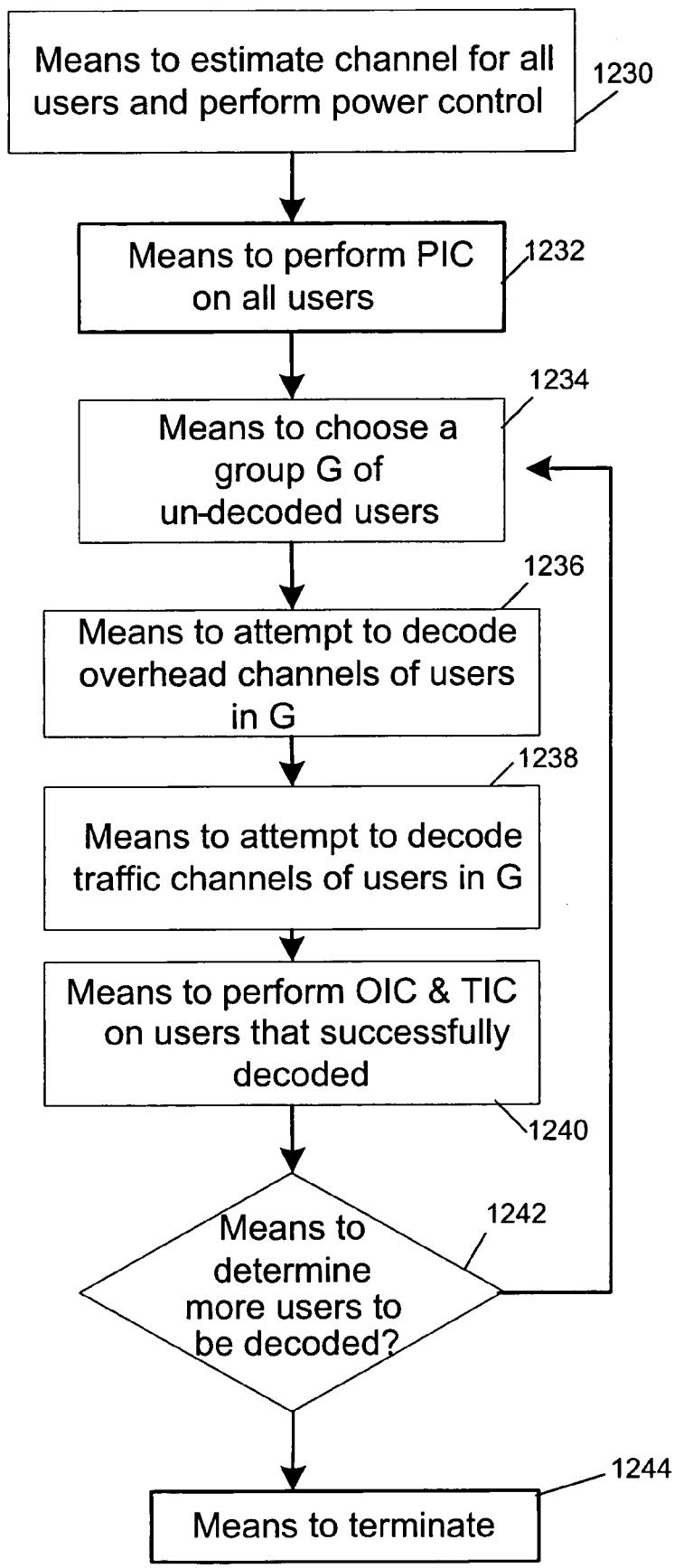
FIG. 12B illustrates an apparatus to perform the method of FIG. 12A.

FIG. 12B illustrates an apparatus comprising means 1230-1244 to perform the method of FIG. 12A. The means 1230-1244 in FIG. 12B may be implemented in hardware, software or a combination of hardware and software.

Figure 13A:
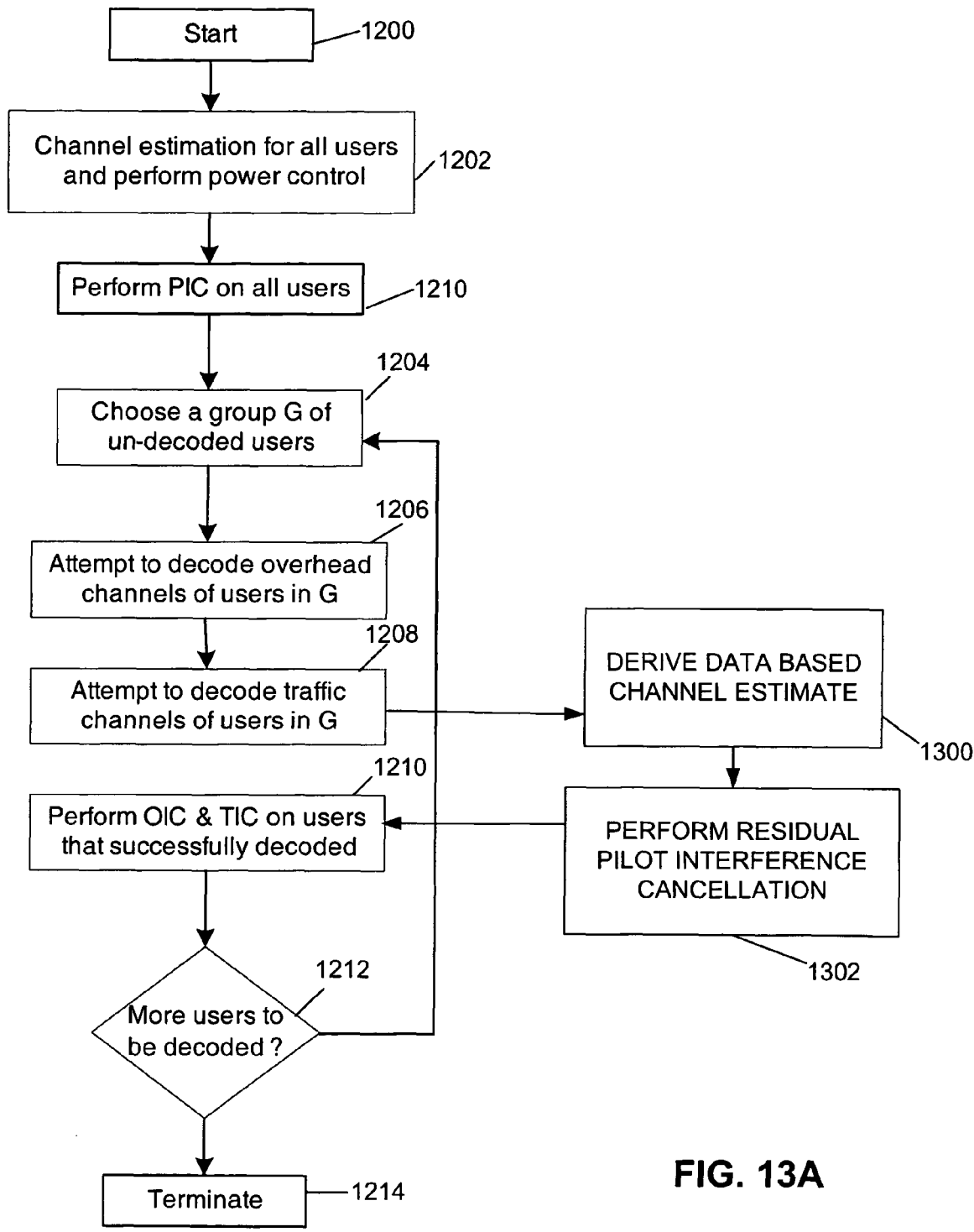
FIG. 13A illustrates a variation of the method in FIG. 12A.

FIG. 13A illustrates a variation of the method in FIG. 12A. Blocks 1204-1210 remove a signal based on an initial channel estimate in block 1202. Block 1300 derives a data-based channel estimate or a refined channel estimate. Data-based channel estimate may provide a better channel estimate, as described below. Block 1302 performs residual PIC, i.e., removes a revised estimate of the signal based on a refinement of the channel estimate in block 1300.

For example, consider that blocks 1204-1210 resulted in removing an initial signal estimate (e.g., pilot signal) $P1[n]$ from the received samples. Then, based on a better channel estimate derived in block 1300, the method forms the revised signal estimate $P2[n]$. The method may then remove the incremental $P2[n]-P1[n]$ difference from the sample locations in the RAM 312.

Figure 13B:
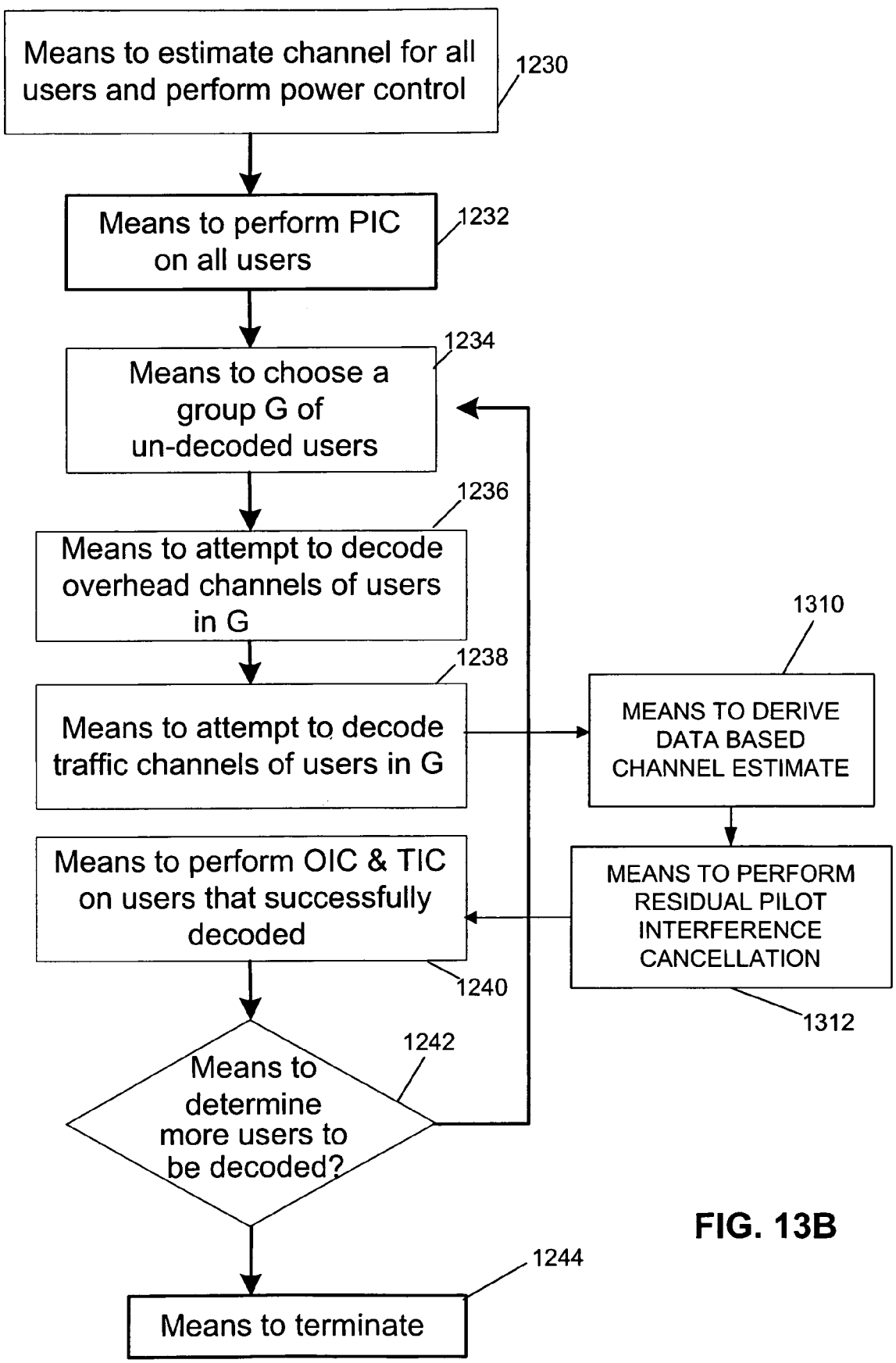
FIG. 13B illustrates an apparatus to perform the method of FIG. 13A.

FIG. 13B illustrates an apparatus comprising means 1230-1244, 1310, 1312 to perform the method of FIG. 13A. The means 1230-1244, 1310, 1312 in FIG. 13B may be implemented in hardware, software or a combination of hardware and software.

PIC First, then OICE and then TIC (Second Scheme)

This second scheme is similar to FIG. 12A described above with the exception that overhead channels of the same group of users are demodulated and decoded before any traffic channels are demodulated and decoded. This scheme is suitable for a non-interlaced system since no strict ACK deadline is imposed. For an interlaced system, e.g., DO Rev. A, since ACKINAK signals respond to the traffic channel subpackets, the tolerable decoding delay for traffic channel subpackets in general are limited to within a couple slots (1slot=1.67 ms). Therefore, if certain overhead channels spread over more than this time scale, this scheme may become unfeasible. In particular, on DO Rev.A, auxiliary pilot channel and ACK channel are in a short-duration format and may be subtracted before TIC.

Joint Pilot/Overhead/Traffic Channel Cancellation (the Third Scheme)

Figure 14A:
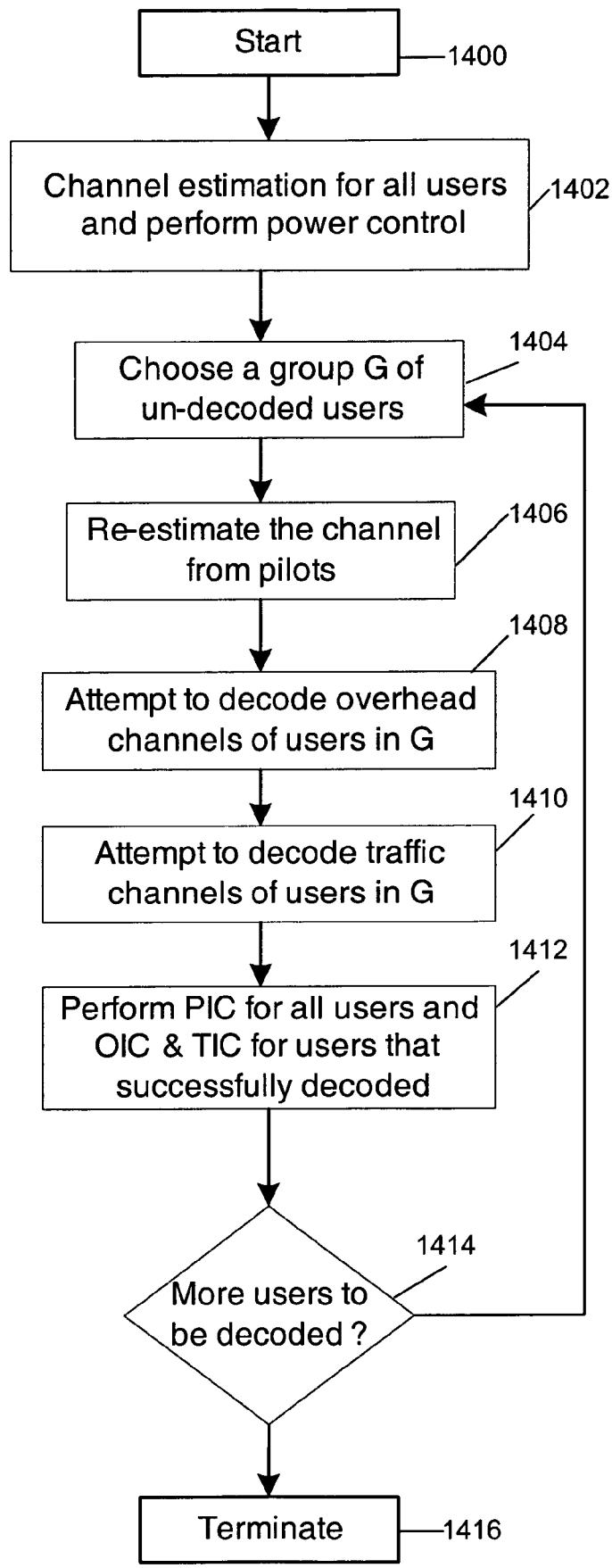
FIG. 14A illustrates a method to perform joint PIC, OIC and TIC.

FIG. 14A illustrates a method to perform joint PIC, OIC and TIC. After a start block 1400, the receiver derives channel estimation for all users and performs power control in block 1402. Block 1404 chooses a group G of undecoded users. Block 1406 re-estimates the channel from pilots. Blocks 1408-1410 attempt to perform overhead/traffic channel demodulation and decoding. Block 1412 performs PIC for all users and OIC and TIC for only users with successfully decoded channel data.

Different from the first scheme (FIG. 12A) discussed above, after the channel estimation for all users (block 1402), the pilots are not subtracted from FERAM 312 right away and the channel estimation is used for power control as the non-IC scheme. Then, for a group of users who terminated at the same packet/subpacket boundary, the method performs sequential decoding (blocks 1408 and 1410) in a given order.

For an attempted decoding user, the method first re-estimates the channel from the pilot (block 1402). The pilot sees less interference compared to the time (block 1402) when it was demodulated for power control due to interference cancellation of previously decoded packets which overlap with the to-be-decoded traffic packet. Therefore, the channel estimation quality is improved, which benefits both traffic channel decoding and cancellation performance. This new channel estimation is used for traffic channel decoding (block 1410) as well as certain overhead channel decoding (block 1408) (e.g., RRI channel in EV-DO). Once the decoding process is finished for one user at block 1412, the method will subtract this user's interference contribution from the FERAM 312, which includes its pilot channel and any decoded overhead/traffic channel.

Block 1414 checks whether there are more users to decode. Block 1416 terminates the process.

Figure 14B:
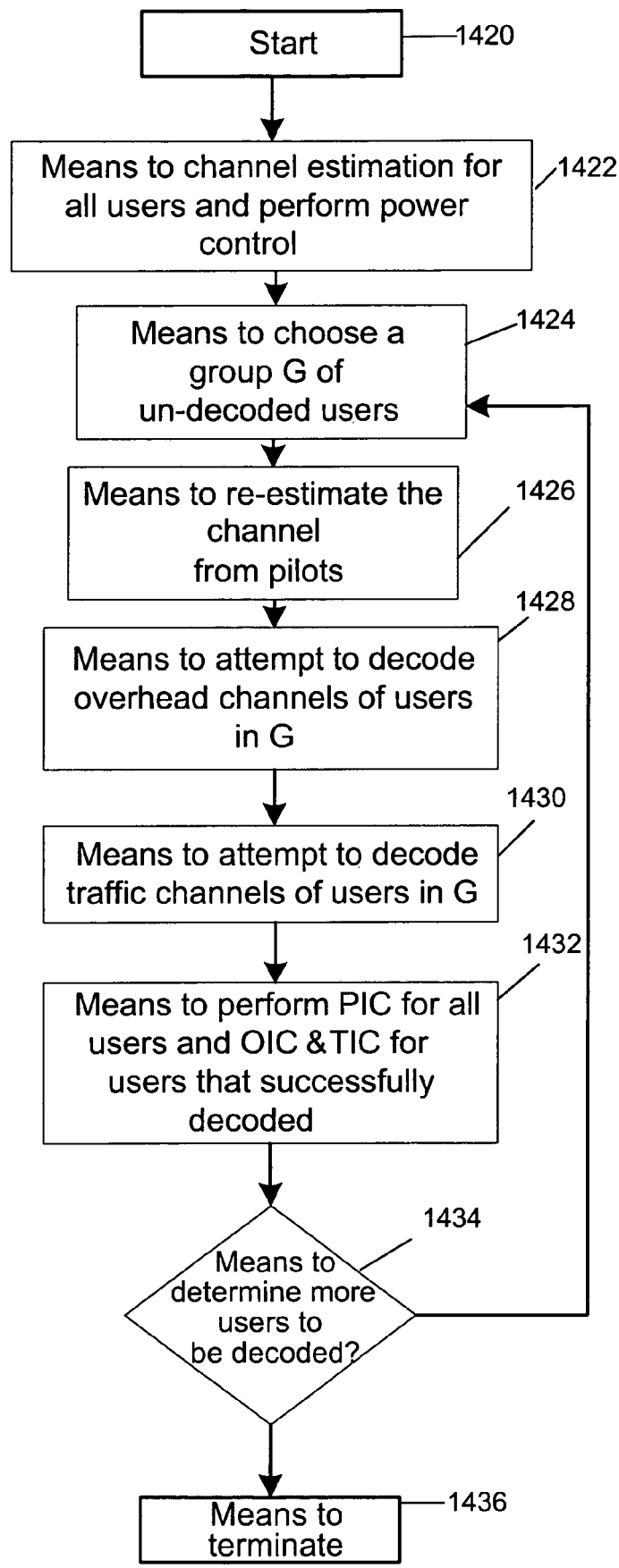
FIG. 14B illustrates an apparatus to perform the method of FIG. 14A.

FIG. 14B illustrates an apparatus comprising means 1420-1436 to perform the method of FIG. 14A. The means 1420-1436 in FIG. 14B may be implemented in hardware, software or a combination of hardware and software.

Figure 15A:
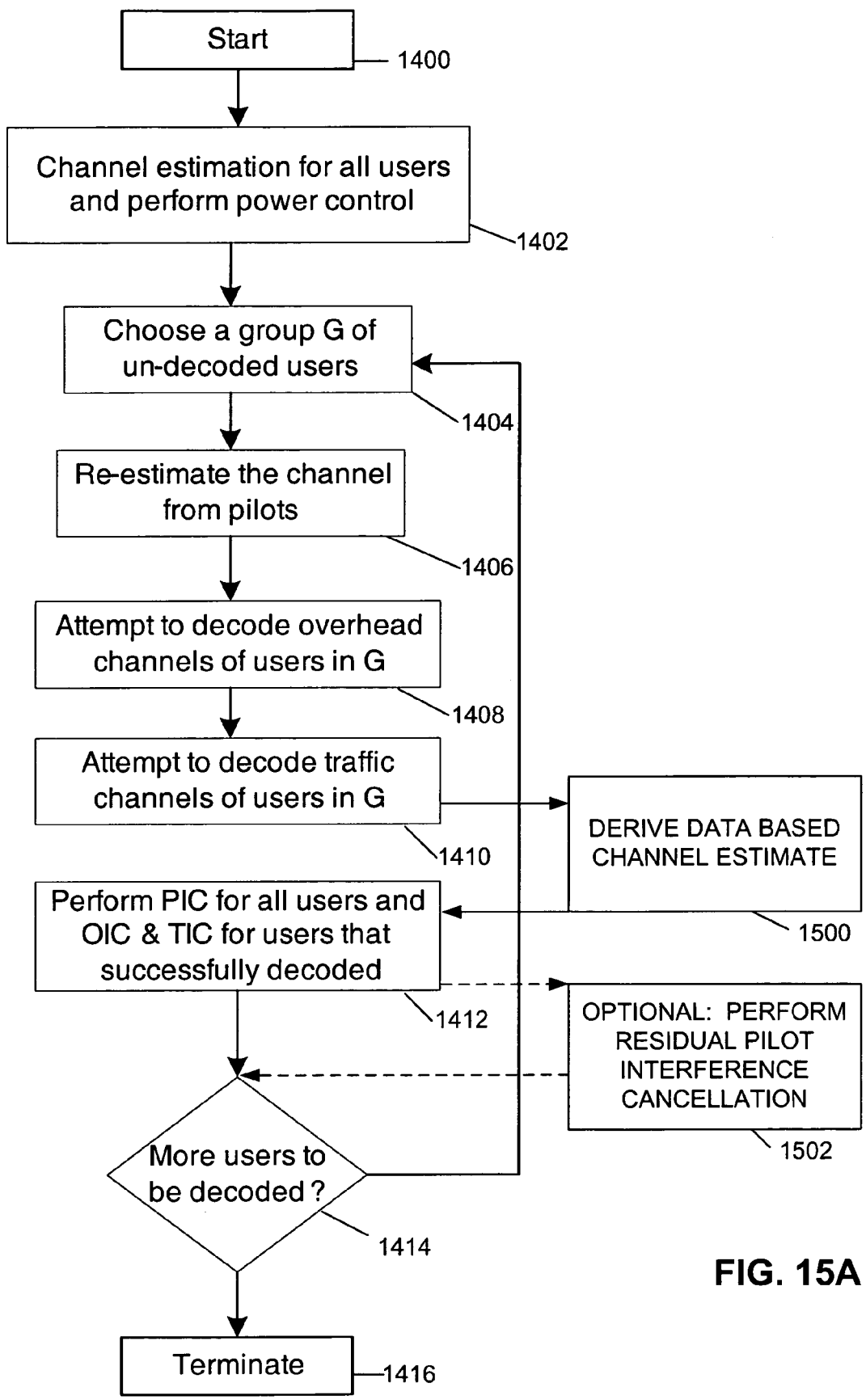
FIG. 15A illustrates a variation of the method in FIG. 14A.

FIG. 15A illustrates a variation of the method in FIG. 14A. Block 1500 derives data-based channel estimates. Block 1502 performs an optional residual PIC as in FIG. 13A.

Figure 15B:
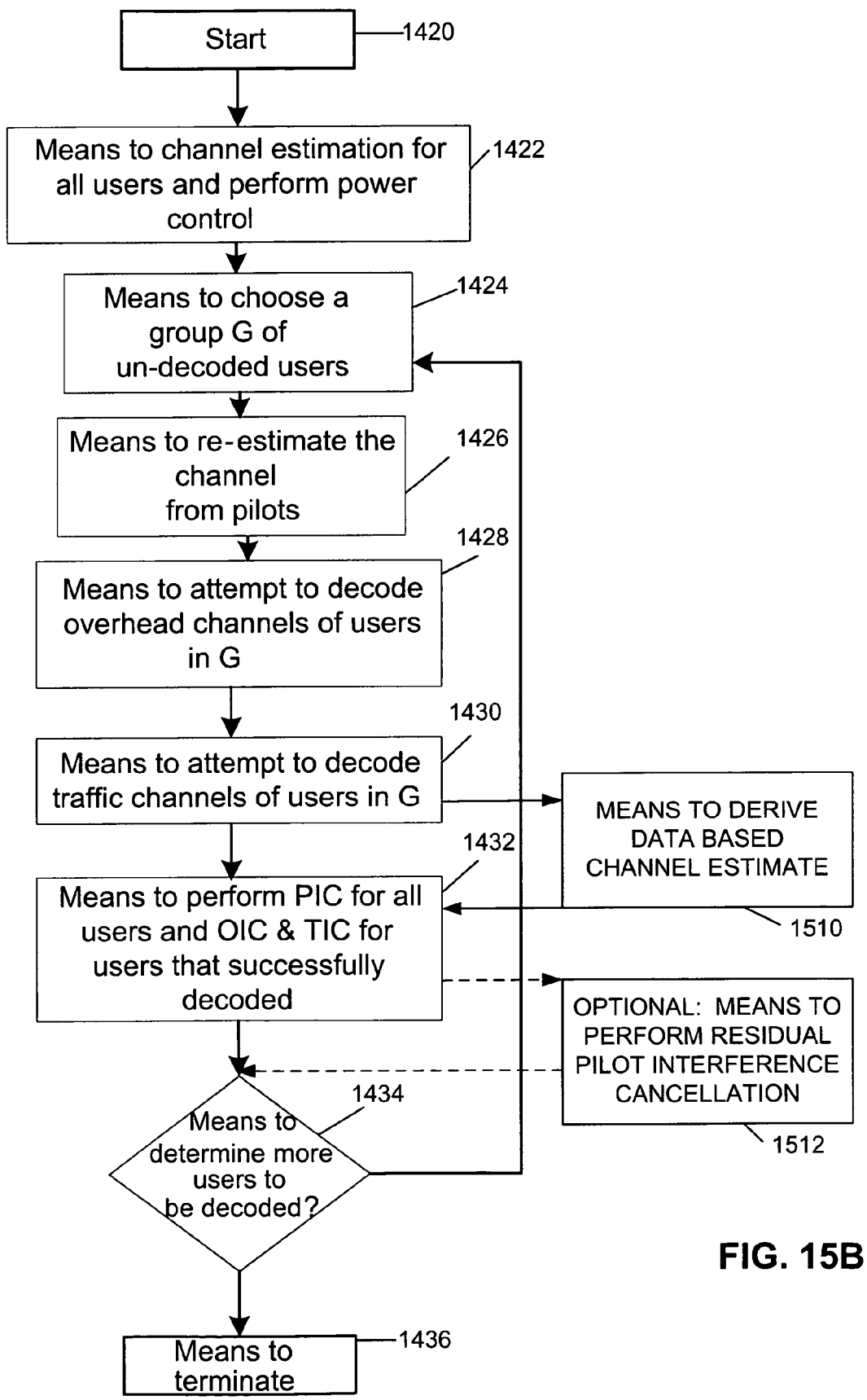
FIG. 15B illustrates an apparatus to perform the method of FIG. 15A.

FIG. 15B illustrates an apparatus comprising means 1420-1436, 1510, 1512 to perform the method of FIG. 15A. The means 1420-1436, 1510, 1512 in FIG. 15B may be implemented in hardware, software or a combination of hardware and software.

Tradeoffs Between the First and Third Schemes

It may appear that first scheme should have superior performance compared to the third scheme since the pilot signals are known at the BTS and it makes sense to cancel them in front. If both schemes are assumed to have the same cancellation quality, the first scheme may outperform the third scheme throughout all data rates. However, for the first scheme, since the pilot channel estimation sees higher interference than the traffic data demodulation, the estimated channel coefficients used for reconstruction purpose (for both pilot and overhead/traffic) may be noisier. However, for the third scheme, since the pilot channel estimation is redone right before the traffic data demodulation/decoding, the interference level seen by this refined channel estimation is the same as the traffic data demodulation. Then, on average, the cancellation quality of the third scheme may be better than the first scheme.

From a hardware design perspective, the third scheme may have a slight edge: the method may sum the pilot and decoded overhead and traffic channel data and cancel them together, therefore, this approach saves memory bandwidth. On the other hand, the re-estimation of pilot may be performed together with either overhead channel demodulation or traffic channel demodulation (in terms of reading samples from memory), and thus, there is no increase on memory bandwidth requirements.

If it is assumed that the first scheme has 80% or 90% cancellation quality of the third scheme, there are tradeoffs between data rate per user verse gain on number of users. In general, it favors the first scheme if all users are in low data rates region and the opposite if all high data rate users. The method may also re-estimate the channel from the traffic channel once one packet of data is decoded. The cancellation quality shall improve since the traffic channel operates at (much) higher SNR compared to the pilot channel.

Overhead channels may be removed (canceled) once they are demodulated successfully, and traffic channels may be removed once they have been demodulated and decoded successfully. It is possible that the base station could successfully demodulate/decode the overhead and traffic channels of all the access terminals at some point in time. If this (PIC, OIC, TIC) occurs, then the FERAM would only contain residual interference and noise. Pilot, overhead and traffic channel data may be canceled in various orders, and canceled for subsets of access terminals.

One approach is to perform interference cancellation (of any combination of PIC, TIC and OIC) for one user at a time from the RAM 312. Another approach is to (a) accumulate reconstructed signals (of any combination of PIC, TIC and OIC) for a group of users and (b) then perform interference cancellation for the group at the same time. These two approaches may be applied to any of the methods, schemes, and processes disclosed herein.

Improving Channel Estimation for Interference Cancellation

The ability to accurately reconstruct received samples may significantly affect system performance of a CDMA receiver that implements interference cancellation by reconstructing and removing various components of transmitted data. In a RAKE receiver, a multipath channel is estimated by PN despreading with respect to the pilot sequence and then pilot filtering (i.e., accumulating) over an appropriate period of time. The length of the pilot filtering is typically chosen as a compromise between increasing the estimation SNR by accumulating more samples, while not accumulating so long that the estimation SNR is degraded by the time variations of the channel. The channel estimate from the pilot filter output is then used to perform data demodulation.

As described above with FIG. 4, one practical method of implementing interference cancellation in a CDMA receiver is to reconstruct the contribution of various transmitted chip×1 streams to the (e.g. chip×2) FERAM samples. This involves determining the transmitted chip streams and an estimate of the overall channel between the transmitter chips and the receiver samples. Since the channel estimates from the RAKE fingers represent the multipath channel itself, the overall channel estimate should also account for the presence of transmitter and receiver filtering.

This section discloses several techniques for improving this overall channel estimation for interference cancellation in a CDMA receiver. These techniques may be applicable to cdma2000, 1xEV-DO, 1xEV-DV, WCDMA.

To perform TIC of a packet that decodes correctly, the receiver in FIG. 4 may take the information bits from the decoder output and reconstruct the transmitted chip stream by re-encoding, re-interleaving, re-modulating, re-applying the data channel gain, and re-spreading. To estimate the received samples for TIC with the pilot channel estimate, the transmit chip stream would be convolved with a model of the transmitter and receiver filters and the RAKE receiver's channel estimate from despreading with the pilot PN sequence.

Instead of using the pilot channel estimate, an improved channel estimate (at each RAKE finger delay) may be obtained by despreading with the reconstructed data chips themselves. This improved channel estimate is not useful for data demodulation of the packet since the packet has already decoded correctly, but is rather used solely for reconstructing the contribution of this packet to the front-end samples. With this technique, for each of the delays of the RAKE fingers (e.g., chip×8 resolution), the method may "despread" the received samples (e.g., interpolated to chip×8) with the reconstructed data chip stream and accumulate over an appropriate period of time. This will lead to improved channel estimation since the traffic channel is transmitted at higher power than the pilot channel (this traffic-to-pilot T2P ratio is a function of data rate). Using the data chips to estimate the channel for TIC may result in a more accurate channel estimate for the higher powered users who are the most important to cancel with high accuracy.

Instead of estimating the multipath channel at each of the RAKE finger delays, this section also describes a channel estimation procedure that would explicitly estimate a combined effect of the transmitter filter, multipath channel, and receiver filter. This estimate may be at the same resolution as the oversampled front-end samples (e.g. chip×2 FERAM). The channel estimate may be achieved by despreading the front-end samples with the reconstructed transmit data chips to achieve the T2P gain in channel estimation accuracy. The time span of the uniformly spaced channel estimates may be chosen based on information about the RAKE finger delays and an a priori estimate of a combined response of the transmitter and receiver filters. Furthermore, information from the RAKE fingers may be used to refine the uniformly spaced channel estimates.

Figure 16:
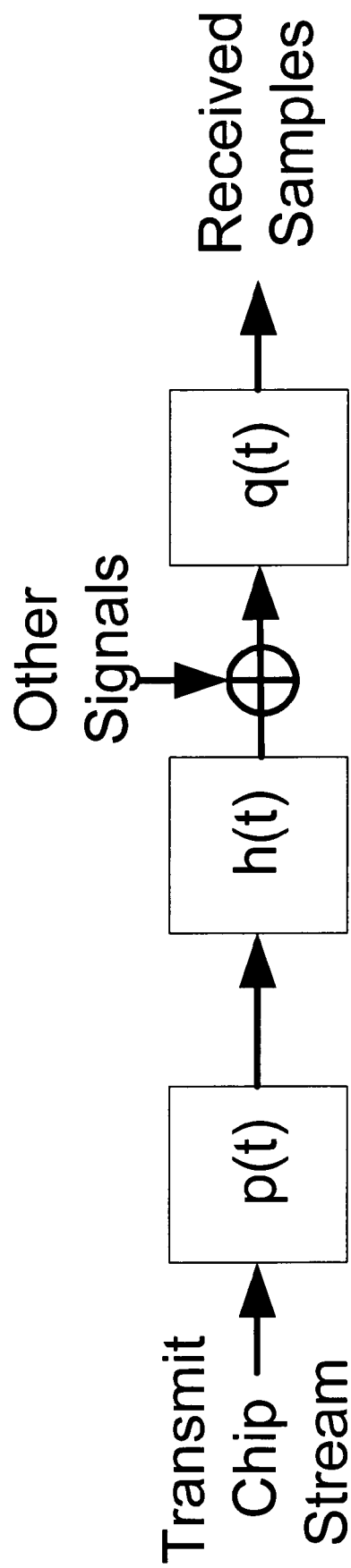
FIG. 16 illustrates a model of transmission system.
Figure 17:
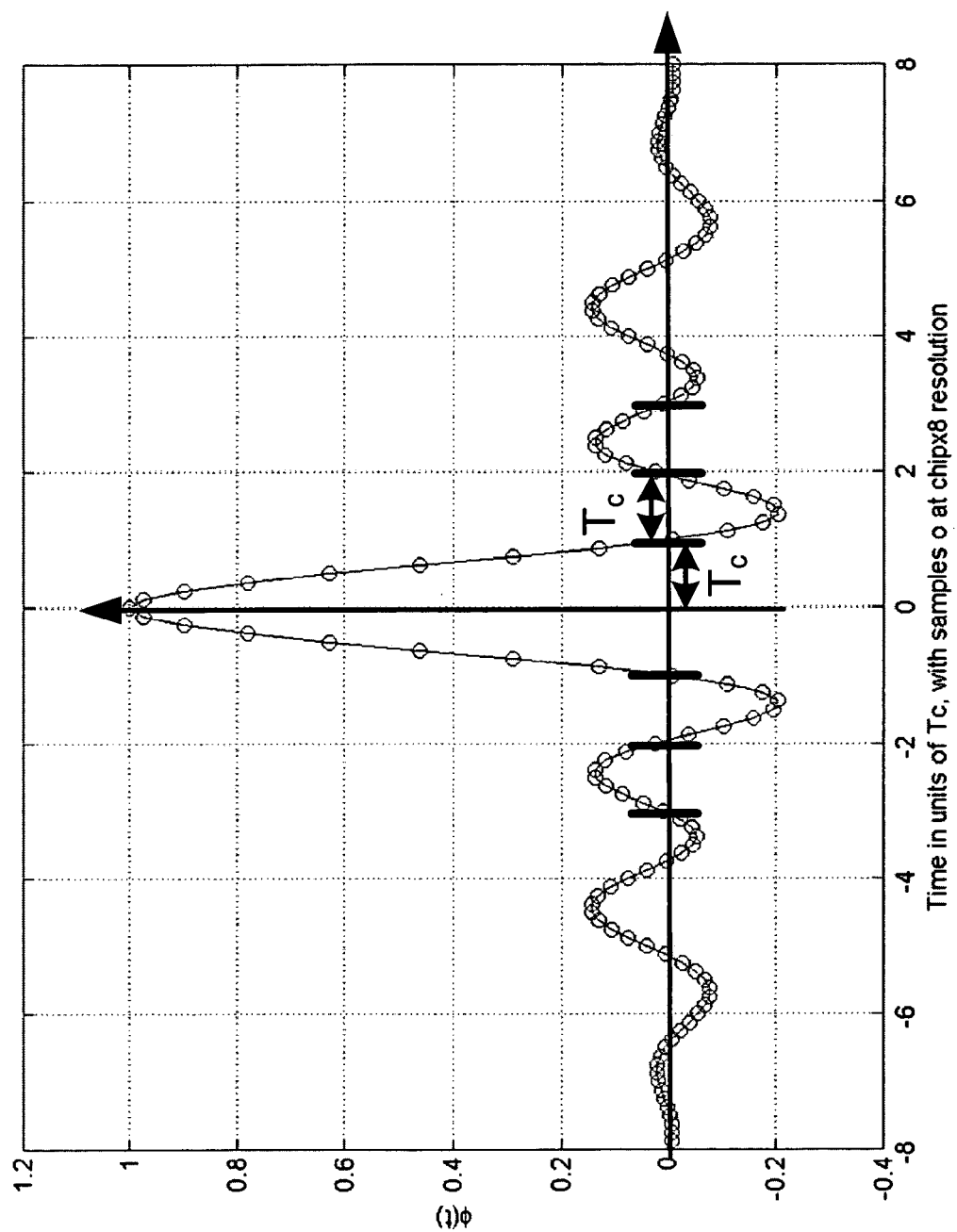
FIG. 17 illustrates an example response of combined transmit and receive filtering.

FIG. 16 illustrates a model of transmission system with a transmit filter p(t), overall/composite channel h(t) (vs. multipath channel g(t) described below), and receiver filter q(t). The digital baseband representation of wireless communications channel may be modeled by L discrete multipath components $$g(t) = \sum_{l=1}^{L} a_l \delta(t - \tau_l)$$ Equation 3 where the complex path amplitudes are $a_l$ with corresponding delays $\tau_l$. The combined effect of the transmitter and receiver filters may be defines as $\phi(t)$, where $$\phi(t) = p(t) \otimes q(t)$$ Equation 4 where $\otimes$ denotes convolution. The combined $\phi(t)$ is often chosen to be similar to a raised cosine response. For example, in cdma2000 and its derivatives, the response is similar to an example $\phi(t)$ displayed in FIG. 17. The overall channel estimate is given by $$\hat{h}(t) = g(t) \otimes \phi(t) = \sum_{l=1}^{L} a_l \phi(t - \tau_l).$$ Equation 5

Figures 18A, 18B:
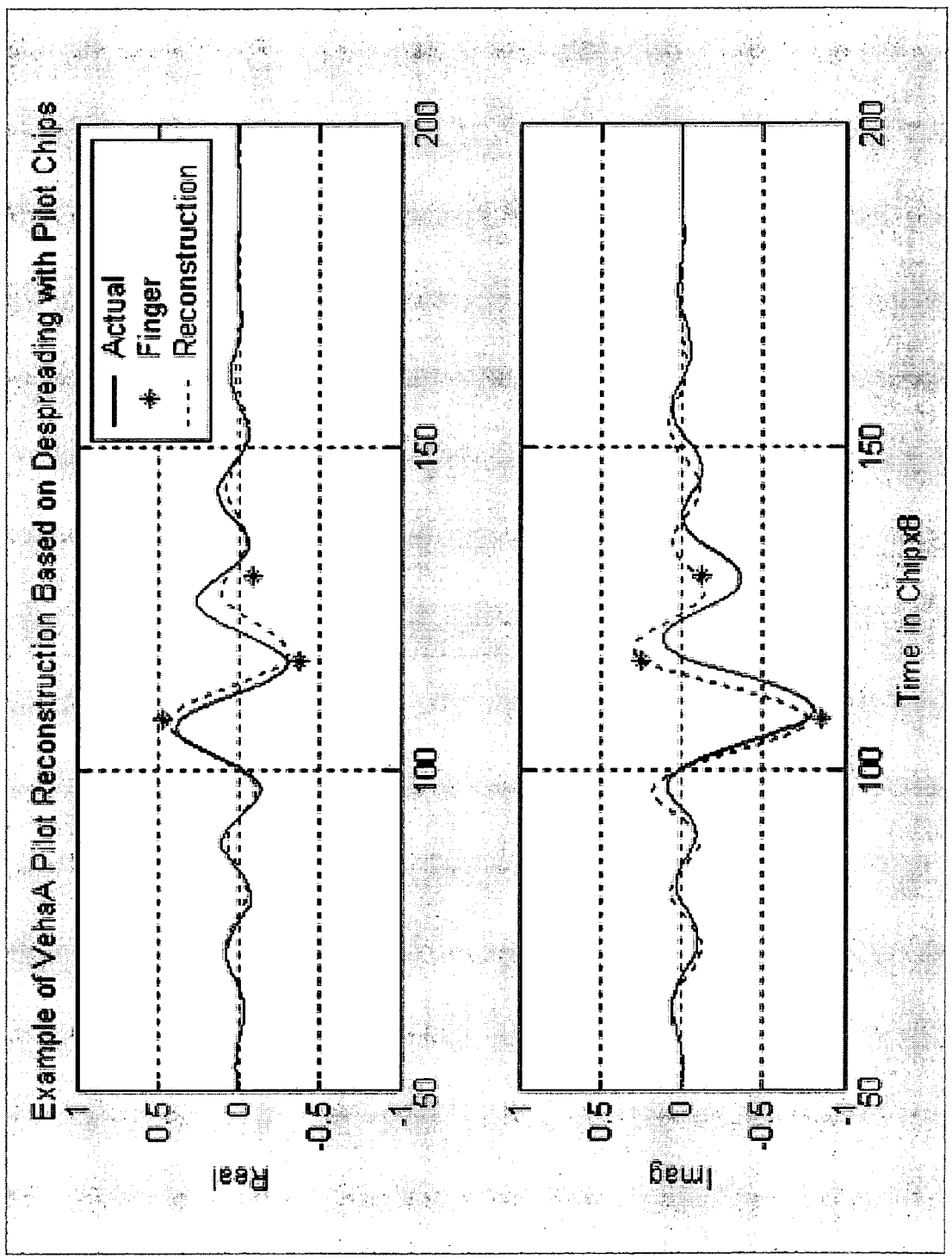
FIGS. 18A and 18B illustrate an example of channel estimation (real and imaginary components) based on the estimated multipath channel at each of three RAKE fingers.

FIGS. 18A and 18B show an example of channel estimation (real and imaginary components) based on the estimated multipath channel at each of three RAKE fingers. In this example, the actual channel is shown as a solid line, and the $a_l$ are given by the stars. The reconstruction (dotted line) is based on using the $a_l$ in Equation 3 above. The RAKE finger channel estimates in FIGS. 18A and 18B are based on despreading with pilot chips (where the overall pilot SNR is −24 dB).

Despreading at RAKE Finger Delays with Regenerated Data Chips Instead of Pilot Chips The quality of channel estimation has a direct impact on the fidelity of reconstructing a user's contribution to the received signal. In order to improve the performance of CDMA systems that implement interference cancellation, it is possible to use a user's reconstructed data chips to determine an improved channel estimate. This will improve the accuracy of the interference subtraction. One technique for CDMA systems may be described as "despreading with respect to a user's transmitted data chips" as opposed to the classical "despreading with respect to a user's transmitted pilot chips."

Figures 19A, 19B:
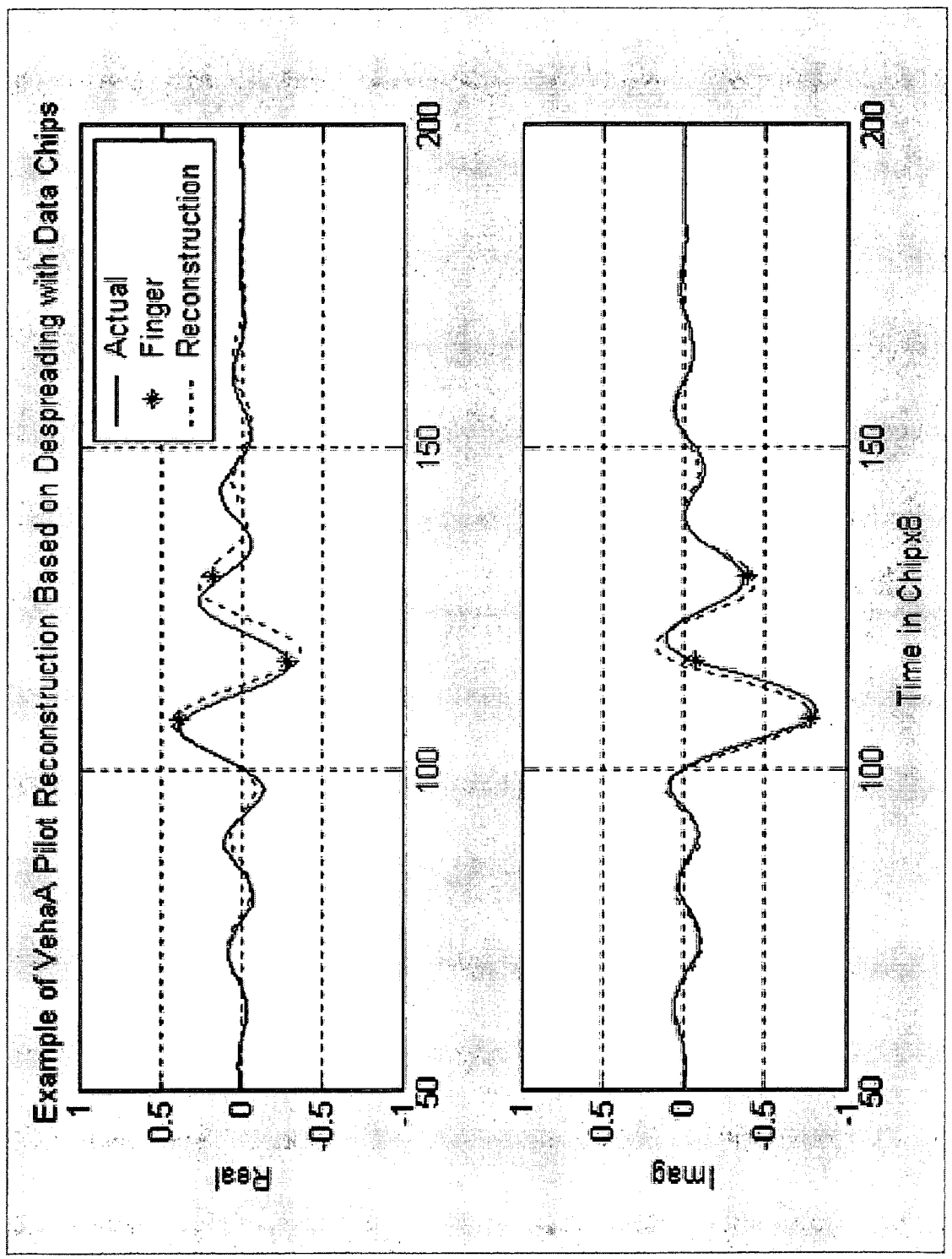
FIGS. 19A-19B illustrate examples of an improved channel estimate based on RAKE fingers and despreading with the data chips.

Recall that the RAKE finger channel estimates in FIGS. 18A-18B are based on despreading with the pilot chips (where the overall pilot SNR is −24 dB). FIGS. 19A-19B show examples of an improved channel estimate based on RAKE fingers and despreading with the data chips, where the data chips are transmitted with 10 dB more power than the pilot chips.

Figure 20A:
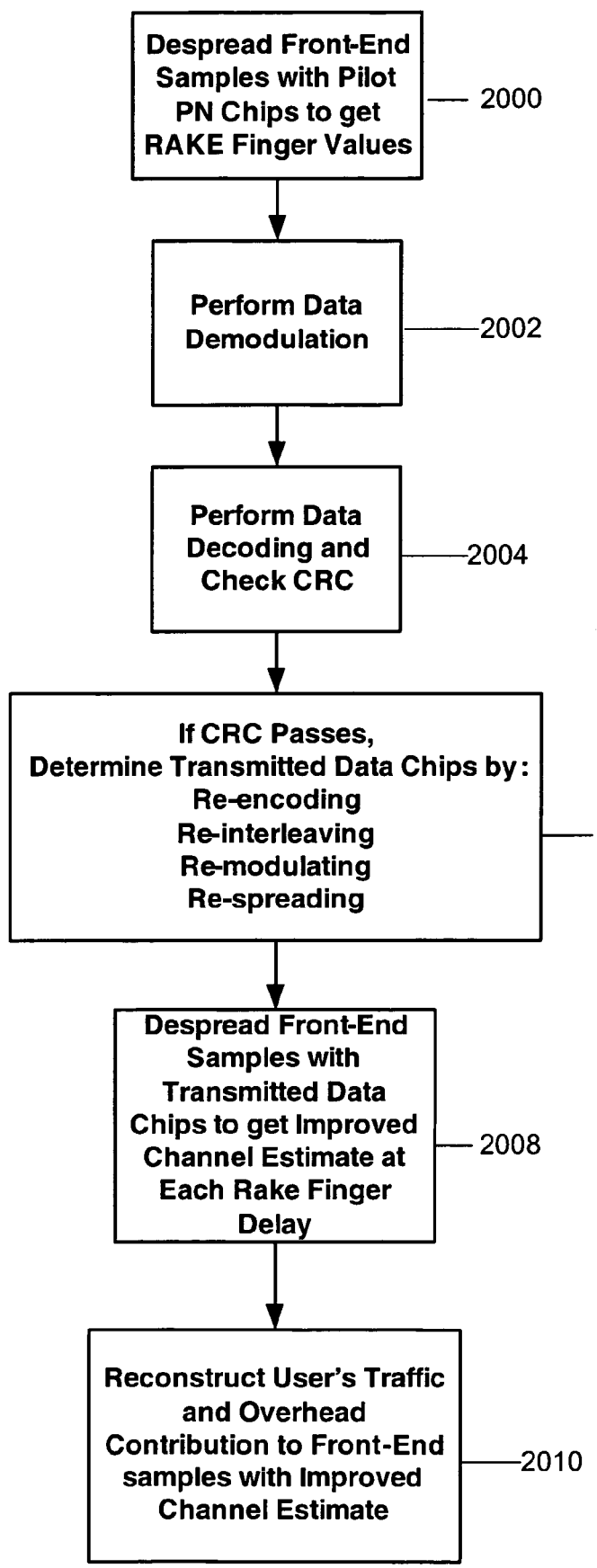
FIG. 20A illustrates a method for despreading at RAKE finger delays with regenerated data chips.

FIG. 20A illustrates a method for despreading at RAKE finger delays with regenerated data chips. In block 2000, rake receiver 314 (FIG. 4) despreads front-end samples with pilot PN chips to get RAKE finger values. In block 2002, demodulator 304 performs data demodulation. In block 2004, decoder 308 performs data decoding and checks CRC. In block 2006, if CRC passes, unit 400 determines transmitted data chips by re-encoding, re-interleaving, re-modulating and re-spreading. In block 2008, unit 400 despreads front-end samples with transmitted data chips to get improved channel estimate at each finger delay. In block 2010, unit 400 reconstructs user's traffic and overhead contribution to front-end samples with improved channel estimate.

Figure 20B:
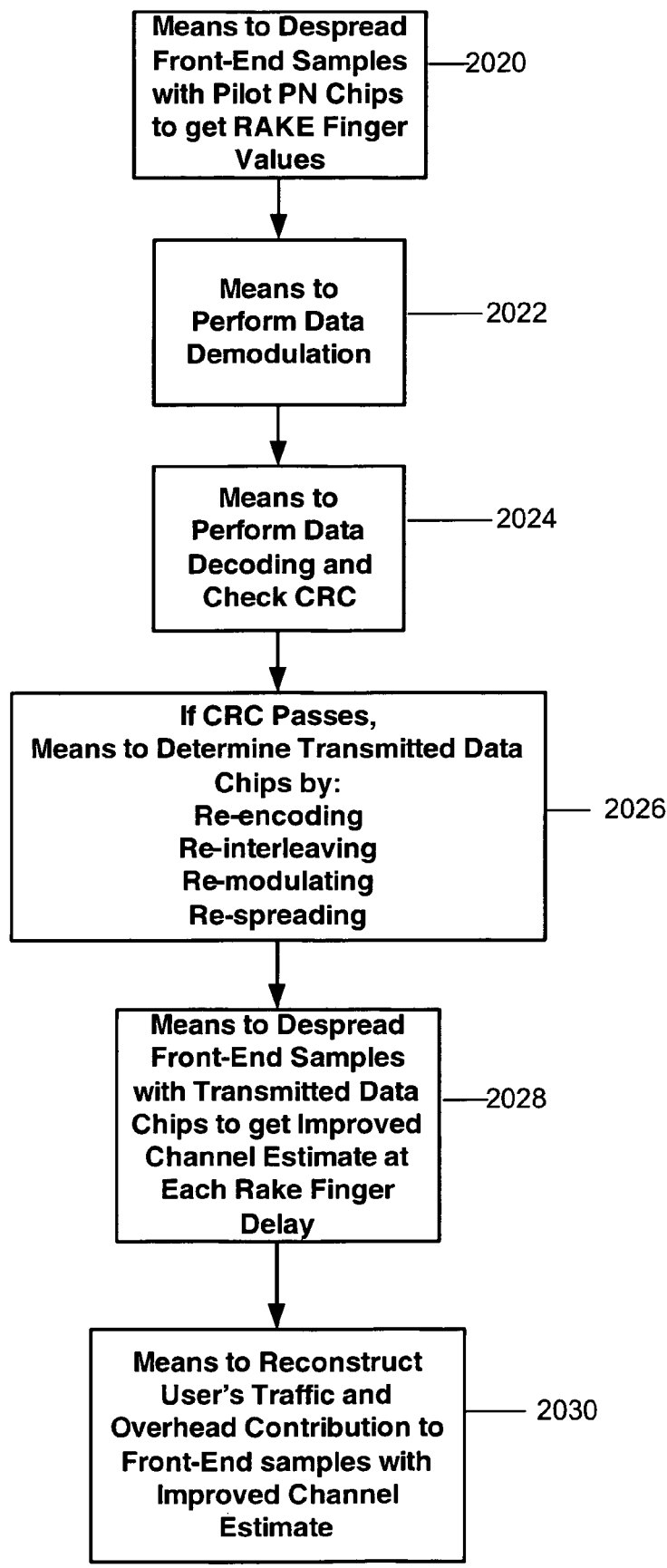
FIG. 20B illustrates an apparatus to perform the method of FIG. 20A.

FIG. 20B illustrates an apparatus comprising means 2020-2030 to perform the method of FIG. 20A. The means 2020-2030 in FIG. 20B may be implemented in hardware, software or a combination of hardware and software.

Estimating the Composite Channel at FERAM Resolution with Regenerated Data Chips Classical CDMA receivers may estimate the complex value of the multipath channel at each of the RAKE finger delays. The receiver front-end prior to the RAKE receiver may include a low pass receiver filter (i.e., q(t)) which is matched to the transmitter filter (i.e., p(t)). Therefore, for the receiver to implement a filter matched to the channel output, the RAKE receiver itself attempts to match to the multipath channel only (i.e., g(t)). The delays of the RAKE fingers are typically driven from independent time-tracking loops within minimum separation requirements (e.g., fingers are at least one chip apart). However, the physical multipath channel itself may often have energy at a continuum of delays. Therefore, one method estimates the composite channel (i.e., h(t)) at the resolution of the front-end samples (e.g., chip×2 FERAM).

With transmit power control on the CDMA reverse link, the combined finger SNR from all multipaths and receiver antennas is typically controlled to lie in a particular range. This range of SNR may result in a composite channel estimate derived from the despread pilot chips that has a relatively large estimation variance. That is why the RAKE receiver attempts to only place fingers at the "peaks" of the energy delay profile. But with the T2P advantage of despreading with reconstructed data chips, the composite channel estimation may result in a better estimate of h(t) than the direct estimate of g(t) combined with a model of φ(t).

A channel estimation procedure described herein explicitly estimates the combined effect of the transmitter filter, multipath channel, and receiver filter. This estimate may be at the same resolution as the oversampled front-end samples (e.g., chip×2 FERAM). The channel estimate may be achieved by despreading the front-end samples with the reconstructed transmit data chips to achieve the T2P gain in channel estimation accuracy. The time span of the uniformly spaced channel estimates may be chosen based on information about the RAKE finger delays and an a priori estimate of the combined response of the transmitter and receiver filters. Furthermore, information from the RAKE fingers may be used to refine the uniformly spaced channel estimates. Note that the technique of estimating the composite channel itself is also useful because it does not require the design to use an a priori estimate of φ(t).

Figures 21A, 21B:
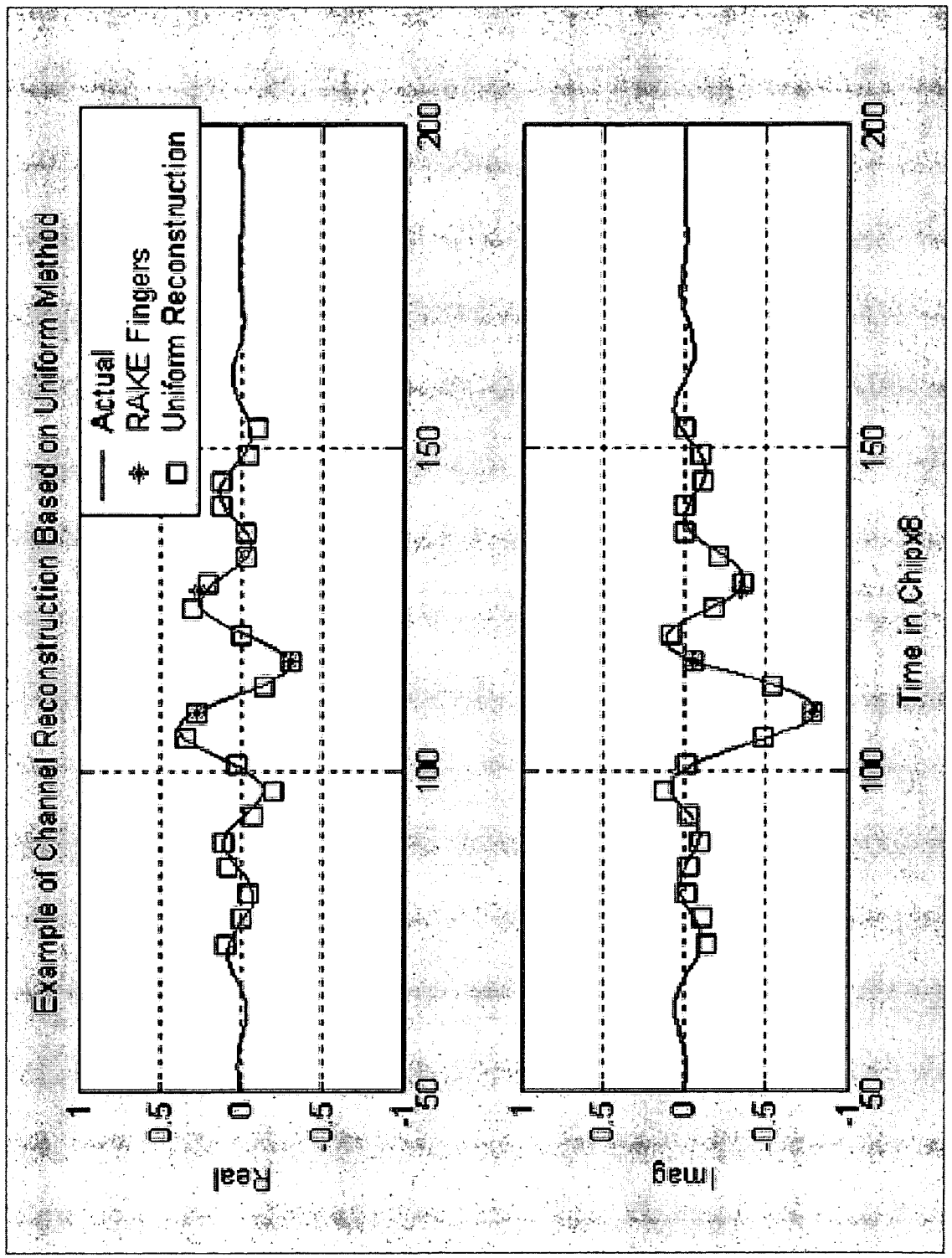
FIGS. 21A and 21B illustrate an example of estimating the composite channel using uniformly spaced samples at chip×2 resolution.

FIGS. 21A and 21B show an example of estimating the composite channel using uniformly spaced samples at chip×2 resolution. In FIGS. 21A, 21B, the data chips SNR is −4 dB, corresponding to a pilot SNR of −24 dB and a T2P of 20 dB. The uniform channel estimate gives a better quality compared with despreading with the data chips only at the RAKE finger locations. At high SNR, the effects of "fatpath" limit the ability to accurately reconstruct the channel using RAKE finger locations. The uniform sampling approach is particularly useful when the estimation SNR is high, corresponding to the case of despreading with data chips for a high T2P. When the T2P is high for a particular user, the channel reconstruction fidelity is important.

Figure 22A:
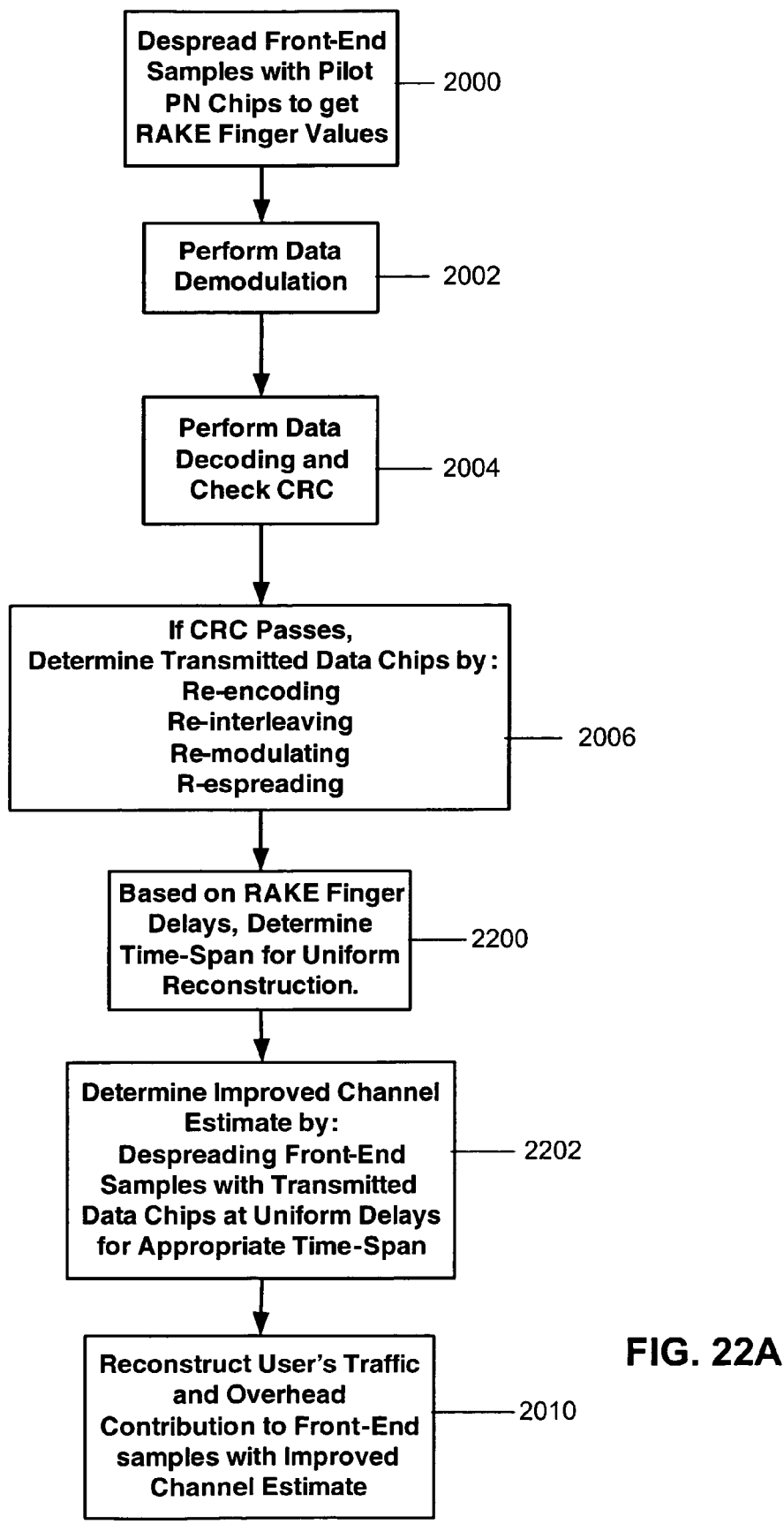
FIG. 22A illustrates a method for estimating composite channel at uniform resolution using regenerated data chips.

FIG. 22A illustrates a method for estimating composite channel at uniform resolution using regenerated data chips. Blocks 2000-2006 and 2010 are similar to FIG. 20A described above. In block 2200, RAKE receiver 314 (FIG. 4) or another component determines time-span for uniform construction based on RAKE finger delays. In block 2202, demodulator 304 or another component determines an improved channel estimate by despreading front-end samples with transmitted data chips at uniform delays for an appropriate time-span.

Figure 22B:
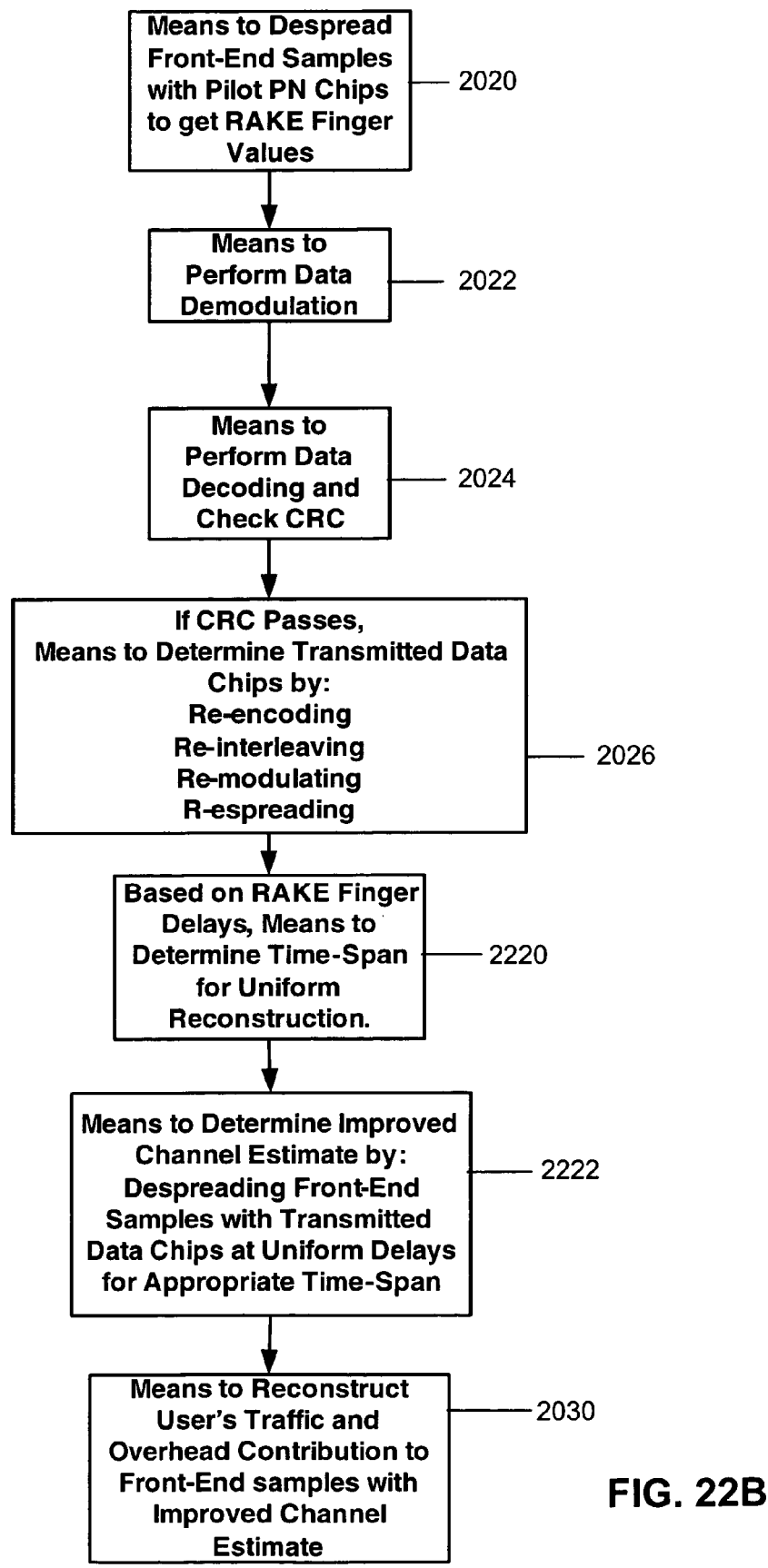
FIG. 22B illustrates an apparatus to perform the method of FIG. 22A.

FIG. 22B illustrates an apparatus comprising means 2020-2030, 2220, 2222 to perform the method of FIG. 22A. The means 2020-2030 in FIG. 22B may be implemented in hardware, software or a combination of hardware and software.

In the description above, g(t) is the wireless multipath channel itself, while h(t) includes the wireless multipath channel as well as the transmitter and receiver filtering: h(t) =g(t) convolved with phi(t).

In the description above, "samples" may be at any arbitrary rate (e.g., twice per chip), but "data chips" are one per chip.

"Regenerated data chips" are formed by re-encoding, re-interleaving, re-modulating, and re-spreading, as shown in block 2006 of FIG. 20A and described above. In principle, "regenerating" is mimicking the process that the information bits went through at the mobile transmitter (access terminal).

"Reconstructed samples" represent the samples stored in FERAM 312 or in a separate memory from FERAM 312 in the receiver (e.g., twice per chip). These reconstructed samples are formed by convolving the (regenerated) transmitted data chips with a channel estimate.

The words "reconstructed" and "regenerated" may be used interchangeably if context is provided to either reforming the transmitted data chips or reforming the received samples. Samples or chips may be reformed, since "chips" are reformed by re-encoding, etc., whereas "samples" are reformed based on using the reformed chips and incorporating the effects of the wireless channel (channel estimate) and the transmitter and receiver filtering. Both words "reconstruct" and "regenerate" essentially mean to rebuild or reform. There is no technical distinction. One embodiment uses "regenerate" for data chips and "reconstruct" for samples exclusively. Then, a receiver may have a data chip regeneration unit and a sample reconstruction unit.

Adaptation of Transmit Subchannel Gains on the Reverse Link of CDMA Systems with Interference Cancellation Multi-user interference is a limiting factor in a CDMA transmission system and any receiver technique that mitigates this interference may allow significant improvements in the achievable throughput. This section describes techniques for adapting the transmit subchannels gains of a system with IC.

In the reverse link transmission, each user transmits pilot, overhead and traffic signals. Pilots provide synchronization and estimation of the transmission channel. Overhead subchannels (such as RRI, DRC, DSC, and ACK) are needed for MAC and traffic decoding set-up. Pilot, overhead and traffic subchannels have different requirements on the signal to interference plus noise ratio (SINR). In a CDMA system, a single power control may adapt the transmit power of pilots, while the power of overhead and traffic subchannels has a fixed gain relative to the pilots. When the BTS is equipped with PIC, OIC and TIC, the various subchannels see different levels of interference depending on the order of ICs and the cancellation capabilities. In this case, a static relation between subchannel gains may hurt the system performance.

This section describes new gain control strategies for the different logical subchannels on a system that implements IC. The techniques are based on CDMA systems such as EV-DO RevA and may be applied to EV-DV Rel D, W-CDMA EUL, and cdma2000.

The described techniques implement power and gain control on different subchannels by adaptively changing the gain of each subchannel according to the measured performance in terms of packet error rate, SINR or interference power. The aim is to provide a reliable power and gain control mechanism that allows fully exploiting the potentials of IC while providing robustness for a transmission on a time-varying dispersive subchannel.

Interference cancellation refers to removing a contribution of logical subchannels to the front-end samples after those subchannels have been decoded, in order to reduce the interference on other signals that will be decoded later. In PIC, the transmitted pilot signal is known at the BTS and the received pilot is reconstructed using the channel estimate. In TIC or OIC, the interference is removed by reconstructing the received subchannel through its decoded version at the BTS.

Current BTS (with no IC) control the power of the pilot subchannel $E_{cp}$ in order to meet the error rate requirements in the traffic channel. The power of the traffic subchannel is related to pilots by a fixed factor T2P, which depends on the payload type and target termination goals. The adaptation of the pilot power is performed by closed loop power control mechanism including an inner and outer loop. The inner loop aims at keeping the SINM of the pilots (Ecp/Nt) at a threshold level T, while the outer-loop power control changes the threshold level T, for example, based on packet error rate (PER).

When IC is performed at the receiver (FIG. 4), the adaptation of the subchannel gains may be beneficial to the system. In fact, since each subchannel sees a different level of interference, their gain with respect to pilots should be adapted accordingly in order to provide the desired performance. This section may solve the problem of gain control for overhead and pilot subchannels, and techniques are described for the adaptation of T2P which increase the throughput of the system by fully exploiting the IC.

Important Parameters in a System with IC

Two parameters that may be adjusted are overhead subchannel gains and traffic to pilot (T2P) gain. When TIC is active, the overhead subchannel gains may be increased (relative to non-TIC), in order to allow a more flexible trade-off between the pilot and overhead performance. By denoting with G the baseline G used in the current system, the new value of the overhead channel gain will be:

$$G' = G \cdot \Delta_G.$$

In no-IC schemes the overhead/pilot subchannels see the same interference level as the traffic channels and a certain ratio T2P/G may give satisfactory performance for both overhead and traffic channels performance as well as pilot channel estimations. When IC is used, the interference level is different for the overhead/pilots and traffic, and T2P may be reduced in order to allow coherent performance of the two types of subchannels. For a given payload, the method may let the T2P decrease by a factor $\Delta_{T2P}$ with respect to the tabulated value, in order to satisfy the requirements. By denoting with T2P the baseline T2P used for a particular payload in the current system, the new value of T2P will be:

$$T2P' = T2P \cdot \Delta_{T2P}.$$

The parameter $\Delta_{T2P}$ can be quantized into a set of finite or discrete values (e.g., −0.1 dB to −1.0 dB) and sent to the access terminal 106.

Some quantities that may be kept under control are traffic PER, pilot SINR, and rise over thermal. The pilot SENR should not drop under the minimum level desired for good channel estimation. Rise over thermal (ROT) is important to ensure the stability and the link-budget of the power controlled CDMA reverse link. In non-TIC receivers, ROT is defined on the received signal. In general, ROT should stay within a predetermined range to allow for a good capacity/coverage tradeoff.

Rise Over Thermal Control $I_0$ indicates the power of the signal at the input of the receiver. The cancellation of interference from the received signal yields a reduction of power. $I_0'$ indicates the average power of the signal at input of the demodulator 304 after IC:

$$I_0' \leq I_0.$$

The value of $I_0'$ may be measured from the front-end samples after it has been updated with the IC. When IC is performed, the ROT is still important for the overhead subchannel, and ROT should be controlled with respect to a threshold, i.e. to ensure that $$ROT = \frac{I_0}{N_0} < ROT_{thr},$$

where $N_0$ is the noise power.

However, traffic and some overhead subchannels benefit also from the IC. The decoding performance of these subchannels is related to the rise over thermal, measured after IC. Effective ROT is the ratio between the signal power after IC and the noise power. The effective ROT may be controlled by a threshold, i.e., $$ROT_{eff} = \frac{I_0'}{N_0} < ROT_{thr}^{(eff)}.$$

The constraint on the $ROT_{eff}$ may be equivalently stated as a constraint on $I_0'$, under the assumption that the noise level does not change:

$$I_0' \leq I_0^{(thr)},$$

where $I_0^{(thr)}$ is the signal power threshold corresponding to $ROT_{thr}^{(eff)}$.

Fixed Overhead Gain Techniques

When the ROT increases, the SINR of the pilot and overhead channels (which do not benefit from IC) decreases, leading to a potential increase in the erasure rate. In order to compensate for this effect, the overhead channel gains may be raised, either by a fixed value or by adaptation to the particular system condition.

Techniques are described where the gain of the overhead subchannel is fixed with respect to the pilots. The proposed techniques adapt both the level of pilot subchannel and the $\Delta_{T2P}$ for each user.

Closed Loop Control of T2P with Fixed $\Delta_G=0$ dB

Figure 23:
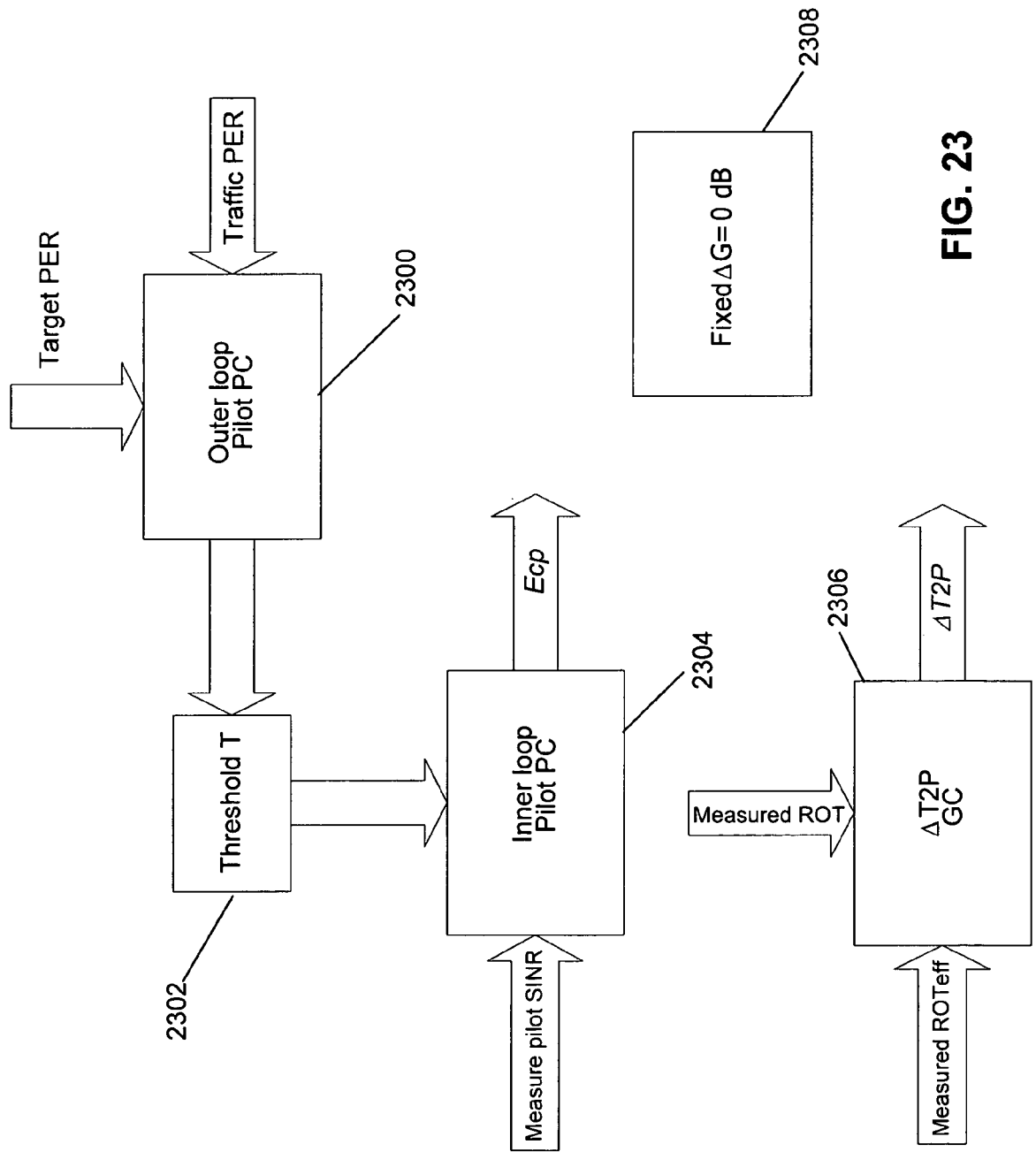
FIG. 23 illustrates a closed loop power control and gain control with fixed overhead subchannel gain.

FIG. 23 illustrates a closed loop power control (PC) for $E_{cp}$ and $\Delta_{T2P}$ and fixed $\Delta_G=0$ dB (block 2308). This first solution for the adaptation of $\Delta_{T2P}$ and $E_{cp}$ comprises:

A. Inner and outer loops 2300, 2302 may perform power control in a conventional manner for the adaptation of $E_{cp}$. Outer loop 2300 receives target PER and traffic PER. Inner loop 2304 receives a threshold T 2302 and a measured pilot SMIR and outputs $E_{cp}$.

B. A closed loop gain control (GC) 2306 adapts $\Delta_{T2P}$ based on the measure of the removed interference. The gain control 2306 receives measured ROT and measured ROTeff and outputs $\Delta_{T2P}$. The receiver measures the interference removed by the IC scheme and adapts $\Delta_{T2P}$.

C. $\Delta_{T2P}$ can be sent in a message to all access terminals 106 in a sector periodically.

For the adaptation of $\Delta_{T2P}$, if the interference after IC is reduced from $I_0$ to $I_0'$, the T2P can be consequently reduced of the quantity:

$$\Delta_{T2P} = \frac{I_0'}{I_0} \approx \frac{ROT_{eff}}{ROT}.$$

The $E_{cp}$ will increase (through the PC loop 2304) as:

$$E_{cp}' = \frac{I_0}{I_0^{(thr)}} E_{cp}.$$

The ratio between the total transmit power for the system with and without IC will be:

$$C = \frac{E_{cp}(1+G+T2P)}{E_{cp}'(1+G+T2P')},$$

where G is the overhead channel gain. For large values of T2P (with respect to G), the ratio C can be approximated as:

$$C \approx \frac{I_0^{(thr)}}{I_0'}.$$

For the estimation of the effective ROT, the effective ROT changes rapidly due to both PC and changes in channel conditions. Instead, $\Delta_{T2P}$ reflects slow variations of the $ROT_{eff}$. Hence, for the choice of $\Delta_{T2P}$ the effective ROT is measured by means of a long averaging window of the signal after IC. The averaging window may have a length at least twice as long as a power control update period.

Closed Loop Control of T2P with Fixed $\Delta_G>0$ dB

Figure 24:
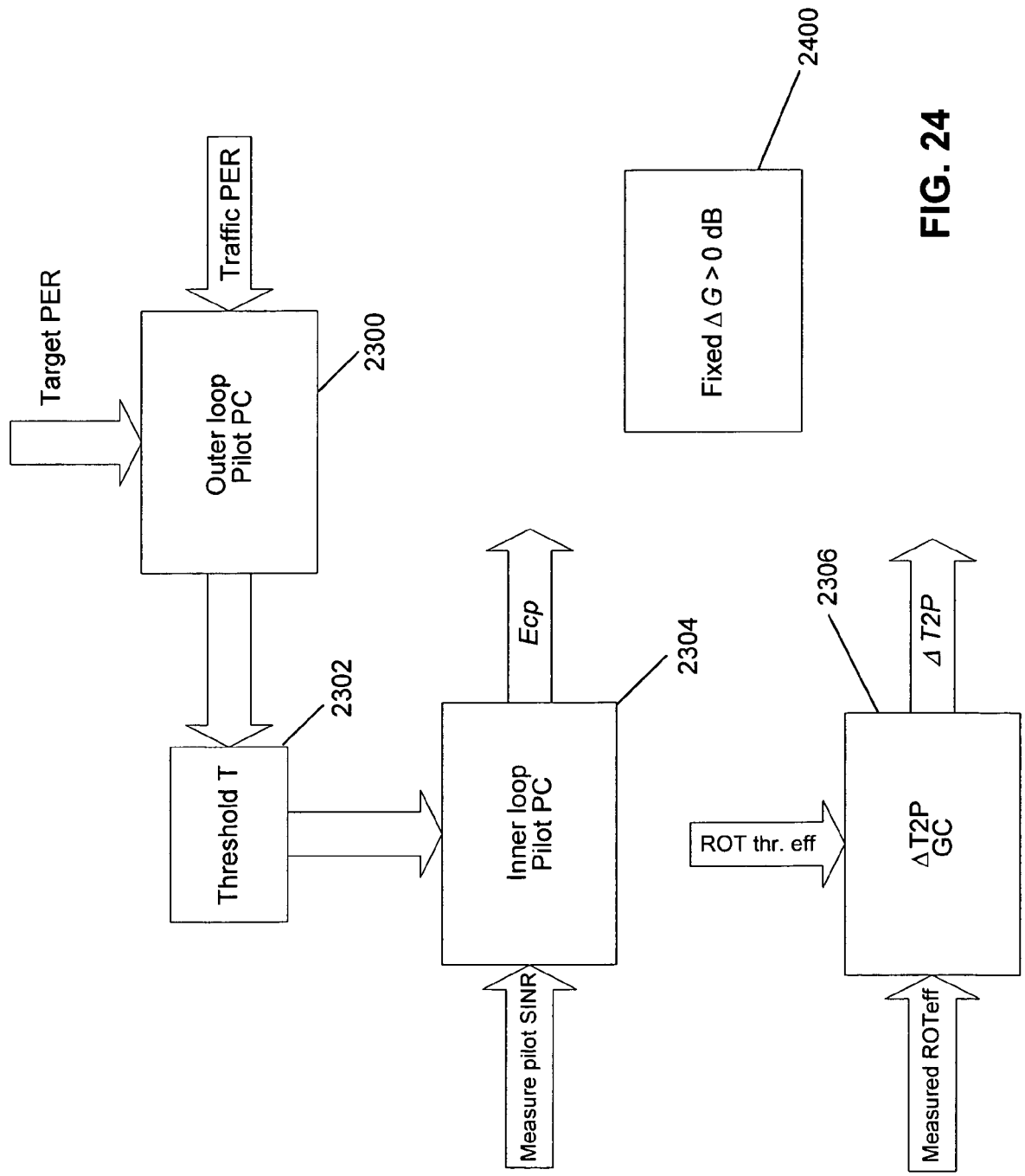
FIG. 24 illustrates a variation of FIG. 23.

FIG. 24 is the same as FIG. 23 except the gain control 2306 receives a threshold effective ROT, and $\Delta_G>0$ dB (block 2400). This alternative method for the adaptation of $\Delta_{T2P}$ is based on the request of having the same cell coverage for both IC and no-IC systems. The $E_{cp}$ distribution is the same in both cases. The effect of IC is twofold on a fully loaded system: i) the signal power before IC, $I_0$, will increase with respect to the signal power of the system with no IC; ii) due to closed-loop power control by PER control, $I_0'$ will tend to be similar to the signal power of the system with no IC. $\Delta_{T2P}$ is adapted as follows:

$$\Delta_{T2P} = \frac{I_0^{(thr)}}{I_0'} \approx \frac{ROT_{thr}^{(eff)}}{ROT_{eff}}.$$

ACK-Based Control of $\Delta_{T2P}$

Figure 25:
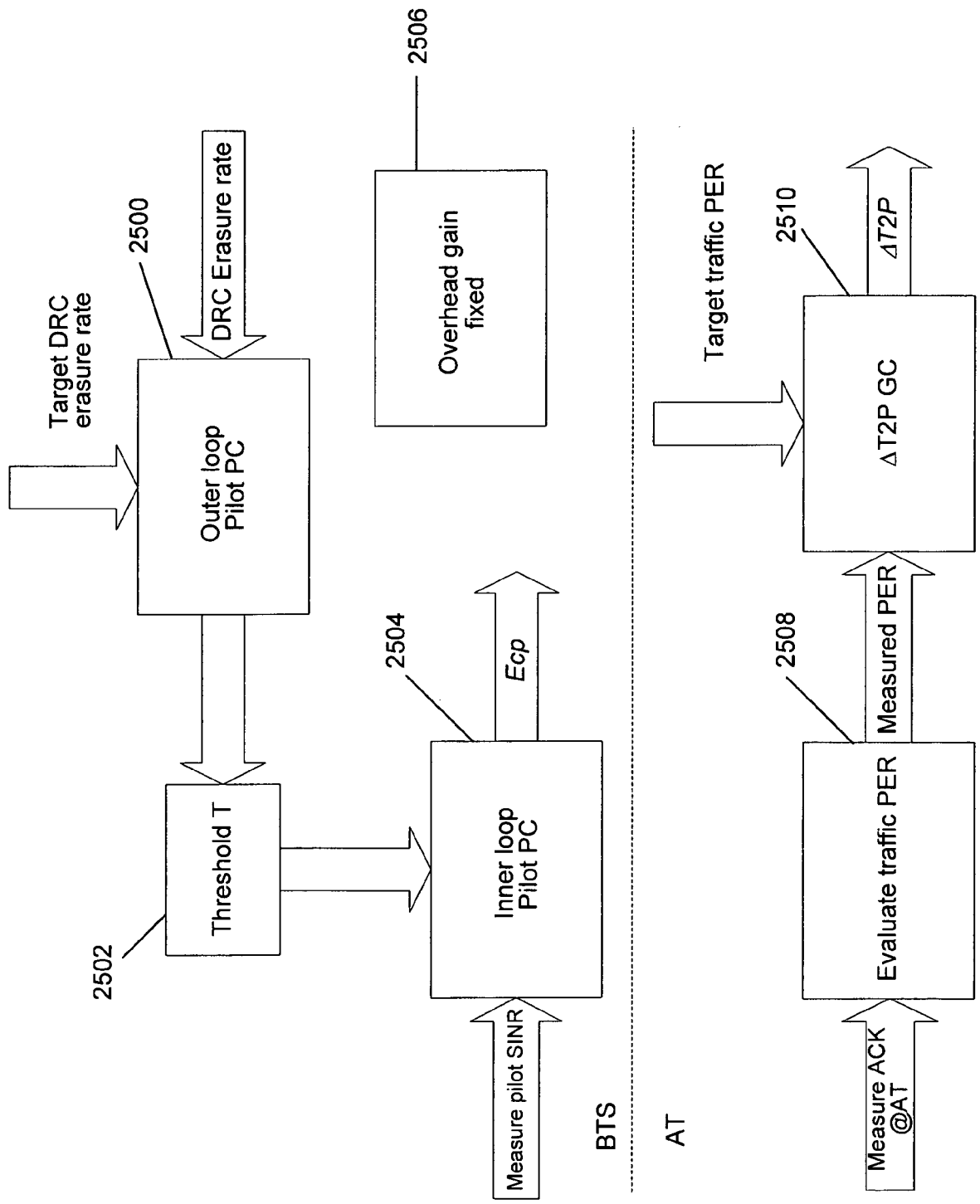
FIG. 25 illustrates an example of power control with fixed overhead subchannel gain.

FIG. 25 illustrates PC for $E_{cp}$ and $\Delta_{T2P}$ based on the ACK subchannel with fixed overhead subchannel gain (block 2506).

The closed loop GC of $\Delta_{T2P}$ requires a feedback signal from the BTS to the AT, where all ATs receive the same broadcast value of $\Delta_{T2P}$ from a BTS. An alternative solution is based on an open-loop GC of $\Delta_{T2P}$ 2510 and a closed loop PC 2500, 2504 for the pilots. The closed loop pilot PC comprises an inner loop 2504, which adjusts the $E_{cp}$ according to a threshold value $T_o$ 2502. The outer loop control 2500 is directed by the erasure rate of the overhead subchannels, e.g., the data rate control (DRC) subchannel error probability or DRC erasure rate. $T_o$ is increased whenever the DRC erasure rate exceeds a threshold, but is gradually decreased when the DRC erasure rate is below the threshold.

The $\Delta_{T2P}$ is adapted through the ACK forward subchannel. In particular, by measuring the statistics of the ACK and NACK, the AT can evaluate the traffic PER (block 2508) at the BTS. A gain control 2510 compares target traffic PER and measured PER. Whenever the PER is higher than a threshold, the $\Delta_{T2P}$ is increased, until T2P' reached the baseline value T2P of the no-IC system. On the other hand, for a lower PER, the $\Delta_{T2P}$ is decreased in order to fully exploit the IC process.

Variable Overhead Gain Techniques

A further optimization of the transceiver can be obtained by adapting not only $\Delta_{T2P}$ but also the overhead subchannel gains (G overhead) to the IC process. In this case, an extra feedback signal is needed. The values of $\Delta_G$ can be quantized from 0 dB to 0.5 dB.

Interference Power-Based Overhead Gain Control

Figure 26:
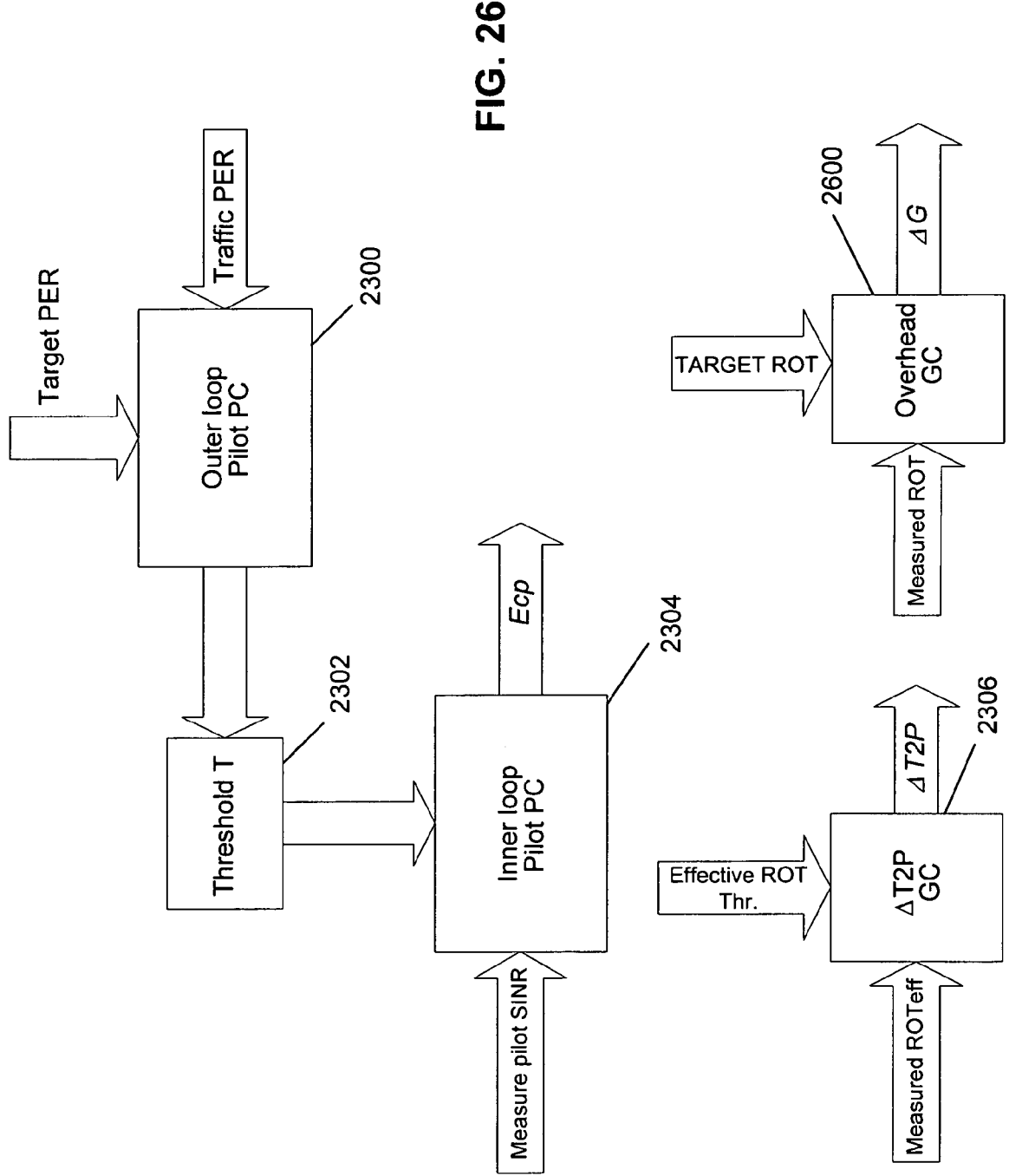
FIG. 26 is similar to FIG. 24 except with overhead gain control.

FIG. 26 is similar to FIG. 24 except with overhead GC 2600. A method for GC of the overhead subchannel 2600 is based on the measured signal power after the IC. In this case, the $E_{cp}$ is assumed in order to provide the same cell converge of a system with no IC. The signal before IC has an increased power $I_0$ and the overhead gain compensates for the increased interference. This implementation adapts the overhead gain by setting:

$$\Delta_G = \frac{I_0}{I_0^{(thr)}} \approx \frac{ROT}{ROT_{thr}}.$$

$\Delta_G$ may be controlled to not go under 0 dB since this would correspond to decrease the overhead subchannel power which is unlikely to be helpful.

The gain and power control scheme may include an inner and outer loop PC 2304, 2300 for $E_{cp}$, as in FIG. 23, a GC loop 2600 for $\Delta_G$ as described above, an open-loop GC 2306 for $\Delta_{T2P}$, where $\Delta_{T2P}$ is increased whenever the PER is above a target value, and is decreased when the PER is below the target. A maximum level of $\Delta_{T2P}$ is allowed, corresponding to the level of the no-IC receiver.

DRC-Only Overhead Gain Control

Figure 27:
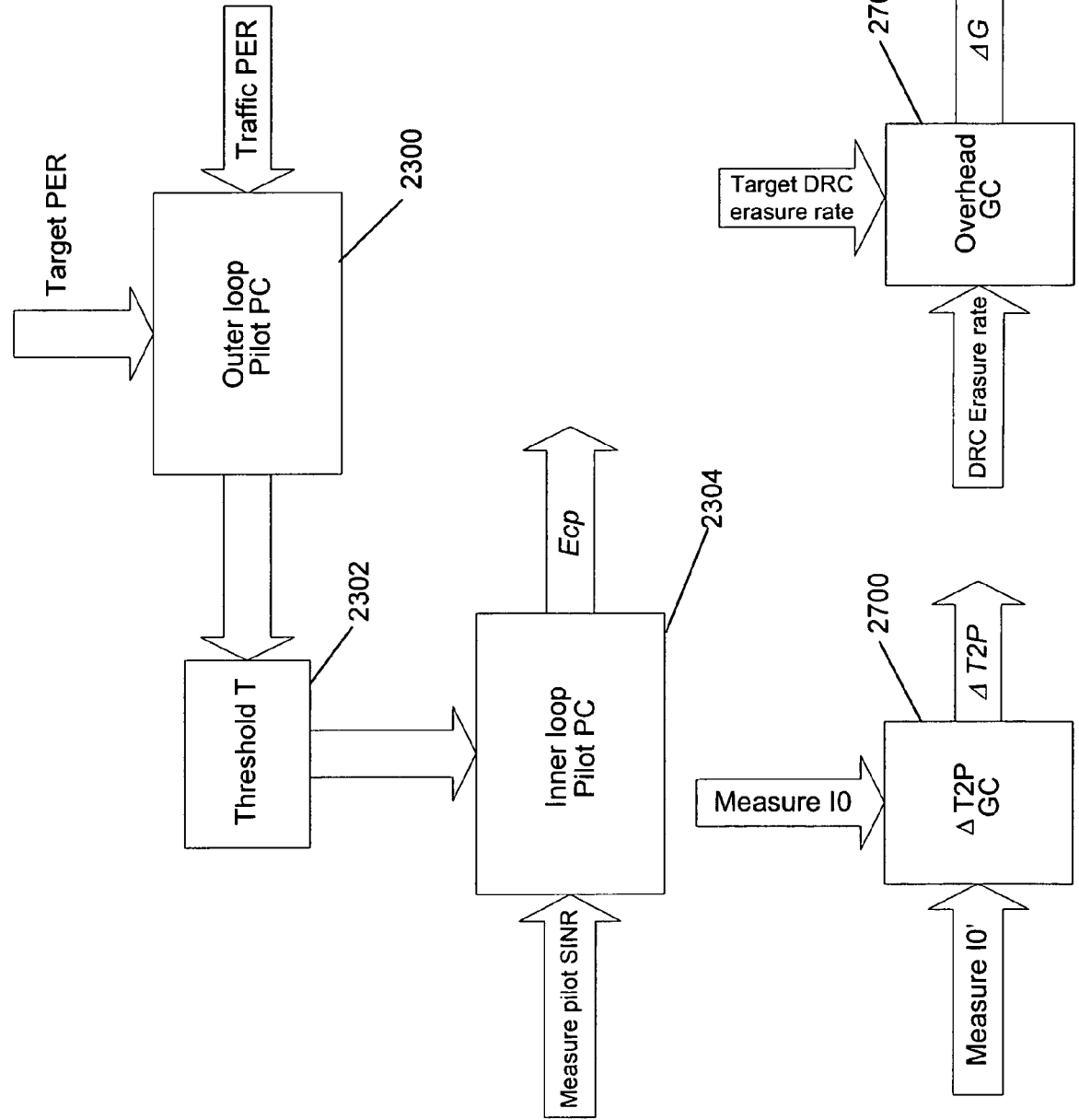
FIG. 27 illustrates a variation of FIG. 26 with DRC-only overhead gain control.

FIG. 27 illustrates a variation of FIG. 26 with DRC-only overhead gain control 2702.

Even when the overhead subchannel gain is adapted, the gain control of $\Delta_{T2P}$ 2700 can be performed with a closed loop, as described above. In this case, the $E_{cp}$ and $\Delta_{T2P}$ are controlled as in the scheme of FIG. 23, while the adaptation of the overhead subchannel gain 2702 is performed through the DRC erasure rate. In particular, if the DRC erasure is above a threshold, the overhead subchannel gain 2702 is increased. When the DRC erasure rate is below a threshold, the overhead gain 2702 is gradually decreased.

Control of T2P in a Multi-Sector Multi-Cell Network

Since the GC of $\Delta_{T2P}$ is performed on a cell level, and an AT 106 may be in softer handoff, the various sectors may generate different requests of adaptation. In this case various options may be considered for the choice of the $\Delta_{T2P}$ request to be sent to the AT. At a cell level, a method may choose the minimum reduction of T2P, among those requested by fully loaded sectors, i.e., $$\Delta_{T2P}^{(cell)} = \max_{s \in \{loaded\ sectors\}} \{\Delta_{T2P}^{(s)}\},$$

where $\Delta_{T2P}^{(s)}$ is the $\Delta_{T2P}$ required by the sector s. The AT may receive different requests from various cells, and also in this case, various criteria can be adopted. A method may choose the $\Delta_{T2P}$ corresponding to the serving sector in order to ensure the most reliable communication with it.

For the choice of $\Delta_{T2P}$ both at a cell and at the AT, other choices may be considered, including the minimum, maximum or mean among the requested values.

One important aspect is for the mobiles to use T2P'=T2P×$\Delta_{T2P}$, where $\Delta_{T2P}$ is calculated at the BTS based on measurements of Io and Io' (and possibly also knowledge of $I_o^{thr}$), and G'=G×$\Delta_G$, where AG is also calculated at the BTS. With these delta_factors calculated at the BTS, they are broadcast by each BTS to all the access terminals, who react accordingly.

The concepts disclosed herein may be applied to a WCDMA system, which uses overhead channels such as a dedicated physical control channel (DPCCH), an enhanced dedicated physical control channel (E-DPCCH), or a high-speed dedicated physical control channel (HS-DPCCH). The WCDMA system may use a dedicated physical data channel (DPDCH) format and/or an enhanced dedicated physical data channel (E-DPDCH) format.

The systems and methods disclosed herein may be applied to WCDMA systems with two different interlace structures, e.g., a 2-ms transmit time interval and 10-ms transmit time interval. Thus, a front-end memory, demodulator, and subtractor may be configured to span one or more subpackets of packets that have different transmit time intervals.

For TIC, the traffic data may be sent by one or more users in at least one of an EV-DO Release 0 format or an EV-DO Revision A format.

Specific decoding orders described herein may correspond to an order for demodulating and decoding. Re-decoding a packet should be from re-demodulation because the process of demodulating a packet from the FERAM 312 translates the interference cancellation into a better decoder input.

Pilot Interference Cancellation

Figure 28:
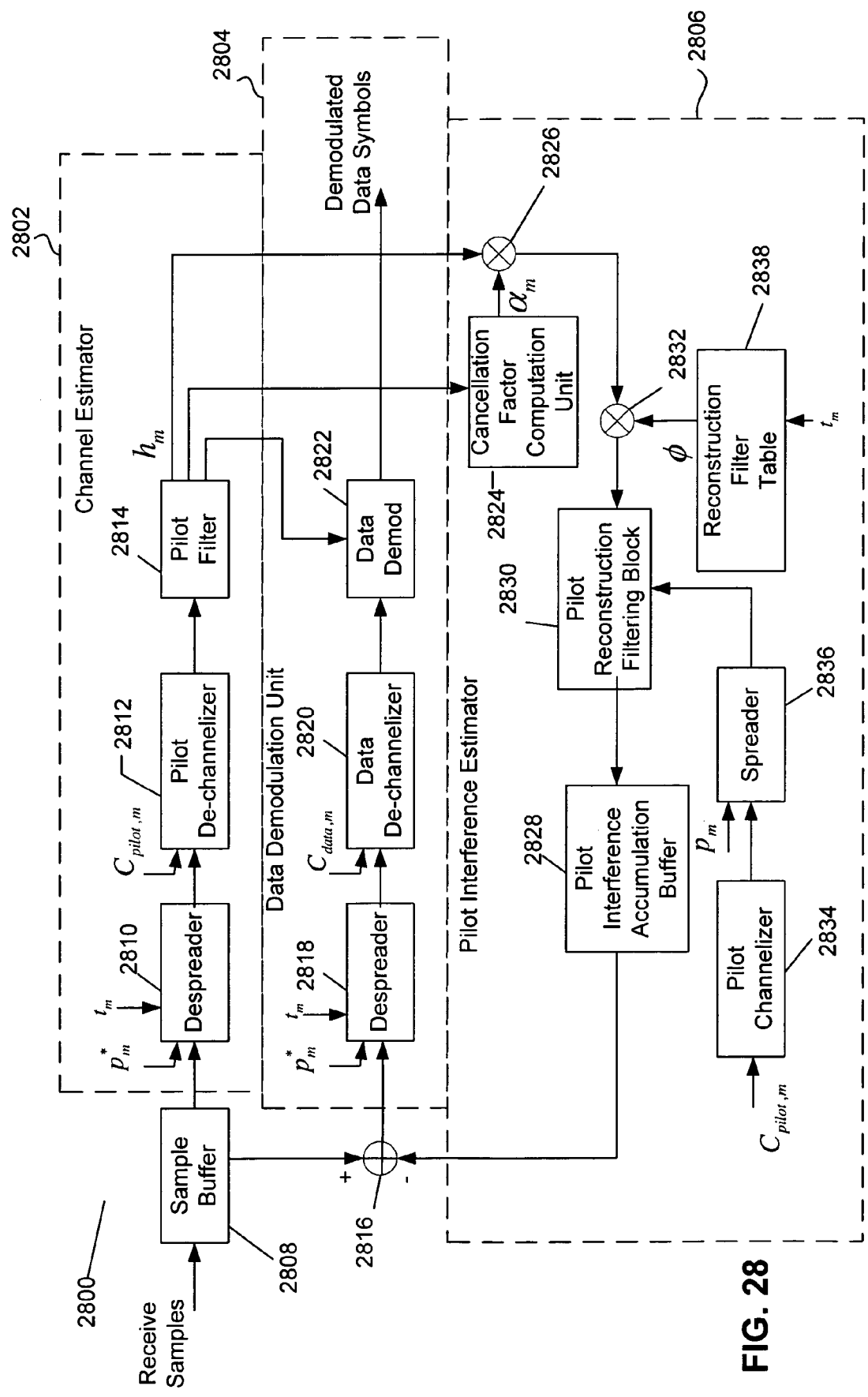
FIG. 28 illustrates a sample buffer and a finger processor within a rake receiver.

FIG. 28 illustrates a sample buffer 2808 and an embodiment of a finger processor 2800 within a rake receiver. A rake receiver may include a large number of individual finger processors 2800, such as 256 or 512 finger processors 2800 to process several multipaths. Alternatively, a rake receiver may include a single high-speed processor to process several multipaths in a time division manner, which simulates functions of several finger processors 2800.

One embodiment of the sample buffer 2808 may be a circular random access memory (RAM) storing segments of data samples at a sample rate of chip rate×2 ("chip×2"). The chip rate is equal to $1/T_C$, where $T_C$ is the chip duration. For example, the chip rate may be 1.2 MHz. Other chip rates may be used.

The finger processor 2800 may be used for a cdma2000 1xEV-DO system or other systems. The finger processor 2800 includes a channel estimator 2802, a data demodulation unit 2804, and a pilot interference estimator 2806. The channel estimator 2802 includes a despreader 2810, a pilot de-channelizer 2812 and a pilot filter 2814. The data demodulation unit 2804 includes a despreader 2818, a data de-channelizer 2820 and a data demodulator 2822. The pilot interference estimator 2806 includes a cancellation factor computation unit 2824, multipliers 2826 and 2832, a reconstruction filter table 2838, a pilot reconstruction filtering block 2830, a pilot interference accumulation block 2828, a pilot channelizer 2834 and a spreader 2836.

The despreaders 2810, 2818 receive complex conjugate spreading sequences, $p_m^*$, e.g., pseudo random noise (PN) sequences, from a spreading sequence generator. In one embodiment, the despreaders 2810, 2818 first multiply (despread) the data samples of a segment from the sample buffer 2808 starting at a time offset $t_m$ of the multipath with the spreading sequence, $p_m^*$, and then resample the despread data samples. In another embodiment, the despreaders 2810, 2818 first resample the data samples of a segment from the sample buffer 2808 starting at a time offset $t_m$ of the multipath, and then multiply the resampled data samples with the spreading sequence, $p_m^*$.

The despreaders 2810, 2818 in FIG. 28 may include resamplers or interpolators, which resample, upsample, sum, decimate or interpolate data samples from the sample buffer 2808 to achieve a desired rate. The type of resampling depends on the rate of received signal samples stored in the sample buffer 2808. For example, the despreader 2810 may upsample samples from the sample buffer 2808 at a rate of chip×2 to a maximum resolution of finger time offsets, e.g., chip×8. The despreader 2810 may decimate chip×8 samples to chip×1 for an output to the pilot de-channelizer 2812.

In general, different rates, such as chip×1, chip×2, chip×4, and chip×8, may be used by different components of the finger processor 2800. Higher rates like chip×8 may improve performance and accuracy of samples. Lower rates like chip×2 may be less accurate but improve efficiency by reducing the complexity of calculations and the processing time.

The pilot de-channelizer 2812 (a) receives despread data samples from the despreader 2810 and a pilot channelization code $C_{pilot,\ m}$ and (b) outputs de-channelized pilot symbols. Similarly, the data de-channelizer 2820 (a) receives despread data samples from the adder 2816 and a data channelization code $C_{data,\ m}$ and (b) outputs de-channelized data symbols.

The pilot filter 2814 derives at least two values, $h_m$ and $N_t$, which may be output from the pilot filter 2814 in various forms such as $h_m/N_t$ and $|h_m|^2/N_t$. $h_m$ is the channel estimate of the specific multipath assigned to the finger processor 2800. The channel estimate $h_m$ may correspond to a channel coefficient (amplitude, phase, and delay or time offset). The pilot filter 2814 may use one or more segments, e.g., a current segment "n" and/or past or future segments, to provide a channel estimate $h_m$. In one example, the pilot filter 2814 uses four to six segments to derive a channel estimate. Alternatively, the pilot filter 2814 may use one or more segments to provide a future channel estimate, i.e., a prediction of a channel estimate. The channel estimate $h_m$ will be used by the pilot interference estimator 2806 for pilot reconstruction, as described below. The channel estimate $h_m$ output by the pilot filter 2814 to the multiplier 2826 may be a complex value with I and Q components.

$N_t$ is the variance of noise plus an interference term seen by this finger processor 2800. If the variance of the channel estimate $h_m$ is high, then the channel is noisy. $h_m/N_t$ is used by the data demodulator 2822 to demodulate data. $|h_m|^2/N_t$ is used by the cancellation factor computation unit 2824. The pilot filter 2814 may include a phase rotator or phase corrector.

Interference cancellation by a plurality of finger processors 2800 may improve capacity of multiple access channels if the receiver has perfect channel state information. In reality, each user's channel is time-varying, and it may be a challenge to estimate reliable channel state information. Each user's pilot should be canceled from the received signal by using realistic or reliable pilot-based channel estimates. Using unreliable channel estimates may lead to over-cancellation of data samples. The cancellation factor computation unit 2824 reduces or prevents cancellation if the channel estimator 2802 detects an unreliable noisy pilot-based channel estimate. Thus, the cancellation factor computation unit 2824 minimizes residual energy (noise) after pilot interference cancellation.

For example, three finger processors 2800 may process the same received signal at different offsets and detect different SNRs or channel estimates. If one finger processor detects a particularly noisy channel, it may be desirable to reduce (scale down) the contribution of that finger processor's reconstructed pilot for pilot interference cancellation.

If $N_t$ (variance of noise plus an interference term seen by this finger processor 2800) is high, and pilot signal strength $|h_m|^2$ is low, then the channel estimate $h_m$ may be unreliable. The cancellation factor computation unit 2824 may select a low cancellation factor $\alpha_m$, such as 0, 0.1, 0.2, 0.5, etc. This reduces the amplitude of a noisy channel estimate used by a finger processor 2800 to reconstruct pilot samples.

If $N_t$ is low, and pilot signal strength $|h_m|^2$ is high, then the channel estimate $h_m$ is probably reliable, and the cancellation factor computation unit 2824 may select a high cancellation factor $\alpha_m$, such as 0.8, 0.9, 1.0, etc. If $N_t$ is high, and signal strength $-h_m|^2$ is also high, then the channel estimate $h_m$ may be somewhat reliable, and the cancellation factor computation unit 2824 may select a moderate cancellation factor $\alpha_m$, such as 0.5, 0.6, 0.7, 0.8, etc. Values for the cancellation factor $\alpha_m$ may depend on how pilot demodulation is implemented and how a channel estimate is derived. In some cases, the cancellation factor $\alpha_m$ may be selected to be greater than one. For example, a channel's phase may be improperly aligned during pilot demodulation, which causes energy to be cancelled. This channel has an under-estimated signal amplitude or biased channel estimate. Thus, selecting and using a cancellation factor $\alpha_m$ greater than one will add some correction back to the channel estimate. The equation below may be optimal for a channel that is constant over one segment with Gaussian noise.

In one embodiment, the cancellation factor computation unit 2824 uses $|h_m|^2/N_t$ from the pilot filter 2814 to compute a cancellation factor $\alpha_m$ from an equation:

$$\alpha_m = [(|h_m|^2/N_t)N]/[1+(|h_m|^2/N_t)N],$$

where $|h_m|^2/N_t$ may be proportional to $E_{cp}/N_t$, $E_{cp}$ is the energy per chip estimated by the channel estimator 2802, $N_t$ is noise ($E_{cp}/N_t$ represents the signal-to-noise ratio), and N is the averaging length of the channel estimate. N represents a number of samples used to estimate $h_m$ and $N_t$. N may be the segment length, such as 512, 1024 or 2048 chips.

In another embodiment, the cancellation factor computation unit 2824 uses $|h_m|^2/N_t$ from the pilot filter 2814 to select an optimal cancellation factor $\alpha_m$ from a look-up table (LUT). The look-up table includes pre-determined values or ranges of $|h_m|^2/N_t$ and corresponding pre-determined cancellation factors $\alpha_m$.

The first multiplier 2826 multiplies, i.e., scales, the channel estimate $h_m$ by the computed or selected cancellation factor $\alpha_m$ from the cancellation factor computation unit 2824 to provide per-segment weighted channel coefficients.

Pilot Reconstruction Filtering

If the time delay or offset $t_m$ of a multipath received signal is an integer multiple of the chip duration $T_C$ plus a fraction of chip duration $T_C$, i.e., less than one chip duration $T_C$, inter-chip interference (ICI) may occur. The finger processor 2800 performs reconstruction filtering to account for pulse-shaping by a transmitter. Specifically, the reconstruction filter table 2838, second multiplier 2832 and pilot reconstruction filtering block 2830 in FIG. 28 account for multiple lobes, i.e., multiple taps, of an estimated transmit pulse, and not just a center lobe, i.e., center tap or peak value, of the estimated transmit pulse. The filtering performed by the finger processor 2800 provides more reliable reconstructed pilot samples. Without considering the shape of the transmit pulse and the receive filter and reconstruction filtering, the reconstructed pilot signal may not accurately reflect the pilot's contribution to the received samples.

In one embodiment, the pilot reconstruction filtering block 2830 includes a polyphase finite impulse response filter (FIR), which combines decimating, e.g., from chip×8 to chip×2, and filtering in a single process. A polyphase filter may be given a phase, decimate a filter function according to the given phase, and then perform filtering. For example, a polyphase filter may use a convolution decimated by 8 with 8 different possible phases. A time offset $t_m$ input into the filter table 2838 selects filter coefficients corresponding to one of 8 different possible phases. The multiplier 2832 multiplies the filter coefficients (according to the selected phase) by the channel estimate and cancellation factor. The reconstruction filtering block 2830 filters (performs a convolution of) a spread pilot signal from spreader 2836 at chip×8 with the filter coefficients, channel estimate and cancellation factor. If the convolution has 64 samples (8 groups of 8 samples), after decimation of 8, the reconstruction filtering block 2830 is an 8-tap filter and only filters 8 samples. This embodiment may reduce complexity of the pilot interference estimator 2806.

The reconstruction filter table 2838 stores a set of pre-computed filter coefficients that represent a convolution $\phi(t)$ of an estimated transmit pulse $\phi_{TX}(t)$ and the receive filter $\phi_{RX}(t)$ (e.g., a low pass filter). The transmit pulse $\phi_{TX}(t)$ used by transmit filters of a terminal 106 may be known or estimated by the finger processor 2800 at the base station 104. The transmit pulse $\phi_{TX}(t)$ may be defined by a mobile phone manufacturer or by a standard, such as IS-95, cdma2000, etc. The receive filter function $\phi_{RX}(t)$ may ideally be a matched filter (MF) with the transmit filters, but a real receive filter may not be matched exactly with the transmit filters. The receive filter function $\phi_{RX}(t)$ may be set when a base station receiver is made.

In one configuration, the convolution is sampled at the highest sample rate in the finger processor 2800 (maximum resolution of finger time offsets), e.g., chip×8, such that the filter table 2838 includes a plurality of filter tables, e.g., 8 filter tables, where the $i^{th}$ filter table corresponds to chip-level samples of an original chip×8 autocorrelation function $\phi$ at a time offset i, where i=0, 1, 2, ... 7. Each filter table may have 2M+1 tap entries, and each entry may have 16 bits. In one embodiment, M is selected to be greater than or equal to two to reduce performance loss (if M=2, then 2M+1=5). The filter table may account for 5-13 chip time spans at chip×1 (where M=2 to 6, and 2M+1=5 to 13), or 33-97 chip×8 time spans (where M=2 to 6, and 2M(8)+1=33 to 97). In one embodiment, the same filter table 2838 may be used by a plurality of finger processors 2800.

In one embodiment, the second multiplier 2832 of each finger processor 2800 may access two such filter tables at a proper time offset for $t_m$ (assigned to the finger processor 2800) for reconstruction of chip×2 pilot samples, one table for even samples and one table for odd samples. The second multiplier 2832 multiples the scaled per-segment channel estimate $h_m$ coefficients from the first multiplier 2826 with each filter tap (pre-computed filter coefficients) of the two selected filter tables. The second multiplier 2832 outputs per-segment filter tap coefficients (e.g., at chip×2) to the pilot reconstruction filtering block 2830.

In one embodiment, a separate resampler may not be needed in the pilot interference estimator 2806 if the output of the pilot reconstruction filtering block 2830 provides samples at chip×2. The reconstruction filtering block 2830 may change a chip rate to a sample rate.

The spreader 2836 in FIG. 28 may receive the spreading sequence $p_m$ of the current segment "n" and provides a spread pilot signal (e.g., complex PN sequence chips) for the current segment "n," not the next segment "n+1." Thus, the finger processing 2800 of FIG. 28 reconstructs pilot interference of the current segment "n." There may be a short delay between reconstructing and accumulating pilot interference from multiple finger processors for the current segment "n," and then subtracting the accumulated reconstructed pilot interference of the current segment "n" from the data samples of the current segment "n." But this approach (canceling the accumulated reconstructed pilot interference of the current segment "n" from the data samples of the current segment "n") may provide more reliable/accurate pilot interference cancellation, especially for highly time-variant channels.

The pilot channelizer 2834 may receive complex channelization codes with I and Q components. The spreader 2836 may receive complex PN sequences with four possible values of +/−1 or +/−i. The pilot channelizer 2834 and spreader 2836 may generate extra chips on each side of a current segment "n" to assist filtering by the pilot reconstruction filtering block 2830.

The pilot reconstruction filtering block 2830 performs the actual filtering, i.e., performs a convolution of a spread pilot signal (e.g., a PN sequence) from the spreader 2836 and the product of the filter table coefficients $\phi(t)$, cancellation factor and channel estimate. For example, the pilot reconstruction filtering block 2830 may include two 5-tap filters, 9-tap filters or 13-tap filters at chip×1. There may be 2M+1 taps for each filter. The filtering provided by the pilot reconstruction filtering block 2830 may reduce the effect of ICI (inter-chip interference).

The pilot reconstruction filtering block 2830 may reconstruct one segment of user-time aligned pilot signals at chip×2 resolution and provide chip×2 pilot samples. In another embodiment, the pilot reconstruction filtering block 2830 filters a PN sequence oversampled at chip×8, and a resampler (between the pilot reconstruction filtering block 2830 and buffer 2828) decimates the chip×8 samples from the pilot reconstruction filtering block 2830 to chip×2 with a given phase, i.e., starting sample, from 0 to 7 (depending on time offset $t_m$). The samples are then stored in the buffer 2828.

The pilot reconstruction filtering block 2830 outputs a reconstructed pilot interference signal $\hat{p}(n)$ comprising estimated pilot samples of the multipath assigned to the finger processor 2800. The pilot reconstruction filtering block 2830 may include a phase de-rotator or phase corrector, particularly if the despreader 2810 includes a phase rotator that compensates for frequency offsets.

Pilot Interference Accumulation Buffer

The pilot interference accumulation buffer 2828 stores and accumulates reconstructed pilots from the pilot reconstruction filtering block 2830 at proper time offsets. As an example, the pilot interference accumulation buffer 2828 may be a circular random access memory (RAM). In one configuration, there may be a single pilot interference accumulation buffer 2828 to store and accumulate reconstructed pilot samples with different time offsets from a plurality of pilot reconstruction filtering blocks 2830 of a plurality of finger processors 2800. A single interference accumulation buffer may use less memory space and other resources compared to an embodiment with multiple interference accumulation buffers in multiple finger processors.

The pilot interference accumulation buffer 2828 may have the same resolution as the sample buffer 2808. For example, the pilot interference accumulation buffer 2828 may be at chip×2 resolution, i.e., operating at a speed of 2×chip rate. If each segment has a length of 512 chips, then the pilot interference accumulation buffer 2828 may store at least 2 segments, i.e., 512 chips/segment×2 samples/chip=1024 pilot samples, which are generated from the pilot reconstruction filtering block 2830. With a length of at least 2 segments, the pilot interference accumulation buffer 2828 may store overlap of previous pilot samples. The pilot interference accumulation buffer 2828 may be implemented with other sizes. The pilot interference accumulation buffer 2828 may use other sample rates, such as 3/2 or 4/3× the chip rate.

After the finger processors 2800 finish reconstructing pilots, the interference accumulation buffer 2828 contains an overall pilot interference estimate. The adder 2816 in each finger processor 2800 then subtracts the interference accumulation buffer content sample-wise (from the interference accumulation buffer 2828) from the received signal (from the sample buffer 2808) to provide pilot-free data samples to the data demodulation unit 2804.

The complexity reduction of using a single interference accumulation buffer may be achieved by making the reconstructed pilot independent from the multipath (user) arrival time. For example, the reconstructed pilot may be generated at a chip×2 rate and system-time-aligned. Thus, the reconstructed pilot may be independent from the multipath (user) arrival time. The reconstructed pilot provided by the interference accumulation buffer 2828 may be subtracted directly, e.g., via burst subtraction, from the received signal provided by the sample buffer 2808 according to system time without considering finger or user time, i.e., without resampling. This eliminates the need for a resampler.

Reverse Link Inter-Cell and Intra-Cell Interference Cancellation

It is possible to increase reverse link capacity of a CDMA system, for example, by canceling intra-sector interference at a given BTS (base station) 104 based on subtracting (1) pilot signals of all access terminals 106 that arrive at the BTS 104, (2) access terminal overhead channels that decode at the BTS, and (3) access terminal traffic data channels that decode at the BTS 104.

In practical deployments, signals from an access terminal 106 may often be received with reasonable power at more than one BTS 104, such as a reverse link CDMA access terminal 106 in soft handoff. The section below describes techniques for removing an access terminal's inter-cell interference from a BTS 104 at which the access terminal's signals do not decode successfully. This may be referred to as BTS-to-BTS interference cancellation.

Figure 29:
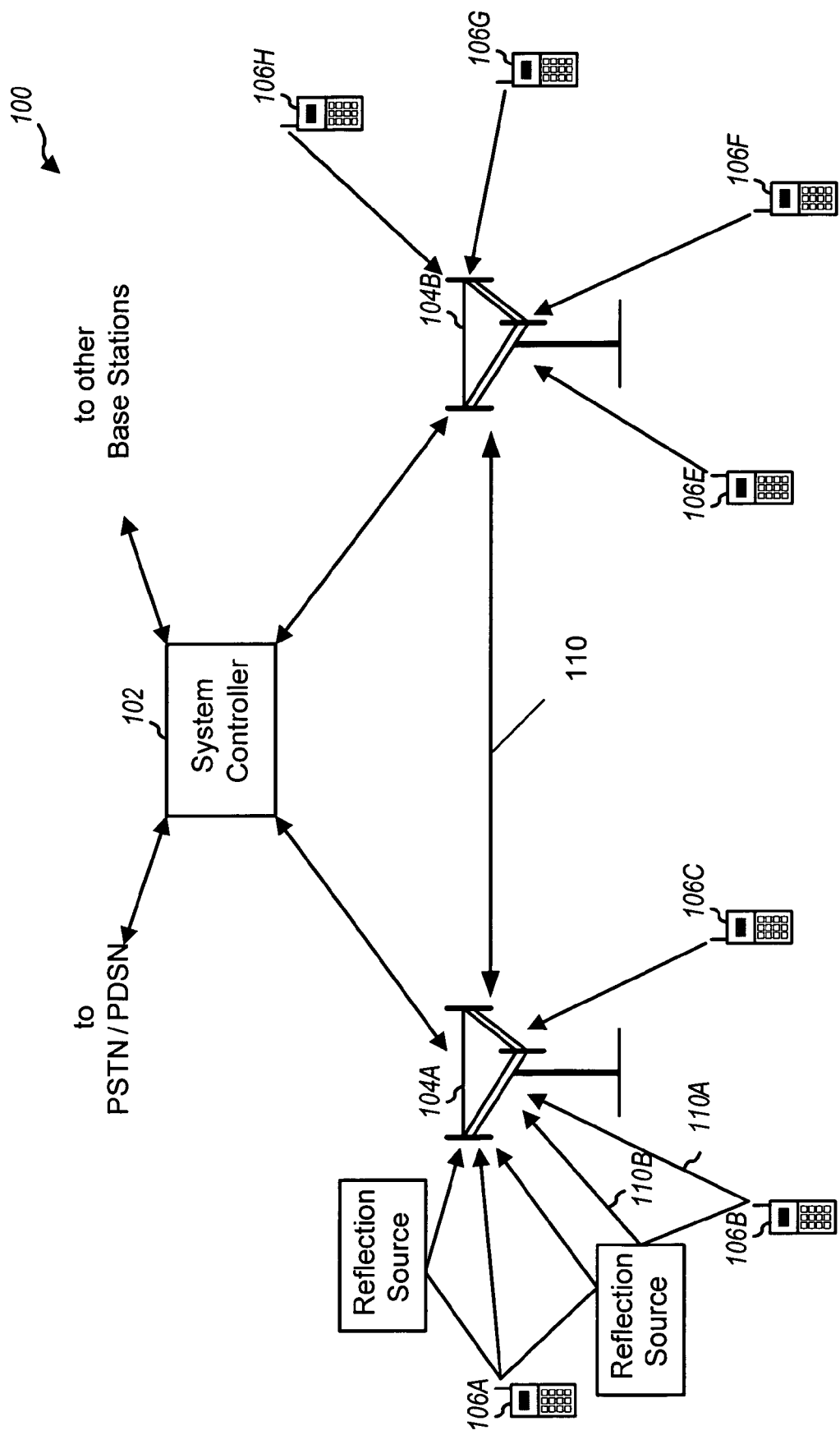
FIG. 29 illustrates multiple base stations configured to share decoded data for reverse link inter-cell interference cancellation.
Figure 30:
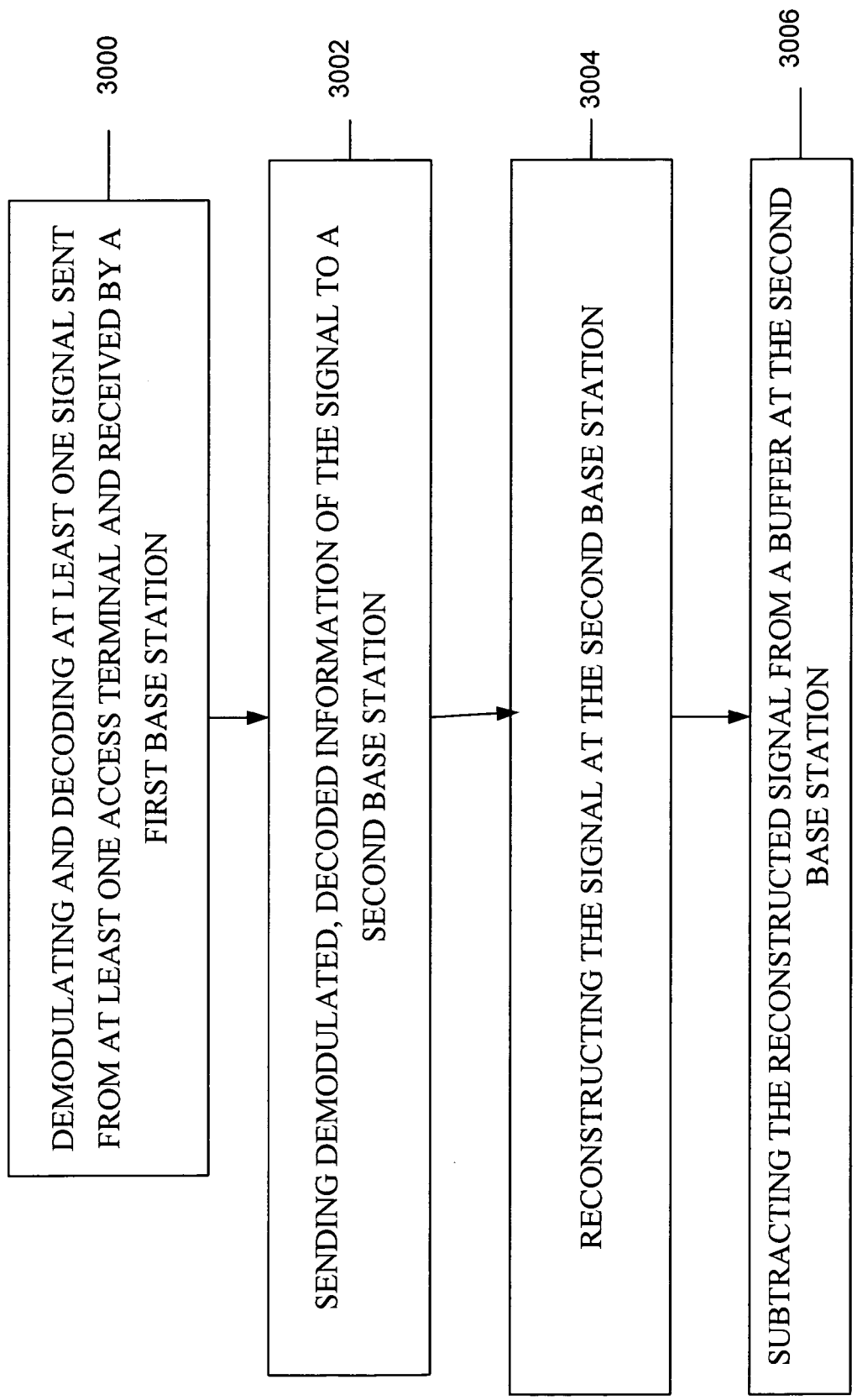
FIG. 30 illustrates a method for multiple base stations to share decoded data for reverse link inter-cell interference cancellation.

FIG. 29 illustrates multiple base stations 104 configured to share decoded data for reverse link inter-cell interference cancellation. FIG. 30 illustrates a method for multiple base stations 104 to share decoded data for reverse link inter-cell interference cancellation. A first base station 104A receives a signal from an access terminal 106 and stores samples of the signal in a sample buffer (e.g., buffer 312 in FIG. 3). In block 3000 of FIG. 30, the first base station 104A may demodulate and successfully decode at least one signal, such as a pilot, a data packet and/or an overhead channel, from the stored samples. In block 3002, the first base station 104A may send the demodulated, decoded information from the at least one signal, such as pilot, data packet and/or overhead channel, to a second base station 104B via (a) a direct link 110 (wired, e.g., fiber optic, or wireless) between the first and second base stations 104A, 104B, and/or (b) a base station controller (BSC) 102 in communication with the first and second base stations 104A, 104B.

In block 3004, the second base station 104B may use the decoded packet to estimate channel parameters, which include multipath delays and/or channel coefficients, and reconstruct data samples contribution to the received samples (using coding, modulation, filtering, etc.). In block 3306, the second base station 104B can then subtract/cancel the reconstructed samples from the second base station's sample buffer, which reduces interference to other signals present in the stored samples.

In this manner, the second base station 104B may reconstruct the channel estimate of an access terminal 106 whose pilot signals are received unreliably (i.e., unreliable pilot channel estimate) if the decoded packet is transmitted at a high enough traffic-to-pilot (T2P) ratio, corresponding to a higher data rate.

The second base station 104B may have (a) detected a pilot signal from the access terminal 106, and tried demodulating (with assigned RAKE finger processor(s)) and decoding a packet (i.e., access terminal 106 is in soft handoff), or (b) not tried demodulating and decoding a packet from the access terminal 106 because the second base station 104B did not receive a sufficiently strong signal from the access terminal 106. In the second case, any received signal from the access terminal 106 may be considered noise at the second base station 104B.

The first base station 104A (or base station controller 102) may maintain a list (e.g., active set list) of one or more other base stations that receive a signal from the access terminal 106 or are within range of the access terminal 106 so the first base station 104A knows where to send the demodulated and decoded data.

Thus, multiple base stations 104A, 104B may share decoded data to remove interference. The information transmitted between the base stations 104A, 104B can either be decoded data bits, re-encoded data bits, modulated symbols, or modulated/interleaved symbols. In one configuration, the information may be either (a) the raw data bits to minimize transfer bandwidth required between base stations 104A, 104B, or (b) final transmitted symbols of the access terminal 106 to minimize the amount of regeneration processing required at the receiving base station 104.

The method and system described herein may use pilot interference cancellation (PIC), traffic interference cancellation (TIC), or overhead interference cancellation (OIC) or any combination of PIC, TIC, and OIC.

The method and system described herein may be implemented with hybrid-ARQ, where a packet is transmitted on an interlace of time-separated subpackets. FIG. 7 illustrates an interlacing structure that may be used for CDMA 1x EV-DO Rev.A RL. Each interlace is 4 slots long, and there are 3 interlaces. Hence, there are 8 time slots between the end of a subpacket of a given interlace and the beginning of a next subpacket of the same interlace. 8 time slots is enough time for the receiver (e.g., base station 104) to decode the packet and relay an ACK or NAK to the transmitter (e.g., access terminal 106). The time between two subpackets of the same interlace can also be used to relay the decoded bits from a BTS 104 to other nearby BTSs, which are also likely to have received interference from the access terminal 106 with the decoded packet.

Since access terminals 106 transmit at various frame offsets (i.e., beginning subpackets at various slot boundaries), it is useful to cancel interference of access terminals 106 with packets that decode before the next frame offset because those subpackets (corresponding to the decoded packets) will have 75% overlap with the current frame offset. This is reasonable to implement for IC at the same BTS, but may be too short a time to cancel interference at another BTS. However, subpackets with 100% overlap will not occur for another 12 slots. Therefore, in a system with H-ARQ, a significant percentage of IC gain can be achieved by canceling interference of access terminals 106 from other cells on the order of 10 slots for EV-DO, corresponding to 16.6 ms.

FIG. 10 illustrates an example of a receiver buffer 312 that spans all 4 subpackets, which can be achieved for EV-DO Rev.A by a 40-slot buffer since there are 8 slots between each 4 slot subpacket. For illustrative purposes, FIG. 10 only considers a single interlace and 3 users who are on the same frame offset to highlight the interference cancellation operation with H-ARQ. The plot shows which subpackets in the 40-slot buffer are cancelled at 3 time instances (n, n+12, n+24), each corresponding to the arrival of another subpacket on the interlace being considered.

In general, IC may be applied either sequentially to each access terminal 106 or to groups of access terminals 106. In FIG. 10, IC is applied to groups of access terminals 106 that sent subpackets on the same frame offset, but successive interference cancellation within the group is not performed. For example, when the packet of User 1 (i.e., access terminal 1) decodes at time n, this helps the packets of Users 2 and 3 decode at time n+12, which further helps User 1 decode at time n+24. All subpackets of a previously decoded packet can be cancelled before reattempting decode for the other users when their next subpackets arrive.

The inter-cell interference cancellation technique described above may be implemented in a CDMA system or an OFDM system. In a CDMA system, access terminals 106 within a sector interfere at the base station 104. The transmitted traffic data interference of an access terminal 106 can be subtracted from the base station's received samples after decoding received data of the access terminal 106.

In an OFDM system, access terminals would typically be assigned unique frequencies (i.e., tones) within a sector or cell. But access terminals in other cells may be using one or more of those frequencies. Therefore, it is useful to cancel inter-cell interference in an OFDM system. This can be implemented by relaying the data of a user from one BTS to another BTS where channel estimation can be performed for each frequency tone, followed by cancellation.

On a CDMA reverse link with power control, decreasing the inter-cell interference allows users to transmit at less power for the same data rate, which may increase the number of supported users or increase the data rates of those users.

Figure 31:
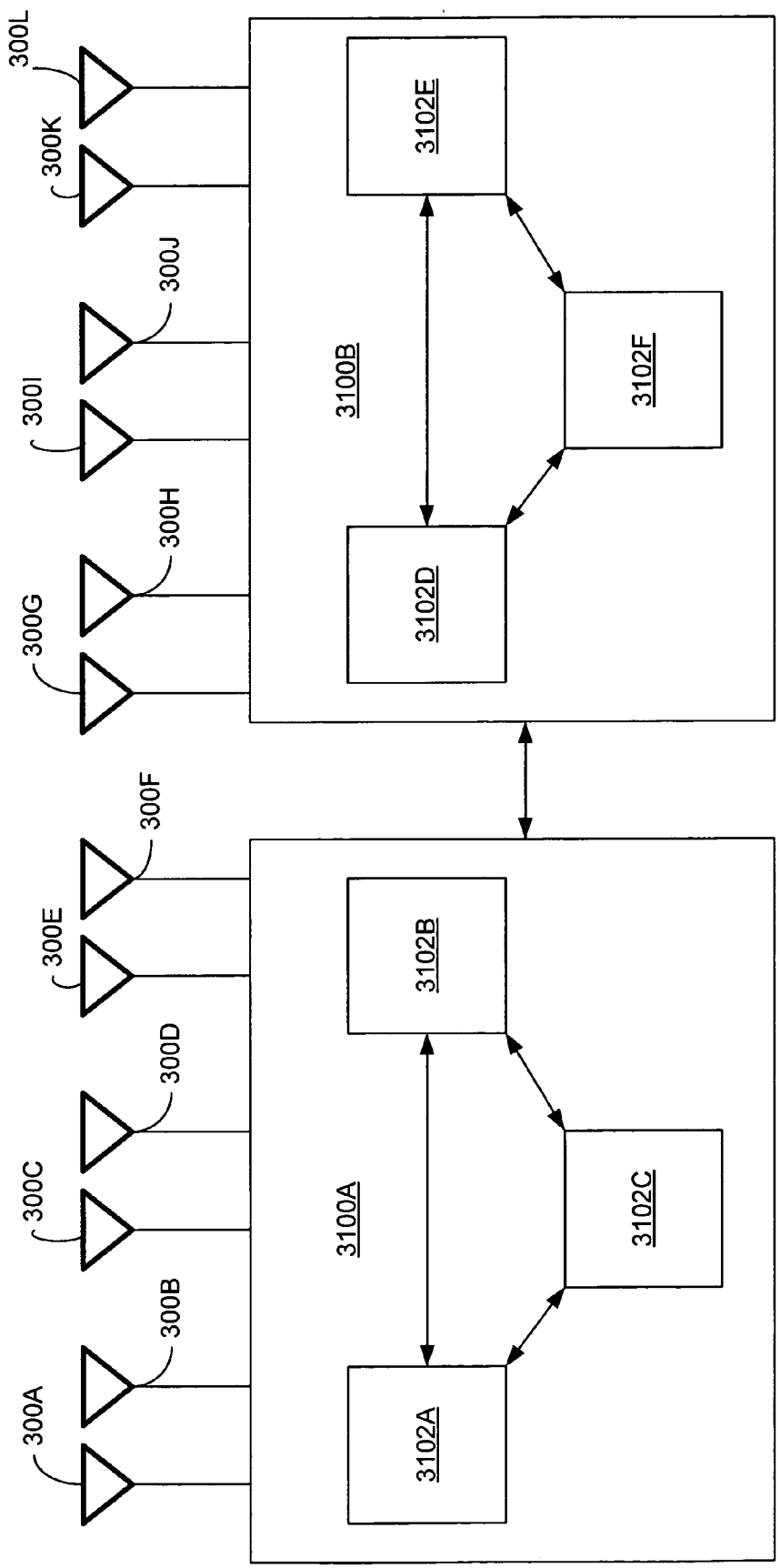
FIG. 31 illustrates multiple processing units within a base station configured to share decoded data for reverse link interference cancellation.

FIG. 31 illustrates multiple processing units 3102A-3102C within a base station 3100A configured to share decoded data for reverse link interference cancellation. Each base station 3100 may have multiple antennas 300A-300F. For example, there may be two antennas 300 for each sector of a three-sector base station.

Each processing unit 3102 may comprise software, hardware or a combination of software and hardware. For example, a software processing unit 3102 may comprise a digital signal processor (DSP) or a microprocessor executing instructions stored in a memory. An example of a hardware processing unit 3102 may comprise an application specific integrated circuit (ASIC) or a gate array, such as a field programmable gate array (FPGA). A processing unit 3102 may represent a channel card or a microchip on a channel card. As an example, a first processing unit 3102A may be assigned to process reverse link signals from one set of 100 access terminals, while a second processing unit 3102B is assigned to process reverse link signals from another set of 100 access terminals.

In one configuration, two processing units 3102 that share decoded data for reverse link interference cancellation use the same frequency carrier. Two processing units 3102 that share decoded data for reverse link interference cancellation may receive signals from the same set of one or more antennas 300 or two or more different antennas 300. Thus, the two processing units 3102 that share decoded data for reverse link interference cancellation are not limited to processing signals received from the same sector.

The concepts herein may be applied to any two entities, devices, stations, processing units, modules or terminals that can be configured to share decoded data and perform interference cancellation. The interference cancellation may be inter-cell or intra-cell. For example, two or more processing units 3102A-3102C in one base station 3100A can share decoded data and perform reverse link interference cancellation. As another example, one or more processing units 3102A-3102C in one base station 3100A can share decoded data with one or more processing units 3102D-3102F in another base station 3100B for reverse link interference cancellation.

An inter-cell data-directed integrated circuit (IC) may be used to remove re-use interference. Given the H-ARQ delay between subpackets of the same interlace, decoded packets may be re-broadcast to non-decoding soft handoff legs (e.g., other nearby base stations at which the packet did not decode). If these other base stations are tracking the multipath arrival timing of the user, the decoded packet broadcast from the decoding base station could be used at these base stations to perform data-directed channel estimation and cancellation of the pilot and traffic interference. If these base stations are not tracking the multipath arrival timing of the user, the multipath arrival timing can be estimated based on data-directed time tracking, followed by data-directed channel estimation and cancellation of the pilot and traffic interference.

System with Multiple Signal Receiving Units and a Central Processor with Interference Cancellation A general cellular architecture as in FIG. 1 comprises multiple base transceiver stations (BTSs) 104A-104B connected to a base station controller (BSC) 102. Demodulation and decoding of signals from access terminals 106A-106H are performed independently at each BTS 104. In reverse link soft handoff, signals of an access terminal 106D may decode at one or more BTSs 104A-104B, and the BSC 102 implements selection diversity. The section below describes a central "super-BTS" processor 3204 (FIG. 32) configured to perform demodulation, decoding, and reverse link interference cancellation for a cluster of cells.

Figure 32:
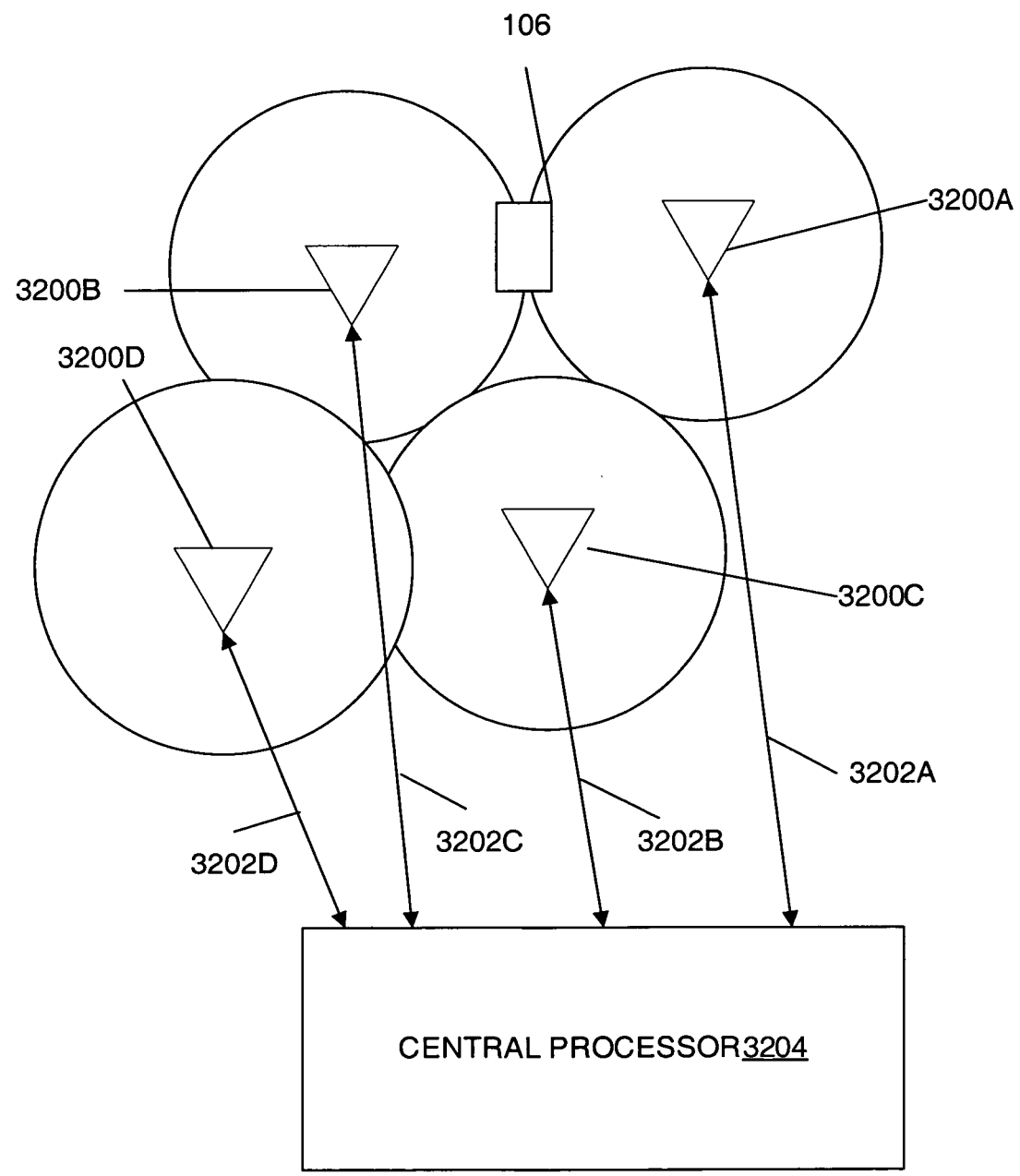
FIG. 32 illustrates a system with multiple signal receiving units and a central processor configured to perform interference cancellation.

FIG. 32 illustrates a system with multiple, distributed, radio frequency (RF) signal receiving units 3200A-3200D, multiple high speed links 3202A-3202D and a central processor 3204.

The signal receiving units 3200A-3200D may also be called antennas, receivers, RF heads, access points, etc. Each receiving unit 3200 is configured to receive signals from one or more access terminals 106 within a particular geographic area called a cell. Each cell is shown as a circle in FIG. 32. A group or "cluster" of cells may be selectively positioned or spread out to cover a large geographic area. In other words, the receiving units 3200A-3200D may be spaced (spatially distributed) at great distances from each other, such as hundreds of meters or thousands of meters. Two or more cells may partially overlap. In one configuration, each receiving unit 3200 may also transmit signals to access terminals.

Each receiving unit 3200 may have less components than a standard base station. For example, each receiving unit 3200 may comprise one or more antennas, an amplifier, a filter and a signal sampler. In one configuration, each receiving unit 3200 may have three to six antennas, and the receiving unit 3200 can send received data from one or more antennas to the central processor 3204. Each cell may be divided into multiple sectors, such as three sectors per cell, where each sector has two corresponding antennas.

The central processor 3204 is configured to implement RL interference cancellation for a cluster of cells.

Figure 33:
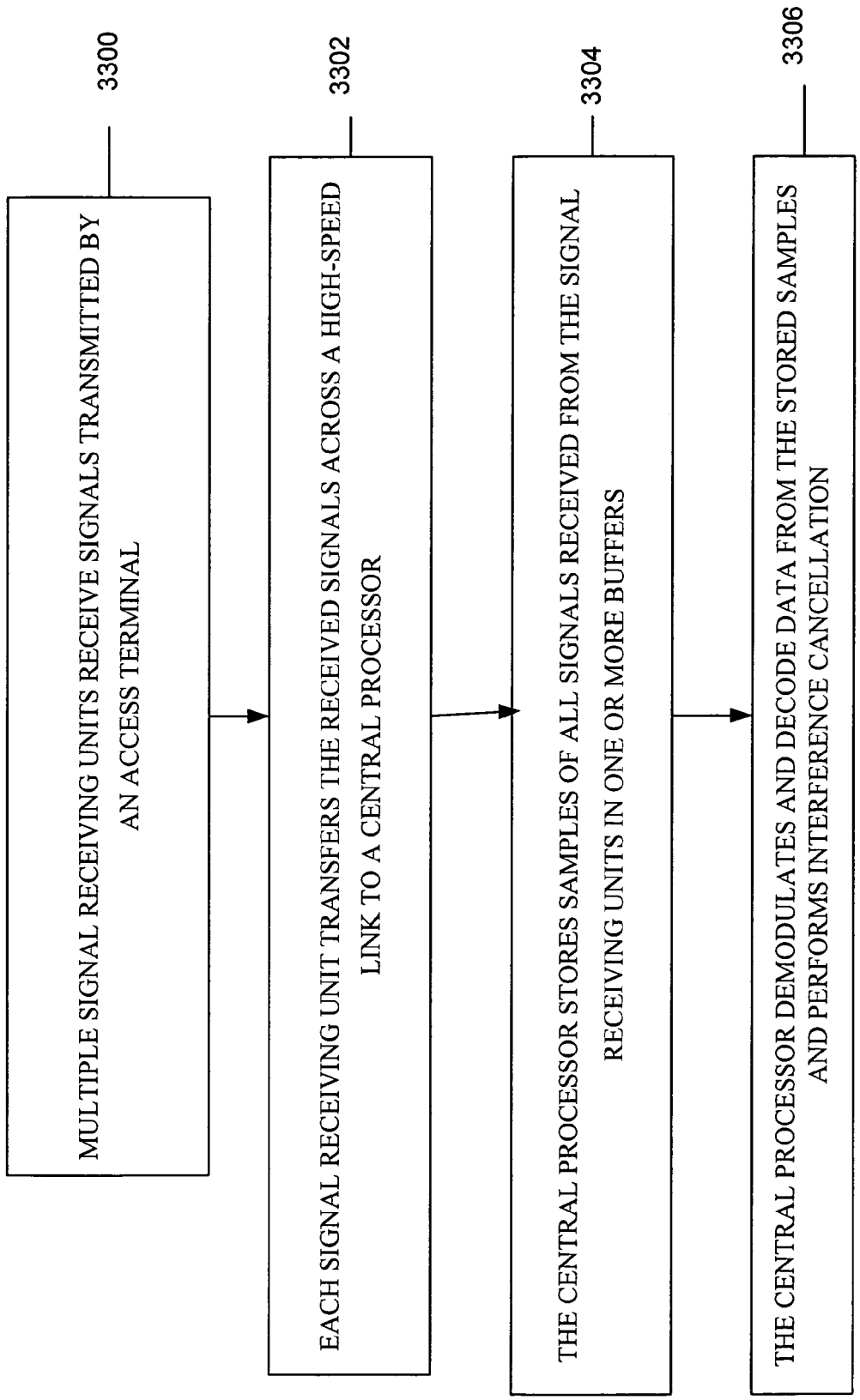
FIG. 33 illustrates a method for using the system of FIG. 32.

FIG. 33 illustrates a method for using the system of FIG. 32. In block 3300, multiple signal receiving units 3200A, 3200B receive signals transmitted by an access terminal 106. In block 3302, each signal receiving unit 3200 transfers the received signals across a high-speed link 3202, such as one or more optical fibers, to the central processor 3204.

The central processor 3204 may be referred to as a "super BTS." In block 3304, the central processor 3204 stores samples of all signals received from the signal receiving units 3200 in a single buffer or a plurality of buffers (which may be called sub-buffers), where each sub-buffer stores signals from a specific signal receiving unit 3200. Examples of buffers are shown in FIGS. 3, 4, 8, 10 and 28 and described above.

In block 3306, the central processor 3204 demodulates (e.g., with a RAKE receiver) and decodes data from the stored samples and performs interference cancellation (reconstruct data, pilot or overhead samples and subtract from stored samples in a buffer). Examples of demodulators and decoders are shown in FIGS. 2-4 and 28 and described above.

For example, if the access terminal 106 sends strong enough multipath signals received at both signal receiving units 3200A and 3200B, the multipaths may be combined by the central processor 3204 prior to attempting to decode a data packet. If the same packet decodes successfully for this access terminal 106, the packet may be cancelled from the samples (stored at the central processor 3204) received by both signal receiving units 3200A and 3200B.

In addition, one signal receiving unit 3200D may not receive a sufficiently strong pilot signal from the access terminal 106 (e.g., received signal power is below a threshold), and the central processor's packet decoding of this access terminal 106 does not rely on received samples by signal receiving unit 3200D. If one of the packets from this access terminal 106 just decoded successfully, the central processor 3204 may still attempt to perform channel estimation and interference cancellation for this packet on the samples received by signal receiving unit 3200D. This channel estimation would be based on the decoded data channel signal-to-noise ratio, which is often much higher than the pilot signal-to-noise ratio.

A base station controller may communicate with a hundred base stations. In one configuration, the central processor 3204 may communicate with a smaller number of signal receiving units 3200, such as five or seven, which may be referred to as a "cluster."

The system described above may use pilot interference cancellation (PIC), traffic interference cancellation (TIC), or overhead interference cancellation (OIC) or any combination of PIC, TIC, and OIC. The system described above may be implemented with a reverse link employing hybrid-ARQ.

With EV-DO Rev. A interlacing (described above), a 16-slot packet would last 40 slots. Therefore, if a designer wanted to ensure the central processor 3204 could remove an access terminal's packet from all affected slots, the central processor (super BTS) 3204 could have a buffer (FERAM) of 40 slots.

Whenever a new subpacket is received from an access terminal, the central processor 3204 may attempt decoding for that packet using all available (stored) sub-packets. If decoding is successful, then the central processor 3204 may cancel contribution of that packet from all of the affected antenna samples within the BTS cluster by reconstructing and subtracting the contribution of all component subpackets.

Figure 34:
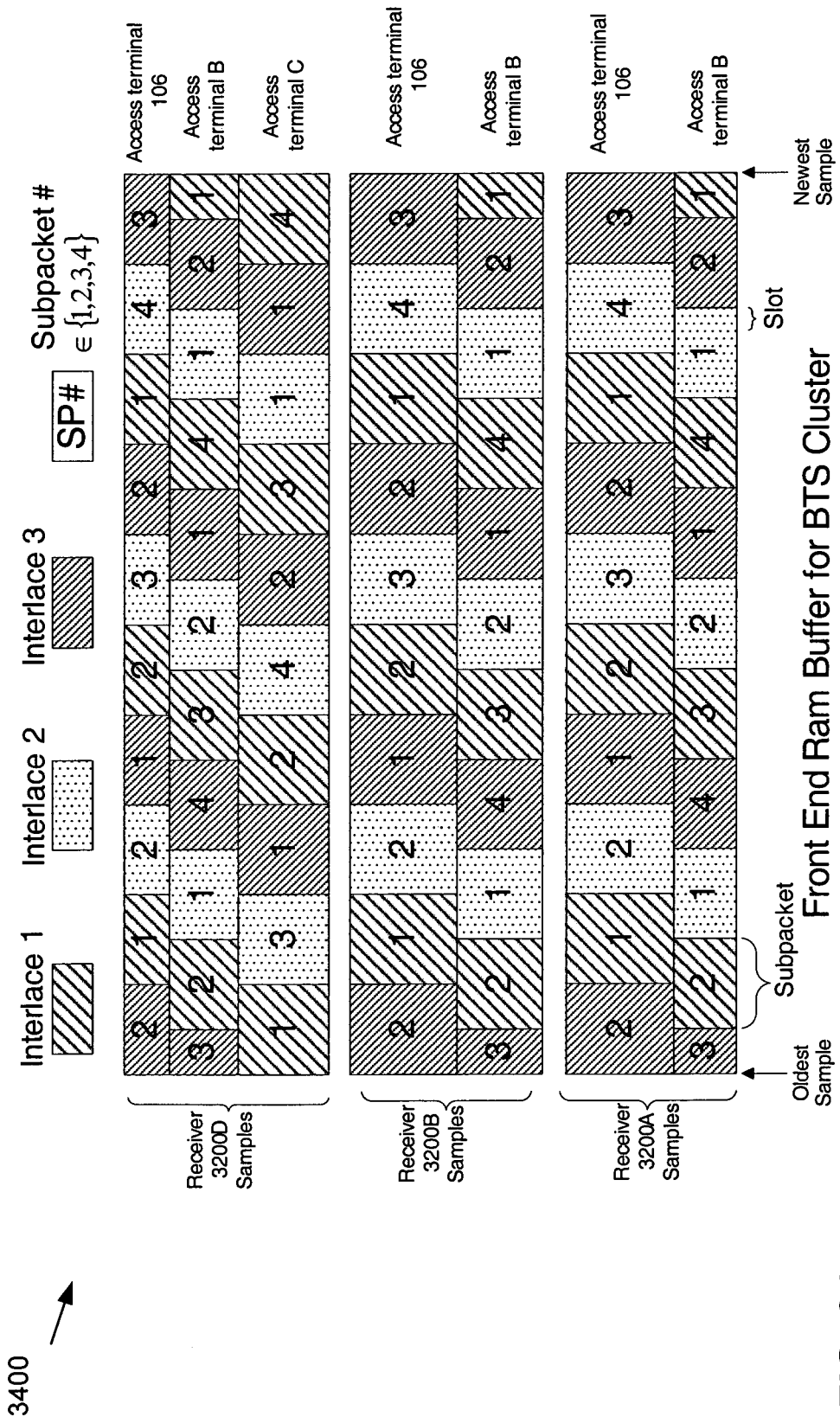
FIG. 34 illustrates an example of a received sample buffer in the control processor of FIG. 32.

FIG. 34 illustrates an example of a received sample buffer 3400 in the control processor (super BTS) 3204. FIG. 34 also illustrates examples of relative power (vertical height) for each access terminal's samples/subpackets received by receivers 3200A, 3200B, and 3200D. Receivers 3200A and 3200B receive subpackets of sufficient power from access terminal 106, but receiver 3200D receives subpackets of less power from access terminal 106. If the central processor 3204 successfully decodes a packet from access terminal 106, the central processor 3204 can remove contribution of the access terminal 106 to the receiver 3200D samples based on channel estimation at 3200D being performed with the data symbols of access terminal 106. Based on removal of access terminal 106 from receiver 3200D, access terminal B and access terminal C will be able to achieve higher data rates since their traffic channels will experience less interference.

The system may reduce hardware and/or software at each base station site by using signal receiving units 3200A-3200D instead of standard base stations.

The system described above may be implemented in a CDMA system or an orthogonal frequency division multiple access (OFDMA) system. The system may allow one or more access terminals to transmit at lower power due to the reduced interference. Both intra-cell and inter-cell interference from traditional CDMA systems may be removed. In OFDM reverse link systems, the effect of inter-cell interference may be removed after users have decoded since their effect on each pilot tone of each receiver antenna can be estimated and subtracted. Users in soft handoff in a system with decentralized BTS demodulation and decoding would be capable of softer handoff where the demodulation from all receiver antennas (i.e., those that would normally correspond to different base stations) can occur prior to decoding. The overall system with a central processor 3204 can then have higher reverse link capacity.

A system with the central processor 3204 for a cluster of cells may also reduce the number of required forward link (FL) medium access control (MAC) channels (i.e., for power control and ACK).

Furthermore, the central processor 3204 may reduce or eliminate imbalances of the forward link and reverse link that can arise in frequency division duplex (FDD) systems when an access terminal has a good forward link and bad reverse link to one BTS, but the opposite to another BTS. In this situation, reverse link feedback channels transmitting information about the forward link cannot be received successfully by the BTS with the good forward link.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium. A storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method to reduce interference, the method comprising:
    at a first base station, demodulating and decoding a signal sent from at least one access terminal and received by the first base station, wherein the signal comprises an interlace of time-separated subpackets corresponding to a packet;
    during a time interval associated with receiving data that is interlaced between the time-separated subpackets, sending, by the first base station, demodulated, decoded information of the signal to a second base station;
    reconstructing the signal at the second base station; and
    subtracting the reconstructed signal at a buffer of the second base station,
    wherein sending the demodulated, decoded information of the signal to the second base station occurs between receiving two subpackets of the interlace,
    wherein decoding the signal comprises at least one of sending an acknowledgement signal for a successfully decoded packet and sending a negative acknowledgement signal for a non-successfully decoded packet, and
    wherein demodulating and decoding the signal comprises demodulating the time-separated subpackets and decoding packets from subpackets sent from a plurality of access terminals and received by the first base station in a same time frame.

2. The method of claim 1, further comprising receiving at least a portion of the signal from the at least one access terminal at the second base station.

3. The method of claim 1, wherein the second base station is within a communication range of the at least one access terminal.

4. The method of claim 1, wherein the signal comprises at least one of a pilot, an overhead channel and a traffic channel.

5. The method of claim 1, wherein the demodulated, decoded information comprises at least one of decoded data bits, re-encoded data bits, modulated symbols, and modulated/interleaved symbols.

6. The method of claim 1, further comprising using the demodulated, decoded information to estimate channel parameters at the second base station.

7. The method of claim 6, wherein the channel parameters comprise at least one of multipath delays and channel coefficients.

8. The method of claim 6, wherein the channel parameters comprise at least one of amplitude and phase of an orthogonal frequency division multiplexing (OFDM) tone.

9. The method of claim 1, wherein reconstructing the signal at the second base station comprises coding, modulation and filtering.

10. The method of claim 1, wherein reconstructing the signal at the second base station comprises coding, modulation and a Fourier transform.

11. The method of claim 1, wherein sending the demodulated, decoded information to the second base station uses a direct link between the first base station and the second base station.

12. The method of claim 1, wherein sending the demodulated, decoded information to the second base station uses a base station controller in communication with the first base station and with the second base station.

13. The method of claim 1, wherein the signal is a code division multiple access signal.

14. The method of claim 1, wherein the signal is an orthogonal frequency division multiplexing signal.

15. A system for reducing interference, the system comprising:
    a first base station comprising:
        a receiver configured to demodulate and to decode a signal sent from at least one access terminal, wherein the signal comprises an interlace of time-separated subpackets corresponding to a packet; and
        a transmitter configured to send, during a time interval associated with receiving data that is interlaced between the time-separated subpackets, demodulated, decoded information of the signal to a second base station, wherein the transmitter is configured to send the demodulated, decoded information of the signal to the second base station between receiving two subpackets of the interlace; and
        wherein the first base station is configured to send an acknowledgement signal for a successfully decoded packet and to send a negative acknowledgement signal for a non-successfully decoded packet,
        wherein the receiver is further configured to demodulate the time-separated subpackets and to decode packets from subpackets sent from a plurality of access terminals and received by the first base station in a same time frame, and
    wherein the second base station comprises a signal reconstruction unit configured to reconstruct the signal at the second base station and a subtracter configured to subtract the reconstructed signal from a buffer output at the second base station.

16. The system of claim 15, wherein the second base station further comprises a second receiver to receive at least a portion of the signal from the at least one access terminal.

17. The system of claim 15, wherein the second base station is within a communication range of the at least one access terminal.

18. The system of claim 15, wherein the signal comprises at least one of a pilot, an overhead channel and a traffic channel.

19. The system of claim 15, wherein the demodulated, decoded information comprises at least one of decoded data bits, re-encoded data bits, modulated symbols, and modulated/interleaved symbols.

20. The system of claim 15, wherein the second base station is configured to use the demodulated, decoded information to estimate channel parameters.

21. The system of claim 20, wherein the channel parameters comprise at least one of multipath delays and channel coefficients.

22. The system of claim 20, wherein the channel parameters comprise at least one of amplitude and phase of an orthogonal frequency division multiplexing (OFDM) tone.

23. The system of claim 15, wherein reconstructing the signal at the second base station comprises coding, modulation and filtering.

24. The system of claim 15, wherein reconstructing the signal at the second base station comprises coding, modulation and performing a Fourier transform.

25. The system of claim 15, wherein sending the demodulated, decoded information to the second base station uses a direct link between the first base station and the second base station.

26. The system of claim 15, wherein sending the demodulated, decoded information to the second base station uses a base station controller in communication with the first base station and with the second base station.

27. The system of claim 15, wherein the signal is a code division multiple access signal.

28. The system of claim 15, wherein the signal is an orthogonal frequency division multiplexing signal.

29. A system for reducing interference, the system comprising:
a plurality of stationary units configured to receive signals from at least one access terminal and to transmit the signals to a central processor that is external to the plurality of stationary units, wherein the signals comprise an interlace of time-separated subpackets corresponding to a packet; and
the central processor, wherein the central processor comprises a buffer configured to store samples of the signals, wherein the central processor is configured to demodulate and decode the samples that are stored at the buffer, to reconstruct the demodulated, decoded samples to generate reconstructed samples, and to subtract the reconstructed samples from samples stored at the buffer,
wherein particular samples are selected for decoding at the buffer in an order that is based on a probability of decoding the particular samples,
wherein the central processor is further configured to attempt to send an acknowledgement signal for a successfully decoded packet and to send a negative acknowledgement signal for a non-successfully decoded packet, and
wherein demodulating and decoding the samples comprises demodulating the time-separated subpackets and decoding the time-separated subpackets.

30. The system of claim 29, wherein the stationary units are spatially distributed over a geographical area such that each unit receives signals from a cell that is substantially distinct from other cells of other units.

31. The system of claim 29, wherein the signals transmitted by the stationary units to the central processor are modulated, coded signals.

32. The system of claim 29, further comprising one or more optical fibers coupled to the plurality of units and the central processor.

33. The system of claim 29, wherein each of the stationary units comprises an antenna, an amplifier, a filter and a sampler.

34. The system of claim 29, wherein the buffer comprises a plurality of sub-buffers, each sub-buffer being configured to store samples of signals from a specific unit.

35. The system of claim 29, wherein the central processor is configured to combine multipath signals from two or more of the stationary units.

36. The system of claim 29, wherein the central processor is configured to subtract the reconstructed samples from samples received by one of the stationary units that did not receive signals above a power threshold from the at least one access terminal.

37. The system of claim 29, wherein the central processor is configured to perform channel estimation for one of the stationary units that did not receive signals above a power threshold from the at least one access terminal.

38. The system of claim 29, wherein the signals comprise at least one of a pilot, an overhead channel and a traffic channel.

39. The system of claim 29, wherein reconstructing the demodulated, decoded samples at the central processor comprises coding, modulation and filtering.

40. The system of claim 29, wherein reconstructing the demodulated, decoded samples at the central processor comprises coding, modulation and performing a Fourier transform.

41. The system of claim 29, wherein the signals are code division multiple access signals.

42. The system of claim 29, wherein the signals are orthogonal frequency division multiplexing signals.

43. A method to reduce interference, the method comprising:
at a plurality of stationary units, receiving signals transmitted by at least one access terminal and transferring the received signals to a central processor that is external to the plurality of stationary units, wherein the signals comprise an interlace of time-separated subpackets corresponding to a packet;
at the central processor, storing samples of the received signals;
at the central processor, demodulating and decoding the samples, wherein demodulating and decoding the samples comprises demodulating the time-separated subpackets and decoding the time-separated subpackets, wherein decoding the time-separated subpackets includes at least one of sending an acknowledgement signal for a successfully decoded packet and sending a negative acknowledgement signal for a non-successfully decoded packet;
at the central processor, reconstructing the demodulated, decoded samples to generate reconstructed samples; and
at the central processor, subtracting the reconstructed samples from the samples,
wherein the samples are selected for decoding in an order that is based on a probability of decoding the samples.

44. The method of claim 43, wherein the signals transferred by the stationary units to the central processor are modulated, coded signals.

45. The method of claim 43, further comprising combining multipath signals from two or more of the plurality of stationary units.

46. The method of claim 43, further comprising subtracting the reconstructed samples from samples received by one of the stationary units that did not receive signals above a power threshold from the at least one access terminal.

47. The method of claim 43, further comprising performing channel estimation for one of the stationary units that did not receive signals above a power threshold from the at least one access terminal.

48. The method of claim 43, wherein the signals comprise at least one of a pilot, an overhead channel and a traffic channel.

49. The method of claim 43, wherein reconstructing at the central processor comprises coding, modulation and filtering.

50. The method of claim 43, wherein reconstructing at the central processor comprises coding, modulation and performing a Fourier transform.

51. The method of claim 43, wherein the signals are code division multiple access signals.

52. The method of claim 43, wherein the signals are orthogonal frequency division multiplexing signals.

53. A computer-readable non-transitory medium comprising processor-executable instructions to cause at least one processor to:
- at a first base station, demodulate and decode a signal sent from at least one access terminal and received by the first base station, wherein the signal comprises an interlace of time-separated subpackets corresponding to a packet;
- during a time interval associated with receiving data that is interlaced between the time-separated subpackets, send, by the first base station, demodulated, decoded information of the signal to a second base station;
- reconstruct the signal at the second base station; and
- subtract the reconstructed signal at a buffer of the second base station,
- wherein sending the demodulated, decoded information of the signal to the second base station occurs between receiving two subpackets of the interlace,
- wherein decoding the signal comprises at least one of sending an acknowledgement signal for a successfully decoded packet and sending a negative acknowledgement signal for a non-successfully decoded packet, and
- wherein demodulating and decoding the signal comprises demodulating the time-separated subpackets and decoding packets from subpackets sent from a plurality of access terminals and received by the first base station in a same time frame.

54. A system comprising:
- means for demodulating and decoding, at a first base station, a signal sent from at least one access terminal and received by the first base station, wherein the signal comprises an interlace of time-separated subpackets corresponding to a packet;
- means for sending, during a time interval associated with receiving data that is interlaced between the time-separated subpackets, demodulated, decoded information of the signal from the first base station to a second base station;
- means for reconstructing the signal at the second base station; and
- means for subtracting the reconstructed signal at a buffer of the second base station,
- wherein sending the demodulated, decoded information of the signal to the second base station occurs between receiving two subpackets of the interlace,
- wherein decoding the signal comprises at least one of sending an acknowledgement signal for a successfully decoded packet and sending a negative acknowledgement signal for a non-successfully decoded packet, and
- wherein demodulating and decoding the signal comprises demodulating the time-separated subpackets and decoding packets from subpackets sent from a plurality of access terminals and received by the first base station in a same time frame.

\* \* \* \* \*